(12) United States Patent
Takeda et al.

(10) Patent No.: US 8,437,345 B2
(45) Date of Patent: May 7, 2013

(54) TERMINAL AND COMMUNICATION SYSTEM

(75) Inventors: Yukiko Takeda, Tokorozawa (JP);
Takehiro Morishige, Hachioji (JP);
Hidenori Inouchi, Higashimurayama (JP); Yusuke Hara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1670 days.

(21) Appl. No.: 10/563,219

(22) PCT Filed: Jul. 7, 2004

(86) PCT No.: PCT/JP2004/010009
§ 371 (c)(1),
(2), (4) Date: Jun. 1, 2006

(87) PCT Pub. No.: WO2005/006674
PCT Pub. Date: Jan. 20, 2005

(65) Prior Publication Data
US 2007/0081512 A1    Apr. 12, 2007

(30) Foreign Application Priority Data
Jul. 9, 2003   (JP) .................. 2003-194010

(51) Int. Cl.
*H04L 12/28* (2006.01)
(52) U.S. Cl.
USPC ........................................... 370/389
(58) Field of Classification Search ............... None
See application file for complete search history.

(56) References Cited

U.S. PATENT DOCUMENTS

| 5,572,528 A | 11/1996 | Shuen |
| 6,324,177 B1 * | 11/2001 | Howes et al. ............. 370/389 |

(Continued)

FOREIGN PATENT DOCUMENTS

| JP | 2001-237878 | 2/2000 |
| JP | 2001-326697 | 5/2000 |

(Continued)

OTHER PUBLICATIONS

D. Johnson et al., "Mobility Support in IPv6", IETF Mobile IP Working Group, Jun. 30, 2003, 4 sheets.

(Continued)

*Primary Examiner* — John Blanton
(74) *Attorney, Agent, or Firm* — Stites & Harbison PLLC; Juan Carlos A. Marquez, Esq.; Nicholas B. Trenkle, Esq.

(57) ABSTRACT

(Problems) By assigning a fixed home address to an MN, Mobile IPv6 assures the arrival of each content at the MN 1. In order to allow the user to receive a Mobile IPv6 service, it is necessary to provide the MN 1 with a Mobile IPv6 function for making applications conform to IPv6. However, there are only few such MNs 1. In addition, the MN 1 does not have a function for implementing an IPsec process repeatedly on a packet transmitted to and received from another apparatus. (technical solution) A scenario processing port 23 employed in the MN 1 includes a means, which is used for selecting a process according to a communication method and carrying out the selected process when a response to a Mobile IPv6 location registration message is received. By providing the scenario processing port 23 with a means for selecting a communication method, a function can be added to the MN 1 with ease. In addition, by providing the MN 1 with a means for implementing an IPsec process a plurality of times, it is possible to provide a communication apparatus according to a security management configuration.

19 Claims, 39 Drawing Sheets

U.S. PATENT DOCUMENTS

| | | | |
|---|---|---|---|
| 6,584,567 B1* | 6/2003 | Bellwood et al. | 713/171 |
| 6,865,681 B2* | 3/2005 | Nuutinen | 726/14 |
| 6,901,429 B2* | 5/2005 | Dowling | 709/203 |
| 6,922,557 B2* | 7/2005 | Fantaske | 455/403 |
| 6,922,774 B2* | 7/2005 | Meushaw et al. | 713/151 |
| 7,035,932 B1* | 4/2006 | Dowling | 709/230 |
| 7,047,405 B2* | 5/2006 | Mauro | 713/166 |
| 7,050,861 B1* | 5/2006 | Lauzon et al. | 700/17 |
| 7,082,477 B1* | 7/2006 | Sadhasivam et al. | 709/246 |
| 7,107,536 B1* | 9/2006 | Dowling | 715/738 |
| 7,266,703 B2* | 9/2007 | Anand et al. | 713/189 |
| 7,275,157 B2* | 9/2007 | Cam Winget | 713/168 |
| 7,305,230 B2* | 12/2007 | Zhigang | 455/414.1 |
| 7,313,234 B2* | 12/2007 | Takagaki et al. | 380/28 |
| 7,333,482 B2* | 2/2008 | Johansson et al. | 370/353 |
| 7,376,125 B1* | 5/2008 | Hussain et al. | 370/352 |
| 7,453,852 B2* | 11/2008 | Buddhikot et al. | 370/331 |
| 2001/0016492 A1 | 8/2001 | Igarashi et al. | |
| 2002/0069369 A1* | 6/2002 | Tremain | 713/201 |
| 2002/0129236 A1* | 9/2002 | Nuutinen | 713/151 |
| 2002/0133598 A1* | 9/2002 | Strahm et al. | 709/228 |
| 2002/0147920 A1* | 10/2002 | Mauro | 713/200 |
| 2002/0161905 A1* | 10/2002 | Haverinen et al. | 709/229 |
| 2002/0167938 A1* | 11/2002 | Wakayama et al. | 370/352 |
| 2002/0191604 A1* | 12/2002 | Mitchell et al. | 370/389 |
| 2002/0191793 A1 | 12/2002 | Anand et al. | |
| 2004/0158716 A1* | 8/2004 | Turtiainen et al. | 713/172 |
| 2005/0149724 A1* | 7/2005 | Graff | 713/156 |
| 2006/0104211 A1* | 5/2006 | Islam et al. | 370/252 |

FOREIGN PATENT DOCUMENTS

| | | |
|---|---|---|
| JP | 2002-185520 | 12/2000 |
| JP | 2002-261806 | 3/2001 |
| JP | 2003-060683 | 8/2001 |

OTHER PUBLICATIONS

T. Narten et al., "Neighbor Discovery for IP Version 6 (IPv6)", Network Working Group, Standards Track, Dec. 1998, 4 sheets.

Hesham Soliman et al., Hierarchical Mobile IPv6 Mobility Management (HMI Pv6), IETF Mobile IP Working Group, Oct. 2002, 2 sheets.

Thierry Ernst et al., "Network Mobility Support Goals and Requirements", NEMO Working Group, May 2003, 7 sheets.

J. Rosenberg, "SIP: Session Initiation Protocol", Network Working Group, Standards Track, Jun. 2002, 8 sheets.

T. Dierks et al., "The TLS Protocol Version 1.0", Network Working Group, Standards Track, Jan. 1999, 4 sheets.

International Search Report dated Nov. 9, 2004.

Japanese Patent Office Office Action dated Jul. 14, 2009, in Japanese.

Office Action from Chinese Patent Office for Chinese Application No. 2004800193085, dated Sep. 18, 2009, in Chinese.

* cited by examiner

210 BINDING UPDATE LIST MANAGEMENT TABLE

| BU DESTINATION ADDRESS (211) | HOME ADDRESS (212) | CARE OF ADDRESS (213) | LIFETIME (214) | |
|---|---|---|---|---|
|  |  |  |  | 210-1 |
|  |  |  |  | 210-2 |
|  |  |  |  | 210-n |

*FIG. 3*

220 SCENARIO POLICY MANAGEMENT TABLE

| SCENARIO NUMBER | SCENARIO CONTENTS | STATUS | |
|---|---|---|---|
| 10000 | IPv4 -IPv6 TRANSLATION ( NO IPsec ) | OFF | 221-1 |
| 10001 | NO IPv4 -IPv6 TRANSLATION ( NO IPsec ) | OFF | 221-2 |
| 10010 | IPv4 -IPv6 TRANSLATION | OFF | 221-3 |
| 10011 | IPv4 -IPv6 TRANSLATION ROUTE OPTIMIZATION | OFF | 221-4 |
| 11000 | NO IPv4 -IPv6 TRANSLATION | OFF | 221-5 |
| 11000 | NO IPv4 -IPv6 TRANSLATION ROUTE OPTIMIZATION | OFF | 221-6 |
| 10100 | MAP TYPE 1 | OFF | 221-7 |
| 10200 | MAP TYPE 2 | OFF | 221-8 |
| 10300 | MAP TYPE 3 | OFF | 221-9 |
| | | | |

*FIG. 4*

230 IPv4-IPv6 TRANSLATION TABLE

| IPv6 (231) | IPv4 (232) | LIFETIME (233) | |
|---|---|---|---|
| 2000:0:0:7::1000 (HoAv6) | 192.168.0.10 (HoAv4) | xxx | 230-1 |
| 2000:0:0:8::1001 (CN v6) | 192.168.0.100 (CN TEMPORARY v4) | yyy | 230-2 |
| | | | 230-n |

*FIG. 6*

TERMINAL AND COMMUNICATION SYSTEM

TECHNICAL FIELD OF THE INVENTION

The present invention relates to a terminal connected to a network as well as a communication control method and control program of the terminal. In particular, the present invention relates to a mobile terminal as well as a mobile communication control method and control program of the mobile terminal. To be more specific, the present invention relates to a mobile terminal in a mobile communication system adopting a mobile IP (Internet Protocol).

BACKGROUND OF THE INVENTION

In recent years, conversion of the protocol of a mobile communication network into an IP (Internet Protocol) is studied extensively.

An IETF (Internet Engineering Task Force) recommends standardization of Mobile IPv6 specifications. (Refer to non-patent documents 1: Mobility Support in IPv6<draft-ietf-mobile-ipv6-24.txt>, Work in Progress).

Network configuration elements of Mobile IPv6 include an MN (Mobile Node), an HA (Home Agent) and a CN (Correspondent Node).

An MN has a unique IP address (or home address), which does not change even if the MN moves to another location. A link that has the same prefix as the home address is referred to as a home link. In this case, the prefix of an IP address is a network part of the IP address.

When an MN moves to a link other than the home link, in the other link where the MN presently exists, the MN acquires an IP address. This acquired IP address is referred to as a care of address, which is abbreviated hereafter to simply a CoA. When the MN moves to the foreign link defined as a link to which the MN has moved from the home link, the MN receives a router advertisement transmitted periodically by a router existing in the present network. As the MN detects a prefix included in the router advertisement as a prefix different from that of the home address, the MN becomes aware of the fact that the MN has moved from the home link to the foreign link. A message in the router advertisement is prescribed in a neighbor discovery (IETF RFC2461) of the IPv6 specifications. The message is used for informing another node in the same link as the router that the router exists in the same link.

When the MN detects its movement, the MN registers its CoA in the HA. The security of a binding update message and binding acknowledgement message is assured by using IPsec. The HA holds binding information in a binding cache. The binding information is information associating the home address of the MN existing in a foreign link other than the home link with the aforementioned care of address (CoA). Then, operating as a proxy of the MN, the HA multicasts a Gratuitous Neighbor Advertisement in order to intercept a packet transmitted from a CN to the home address of the MN.

A procedure for transmitting a packet from a CN to the home address of an MN is described as follows.

The CN transmits a packet directed to the home address of the MN. The HA intercepts a packet directed to the home address of the MN. The HA searches the binding cache for a CoA associated with the home address of the MN. Then, the HA adds an IP header directed to the CoA to the received packet in an encapsulation process and transmits the encapsulated packet to the CoA. The encapsulated-packet route between the HA and the MN is referred to as a mobile tunnel.

When the MN receives the packet directed to the CoA, the MN removes the IP header added earlier to the packet in a decapsulation process to restore the original packet. Security of the mobile tunnel can be assured by using IPsec. The MN receiving the encapsulated packet may inform the CN of the binding information in order to optimize the route from the CN to the MN.

As a technology for managing local movements based on the Mobile IPv6 specifications, Hierarchical Mobile IPv6 mobility management (HMIPv6) has been proposed. (Refer to non-patent documents 2: Hierarchical Mobile IPv6 mobility management (HMIPv6)<draft-ietf-mobileip-hmipv6-07.txt>, Work in Progress).

HMIPv6 is provided with a MAP (Mobile Anchor Point) between the HA and the MN. The MAP provides a local HA function. The MAP may also have an AR (Access Router) as a subordinate. The MN receives a router advertisement including MAP options from an AR or the MAP and acquires the IP address of the MAP. The MAP options include the global address of the MAP, the prefix of the MAP, a MAP preference and the number of hops along the route to the MAP. The MAP informs the AR of MAP options by adoption of one of the following methods:

(1) Deliver a router advertisement including MAP options to the AR (Access Router).

(2) Have the MAP extend a router renumbering function of IPv6 to notify the AR of MAP options.

Instead of having the MAP inform the AR of MAP options, a person in charge of network management may set information of MAP options in the AR.

Receiving a router advertisement including MAP options, the AR passes on the router advertisement including MAP options to the MN located at a subordinate location.

Receiving the router advertisement including MAP options, the MN conforming to HMIPv6 stores the information of the MAP options. The MN conforming to HMIPv6 then generates an RCoA (Regional Core of Address) from the MAP prefix included in the MAP options and an index identifier of the MN. The MAP prefix is the prefix of a link in which the MAP exists. In addition, the MN conforming to HMIPv6 also generates an LCoA (On-link CoA) by using prefix information included in the router advertisement transmitted by the AR. The prefix information is the prefix of the AR. The LCoA corresponds to the CoA of Mobile IPv6.

First of all, the MN conforming to HMIPv6 registers its CoA in the MAP. The MAP is an element for managing information associating the RCoA of the MN with the LCoA. Then, the MN conforming to HMIPv6 registers its CoA in the HA. When the MN moves inside the MAP, the MN updates only information cataloged in the MAP as information on the CoA of the MN.

In addition, attention is being paid gradually to a network mobility technology for managing mobility in network units by using a mobile router for supporting group movements of nodes. (Refer to non-patent documents 3: Network Mobility Support Goals and Requirements"<draft-ietf-nemo-requirements-01.txt>, Work in Progress). The mobile router has an HA and registers its CoA in the HA. The mobile router is provided with an MN function of the mobile IP and router function. In order to sustain session continuity while the mobile router is moving, a mobile IP technology is applied between the HA of the mobile router and the mobile router itself. The HA intercepts a packet directed to a terminal located at a location subordinate to the mobile router and transfers the packet to the mobile router. Thus, it is possible to sustain the session continuity while the mobile router is moving. An IP header is added to a packet transferred between the HA and the mobile router. A mobile network including a mobile router includes stationary nodes and mobile nodes. A mobile network may include another mobile network. When a node of a mobile network communicates with a node outside the mobile network, all traffics pass through a tunnel between the mobile router and the HA.

A virtual machine exists in a technology for emulating a specific machine architecture and a hardware platform. In general, the virtual machine is implemented by software. Normally, the virtual machine operates on an OS (Operating System) of an apparatus. For this reason, an OS used for executing the virtual machine itself is referred to as a host OS and an OS executed in the virtual machine is referred to a guest OS.

On the other hand, attention is paid to an SIP (Session Initiation Protocol) adopted as a session control protocol in an IP network. For more information on the SIP, refer to non-patent document 4: IETF RFC3261, SIP: Session Initiation Protocol. The SIP is a protocol for controlling sessions of IP multimedia communications made to conform to specifications by IETF. Representative services each adopting the SIP include a VoIP (Voice over IP) service. The VoIP (Voice over IP) service is a service adopting a technology for transmitting and receiving audio information by way of an IP network. In a VoIP communication adopting the SIP, a virtual session is set prior to the start of the communication between apparatus communicating with each other. Then, audio data put in an IP packet is transmitted through the set session. The SIP adopted in the VoIP communication establishes, maintains and terminates a session between the apparatus communicating with each other.

In addition, attention is paid to a TLS (Transport Layer Security) protocol adopted as a protocol for providing a security function on a session layer. For more information on the TLS protocol, refer to non-patent document 5: IETF RFC2246, The TLS Protocol Version 1.0. The TLS protocol is a security protocol positioned between a transport layer and an application layer as a protocol for authentication and encryption.

DISCLOSURE OF THE INVENTION

The conventional technologies described above have the following problems.

When a mobile node MN pertaining to area A moves to area B connected to area A, an HA placed in area A as an agent for holding information on the locations of mobile nodes operates as a proxy of the mobile node MN.

According to Mobile IPv6, by assigning a unique IP address to a mobile node as a home address that remains the same even if the mobile node moves to another location, it is possible to assure arrival of a packet transmitted from a mobile node at the home address. Since the user adopts the mobile IP, however, the mobile node needs to conform to Mobile IPv6. Nevertheless, this conventional technology has a problem that, at the present time, there are only few mobile nodes conforming to the Mobile IPv6 specifications and applications conforming to the Mobile IPv6 specifications.

In addition, in the VoIP service, in order to prevent audio information from being tapped, encryption of audio packets is demanded. FIG. 37 is a diagram showing a security application route, which is taken when a mobile node conforming to the Mobile IPv6 specifications utilizes the VoIP service. Security for an audio packet is applied between a mobile node MN 1 and a correspondent node CN 2. This security is referred to as MN-CN security (1). The correspondent node CN 2 carries out security processing on a packet 356 directed to the mobile node MN 1 (typically in an IPsec transport mode). Without route optimization, an audio packet transmitted and received by the mobile node MN 1 passes through a home agent HA 4. By the same token, security for this audio packet is applied between the mobile node MN 1 and the home agent HA 4. This security is referred to as MN-HA security (2). The MN-CN security (1) and the MN-HA security (2) are independent of each other. For this reason, even if the original packet 356 is subjected to IPsec processing, the HA may add a header 357 for IPsec to the original packet 356 in some cases.

The MN receiving the packet needs to carry out security processing of the same layer twice on the received packet. However, an ordinary MN has a problem of not having processing to terminate IPsec doubly for a received packet.

For the above reason, an OSI reference model is explained. The OSI (Open Systems Interconnection) prescribes a reference model in which a network is divided into hierarchical layers. This reference model is expressed as 7 hierarchical layers. In the following description, each of the hierarchical layers is also referred to simply as a layer. The bottom layer is referred to as layer 1 while the top layer is referred to as layer 7. A procedure of communication between layers is defined by a protocol. For example, the IP protocol and IPsec are the protocol of layer 3.

In addition, in a network where security is managed in network units, when a mobile network becomes a network nested inside another network, a communication apparatus is required as an apparatus for carrying out IPinIP encapsulation at least doubly. However, an ordinary apparatus does not have processing to terminate the IPinIP encapsulation a plurality of times. That is, the IPinIP encapsulation cannot be carried out unless the communication apparatus is provided with an IP-layer-processing function.

It is thus an object of the present invention to implement a terminal capable of rendering a Mobile IPv6 service.

In particular, it is an object of the present invention to provide a communication method based on the Mobile IPv6 service for a terminal in which an application does not conform to IPv6.

It is another object of the present invention to provide a mobile terminal with communication methods, which can be switched from one to another according to the state of a network connected to the mobile terminal.

It is a further object of the present invention to provide a mobile terminal with a means for carrying out a security function according to a security management configuration a plurality of times.

It is a still further object of the present invention to provide a means for carrying out an encapsulation function.

TECHNICAL SOLUTION

In order to solve the problems described above, the present invention provides the conventional terminal with at least the following means:

(1) An IP-address translation function is provided for a terminal having a Mobile IPv6 function. To be more specific, the terminal is provided with a means for translating an IP address after carrying out Mobile IPv6 processing in a process to receive a packet according to an IPv6-address system and another means for carrying out Mobile IPv6 processing after translating an IP address in a process of transmitting an IP packet.

(2) As an alternative, in the case of a terminal having an IPsec processing function or an IP encapsulation function, the terminal is provided with a means for carrying out IP decapsulation processing or IPsec processing with respect to the mobile IP after carrying out Mobile IPv6 processing in a process to receive a packet and another means for carrying out Mobile IPv6 processing for a packet being transmitted after carrying out the IP encapsulation processing or the IPsec processing with respect to the mobile IP in a process of transmitting an IP packet.

(3) As another alternative, in the case of a terminal having an HMIPv6 function, the terminal is provided with a means for carrying out Mobile IPv6 processing after carrying out HMIPv6 processing in a process to receive a packet and another means for carrying out HMIPv6 processing after carrying out the Mobile IPv6 processing. The HMIPv6 processing includes the IPsec processing or the IP encapsulation processing and IP decapsulation processing.

(4) The terminal may be further provided with a means for detecting a control signal of the mobile IP to select any of the communication methods described in paragraphs (1) to (3).

(5) As a further alternative, the terminal may be provided with a security-processing means separately from the security processing function related to the mobile IP.

As a still further alternative, a communication apparatus in a communication network exhibiting network mobility may be provided with the packet-processing means described in paragraph (2).

EFFECTS OF THE INVENTION

The present invention provides a mobile terminal capable of rendering a Mobile IPv6 service and a mobile-terminal control method for controlling the mobile terminal.

In particular, by providing the terminal with a means for translating an IP address after carrying out Mobile IPv6 processing in a process to receive a packet according to an IPv6-address system and another means for carrying out Mobile IPv6 processing after translating an IP address in a process of transmitting an IP packet, a terminal capable of utilizing the Mobile IPv6 service can be implemented even if an application does not conform to IPv6.

As an alternative, by providing a terminal having an IPsec processing function or an IP encapsulation/decapsulation function with a means for carrying out IP decapsulation processing or IPsec processing after carrying out Mobile IPv6 processing in a process to receive a packet and another means for carrying out Mobile IPv6 processing for a packet being transmitted after carrying out the IP encapsulation processing or the IPsec processing in a process of transmitting an IP packet, a terminal for carrying out more complicated processing can be implemented.

As another alternative, by providing a terminal having an HMIPv6 function with a means for carrying out Mobile IPv6 processing after carrying out HMIPv6 processing in a process to receive a packet and another means for carrying out HMIPv6 processing after carrying out the Mobile IPv6 processing, a terminal compatible with Mobile IPv6 and HMIPv6 can be implemented.

In addition, by providing the terminal with a means for detecting a control signal of the mobile IP to select a proper communication method, a terminal capable of selecting a communication method according to a communication network can be implemented.

Further, by providing the terminal with a security-processing means separately from the security processing function related to the mobile IP, the terminal becomes capable of terminating security processing on the same layer a plurality of times.

Furthermore, by providing an HA in a communication network having a network mobility function with a means for carrying out IP decapsulation processing or IPsec processing after carrying out Mobile IPv6 processing in a process to receive a packet and another means for carrying out Mobile IPv6 processing for a packet being transmitted after carrying out the IP encapsulation processing or the IPsec processing in a process of transmitting an IP packet, an HA having a network mobility function can be implemented.

BRIEF DESCRIPTION OF THE DRAWINGS

FIG. 3 is a diagram showing a binding update list management table owned by the mobile node MN 1;

FIG. 4 is a diagram showing a scenario policy management table owned by the mobile node MN 1;

FIG. 6 is a diagram showing an IPv4-IPv6 translation table owned by the mobile node MN 1;

DESCRIPTION OF THE PREFERRED EMBODIMENTS

First Embodiment

A first embodiment of the present invention is explained by referring to diagrams.

As a typical representative, the following description explains details of a communication method, which is adopted when an MN (mobile node) conforming to the Mobile IPv6 specifications moves to a network outside a home link, which is also referred to hereafter as a home network. In the following description, the network outside the home link is referred to as a visited network.

Figure 1:
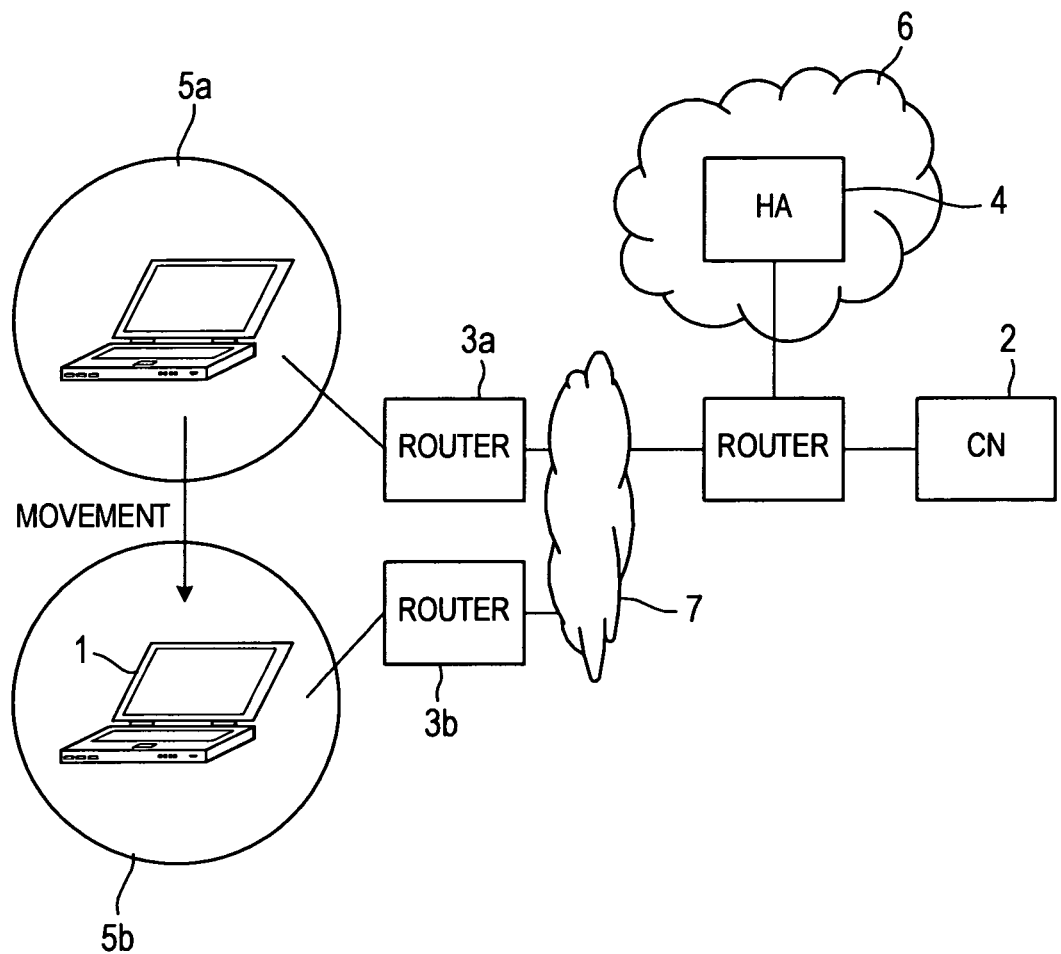
FIG. 1 is a diagram showing a typical configuration of a communication network according to the present invention.

FIG. 1 is a diagram showing a typical configuration of a communication network according to the present invention. The communication network provided by the present invention includes a home network 6 of an MN (mobile node) 1, an IP network 7 as well as visited networks 5 (i.e., visited networks 5a and 5b). In this embodiment, the home network 6, the IP network 7 and the visited networks 5 are each an IPv6 network. The MN 1 is a mobile node conforming to the Mobile IPv6 specifications. The visited networks 5 are each connected to the IP network 7 by a router or a gateway apparatus. By the same token, the IP network 7 is connected to the home network 6 by a router or a gateway apparatus. The visited networks 5 can also each be connected to the home network 6 by a router or a gateway apparatus.

The home network 6 has an HA (home agent) 4. The visited networks 5 (5a and 5b) are provided respectively with routers 3a and 3b each serving as an interface with the IP network 7.

The HA 4 is a home agent conforming to the Mobile IPv6 specifications. The HA 4 manages information on locations of the MN 1 existing at locations outside the home network 6. The location information managed by the HA 4 is information binding the home address of the MN to a CoA of the MN. The HA 4 has a function to intercept a packet transmitted by a CN (correspondent node) 2 as a packet directed to the home address of the MN 1 and pass on the packet to the MN 1 existing in the visited network 5b.

Figure 2:
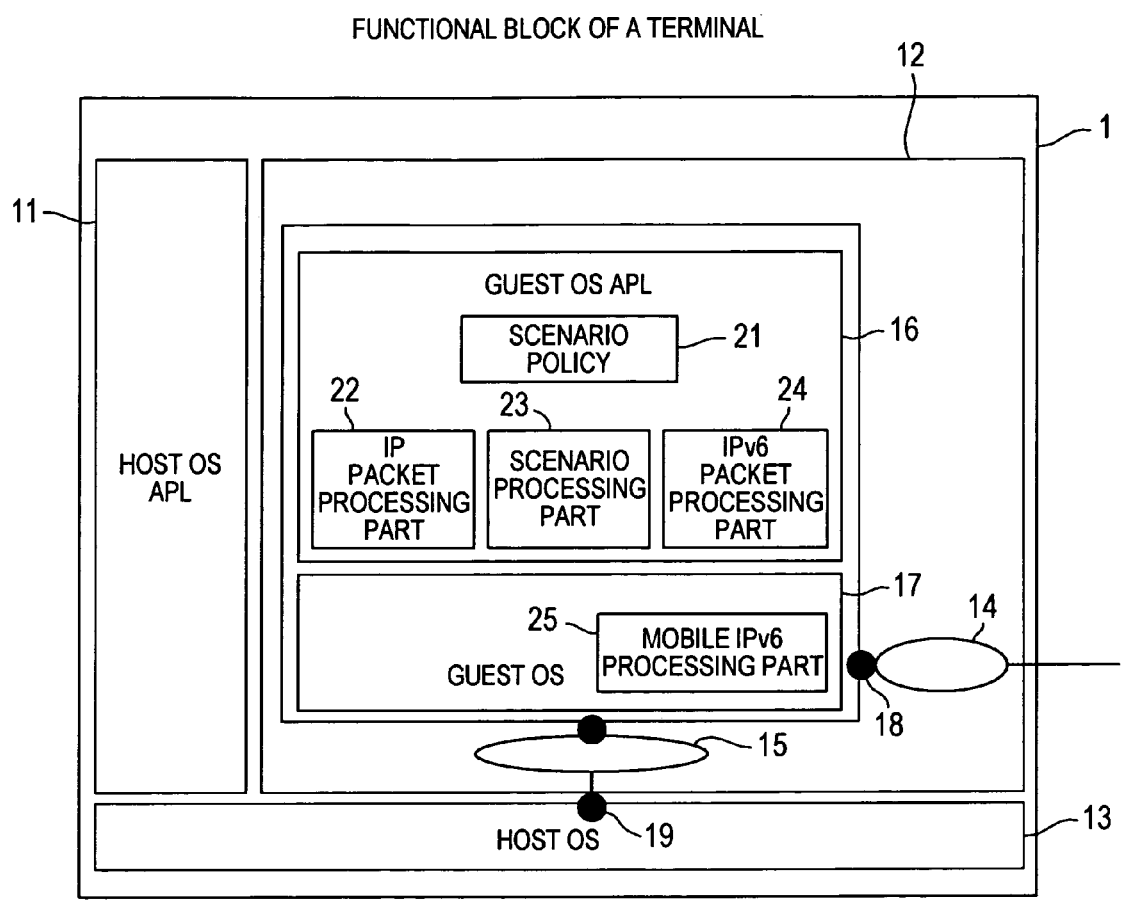
FIG. 2 is a block diagram showing of typical a mobile node MN 1.

FIG. 2 is a block diagram showing of a typical configuration of an application implemented by a program stored in typically a memory serving as a storage part employed in the MN 1. The MN 1 includes a host OS 13, an application space 11 on the host OS 13 and a virtual machine 12.

The virtual machine 12 includes a guest OS 17 and an application space 16 on the guest OS 17.

The guest OS 17 includes a IPv6 processing part 25, a virtual communication network 15 and a virtual communication network 14. The virtual communication network 15 is a network for connecting the guest OS 17 to the host OS 13. The virtual communication network 14 is a network for connecting the guest OS 17 to an external communication network. Provided with a function of an MN conforming to the Mobile IPv6 specifications, the IPv6 processing part 25 includes a binding update list management table 210 and a BA processing routine 70.

The application space 16 includes an IP-packet processing part 22, a scenario processing part 23, an IPv6-packet processing part 24 and a scenario policy 21. The IP-packet processing part 22 has a function for inputting a packet from the host OS 13 and outputting a packet thereto. The IPv6-packet processing part 24 has a function to exchange packets with an external communication network. The scenario policy 21 has a function to manage methods of communication with the MN 1. The scenario policy 21 includes a scenario policy management table 220. In this embodiment, the MN 1 includes a virtual machine. However, the MN 1 may include a program corresponding to the virtual machine in place of the virtual machine.

FIG. 3 is a diagram showing the configuration of the binding update list management table 210. For each binding update destination address 211, the binding update list management table 210 associates at least the home address 212 of the MN with a CoA acquired by the MN in a visited network. The binding update list management table 210 may also include a life time 214 showing the validity term of a binding cache. If the binding update list management table 210 includes a life time 214, the MN 1 is capable of deleting an entry with a validity term that has expired.

FIG. 4 is a diagram showing a typical configuration of a scenario policy management table 220. The scenario policy management table 220 is a table at least associating a scenario substance 222 showing the substance of scenario processing with status 223 for every scenario number 221.

Figure 5:
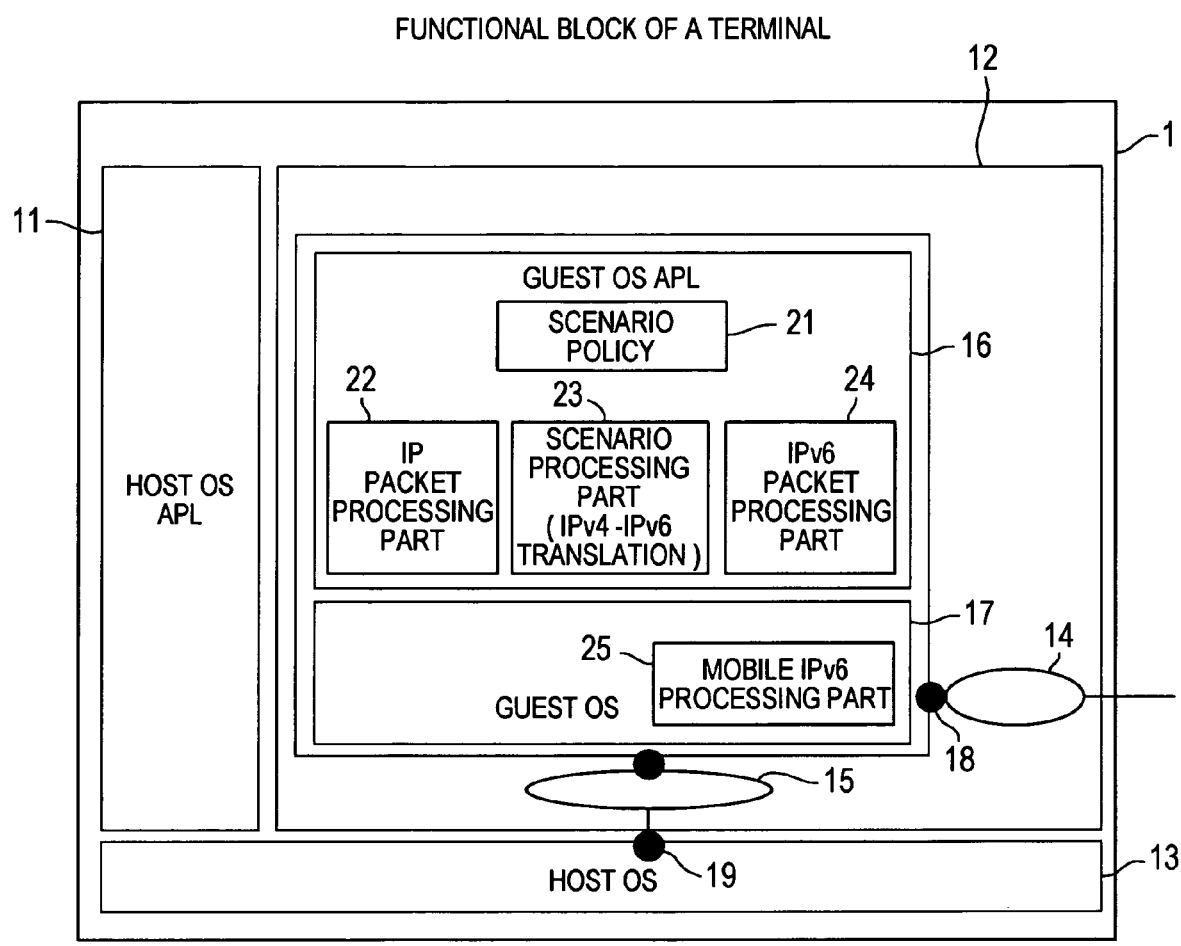
FIG. 5 is a block diagram showing of a second typical mobile node MN 1.

FIG. 5 is a block diagram showing of a second typical MN 1 having an IP-address translation function. Every configuration element shown in FIG. 5 is implemented by a program stored in a storage part such as a memory. The scenario processing part 23 has an IPv4-IPv6 translation function and an IPv4-IPv6 translation table 230. On the other hand, the IP-packet processing part 22 has an IPv4 packet input/output function.

FIG. 6 is a diagram showing a typical configuration of the IPv4-IPv6 translation table 230. The IPv4-IPv6 translation table 230 is a table at least associating every IPv6 address 231 with an IPv4 address 232. The IPv4-IPv6 translation table 230 may also includes a life time 233 for each IPv6 address 231. The life time 233 is a validity term of the translation entry. If the IPv4-IPv6 translation table 230 includes a life time 233, the MN is capable of deleting a translation entry with a validity term that has expired.

Figure 10:
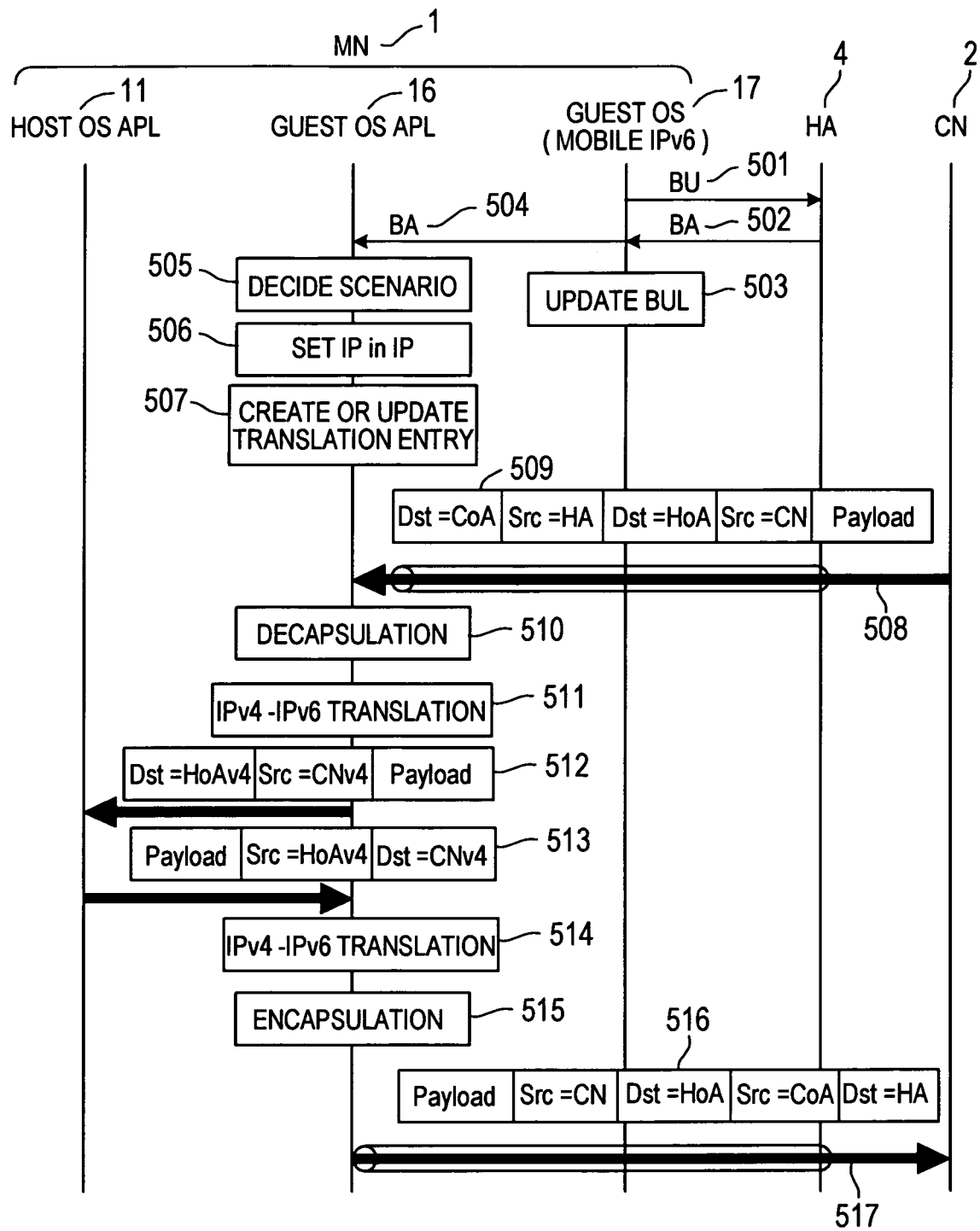
FIG. 10 is a diagram showing a sequence of binding update processes and packet transmission/reception processes according to a first embodiment.

According to a sequence shown in FIG. 10, the MN 1 existing in the visited network 5b shown in FIG. 1 registers its location in the HA 4 before exchanging a packet. The sequence shown in FIG. 10 is explained as follows.

Assume that, in the scenario policy management table 220, the entry 'IPv4-IPv6 translation (IPsec)' is effective. In this case, the IPv6-packet processing part 24 processes all packets received by the MN 1.

The MN 1 receives a router advertisement from the router 3b pertaining to the visited network 5b and acquires a CoA The MN 1 sets the Care of Address in the interface part 18 interfacing with the virtual communication network 14. That is, a program of the MN 1 holds information associating the interface part 18 with the Care of Address.

After acquiring the CoA in the visited network 5b, in a step 501, the MN 1 transmits a location-updating message (a binding update message) to the HA 4.

Receiving the binding update message, the HA 4 updates the binding information of the MN 1 and functions as a proxy of the MN 1.

Then, at the next step 502, the HA 4 transmits a binding acknowledgement to the MN 1 in response to the binding update message.

Figure 7:
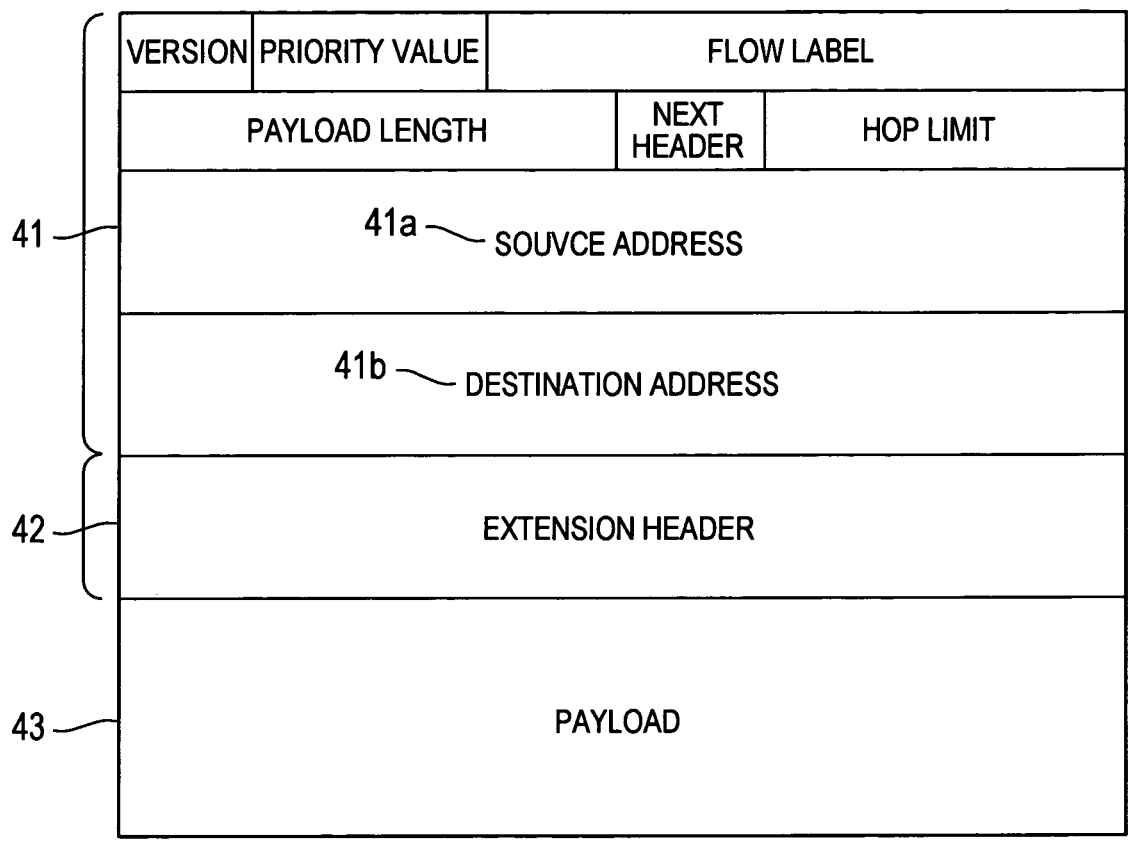
FIG. 7 is a diagram showing the format of an IPv6 packet.

FIG. 7 is a diagram showing the format of an IPv6 packet. The IPv6 packet is composed of an IPv6 basic header 41, an extension header 42 and a payload 43. The IPv6 basic header 41 includes a source address 41a and a destination address 41b.

Figure 8:
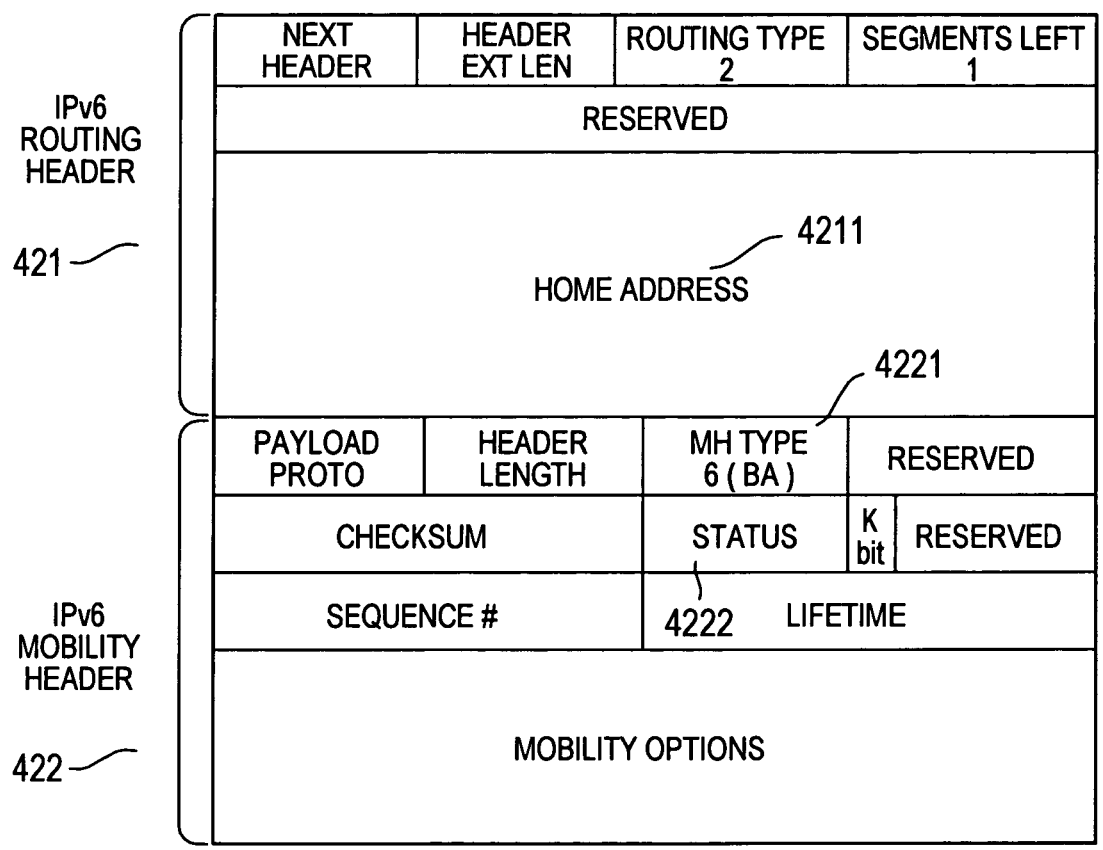
FIG. 8 is a diagram showing a typical binding acknowledgement message.
Figure 9:
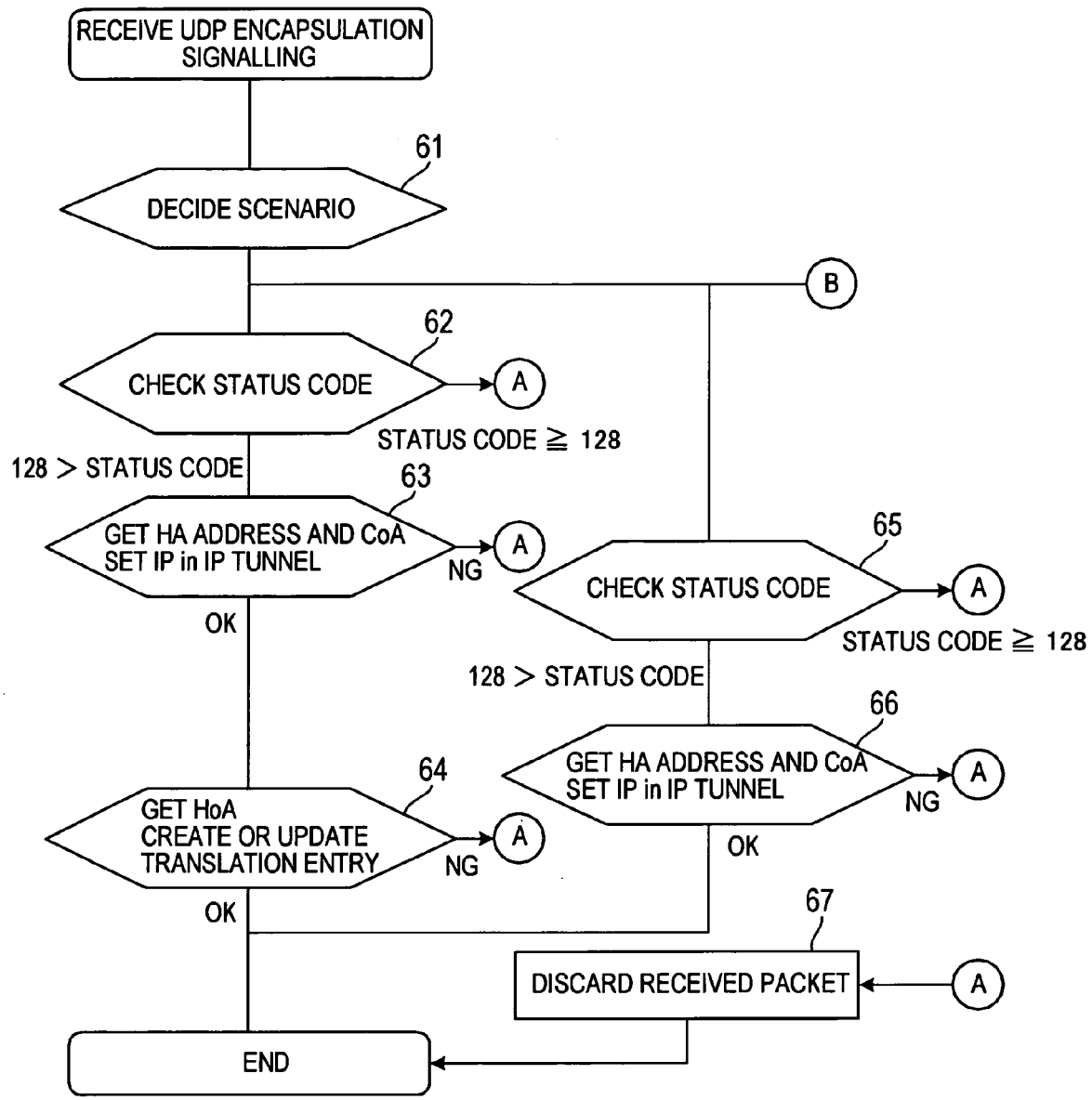
FIG. 9 is a diagram showing a BA-processing routine of a scenario-processing part employed in the mobile node MN 1.

FIG. 8 is a diagram showing a typical format S1 of the binding acknowledgement message. An IPv6 routing header 421 and an IPv6 mobility header 422 are stored in an extension header 42. The binding acknowledgement message transmitted by the HA 4 to the MN 1 is used for storing the following information. A Care of Address acquired in the visited network 5b is stored in the destination address 41b included in the IPv6 packet header. If information other than the home address of the MN 1 is stored in the destination address 41b, the home address of the MN 1 is stored in a home-address field 4211 of the IPv6 routing header 421.

Receiving the binding acknowledgement indicating that the binding update process has been completed normally, the IPv6 processing part 25 employed in the MN 1 catalogs an entry corresponding to the HA 4 in a binding update list management table in a step 503.

Figure 11:
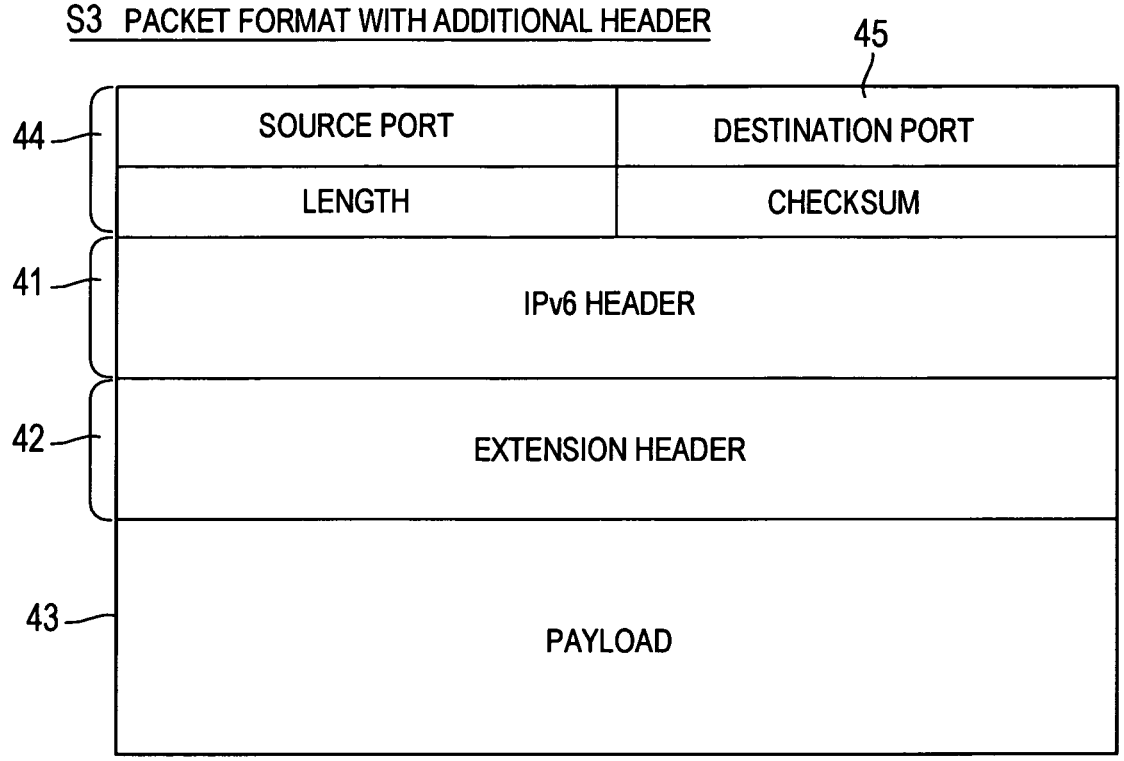
FIG. 11 is a diagram showing the format of an encapsulated packet.

The IPv6-packet processing part 24 determines that a received packet is a binding acknowledgement if the received packet includes an IPv6 mobility header 422 and a MH type 4221 of the IPv6 mobility header 422 is a code indicating a BA. Receiving the binding acknowledgement conforming to the Mobile IPv6 specifications in a step 504, the IPv6-packet processing part 24 adds a header including a scenario identifier to the input packet. The scenario identifier includes the number 10,000 set therein to indicate 'IPv4-IPv6 translation (No IPsec)'. The IPv6-packet processing part 24 then supplies the packet with the header included therein to the scenario processing part 23. FIG. 11 is a diagram showing the format of the packet with the additional header included therein. A UDP header 44 has been included in the packet. The scenario identifier is set in a destination-part field 45 of the UDP header 44.

By adding the scenario identifier to the header, the MN becomes capable of selecting a program to be activated among a plurality of programs provided in the scenario processing part 23. In addition, since it is easy to add a function to the scenario processing part 23, the extendibility of the MN 1 can be enhanced.

In steps 61 and 505, the scenario processing part 23 activates the BA processing routine 60 and decides a scenario on the basis of the scenario identifier set in the additional header and then deletes the additional header. In the case of 'IPv4-IPv6 translation (No IPsec)', first of all, a status field 4222 of the binding acknowledgement is referred to in a step 62. If the value set in the status field 4222 is smaller than 128, the scenario processing part 23 acquires an HA address and a CoA (Care of Address). The HA address is acquired from the source address 41a of the received packet. On the other hand, the Care of Address is acquired from the destination address 41b of the received packet. Then, in steps 63 and 506, IPinIP tunnel information is set in the IPv6-packet processing part 24. The IPv6-packet processing part 24 holds an interface with an IPinIP tunnel. At least, the start and end addresses of the IPinIP tunnel are associated with the interface with the IPinIP tunnel.

Then, the home address of the MN 1 is acquired. The home address of the MN 1 is acquired from the home-address field 4211 in the IPv6 routing header of the binding acknowledgement message. Then, the scenario processing part 23 searches the IPv4-IPv6 translation table 230 for an entry corresponding to the home address of the MN 1. If such an entry is found in the search process, the validity term of the entry is updated in steps 64 and 507 before terminating the execution of this routine. If such an entry is not found in the search process, on the other hand, the scenario processing part 23 selects a virtual IPv4 address from a virtual IPv4 address pool and adds a new translation entry to the IPv4-IPv6 translation table 230 as an entry associating the virtual IPv4 with the home address of the MN 1. Then, in the steps 64 and 507, the virtual IPv4 address set in the IPv4 field 232 of the translation entry is set in the interface part 19 before the execution of this routine is ended. The virtual IPv4 address pool is a collection of IPv4 addresses allocated to IP-address translation. Since a packet directed to an IPv6 address is recognized by an IPv4 network, a virtual IPv4 address is associated with the IPv6 address. A program of the MN 1 holds information associating the interface part 19 with a virtual IPv4 address.

If the value set in the status field 4222 is found in the step 62 to be at least equal to 128, on the other hand, the received packet is discarded in a step 67 and the execution of this routine is then ended. If the IPinIP tunnel information cannot be set in the step 63 or the translation entry cannot be updated in the step 64, on the other hand, the received packet is discarded in the step 67 and the execution of this routine is then ended. The HA shows the result of the binding update processing as a number set in the status field of the binding acknowledgement message. If the HA permits the binding update processing, the HA sets a value smaller than 128 in the status field of the binding acknowledgement message. If the HA does not permit the binding update processing, the HA sets a value at least equal to 128 in the Status field of the binding acknowledgement message.

The explanation of the sequence to transmit and receive a packet is continued by referring back to FIG. 10 as follows.

The CN 2 transmits a packet to the MN 1 by directing the packet to the home address of the MN 1 in a step 508. The HA 4 intercepts the packet and adds an IP header to the packet 509. In the following description, the added IP header is referred to as an outer-side IP header. In the destination address field of the outer-side IP address, the CoA acquired by the MN 1 in the visited network 5b is set. In the source address field of the outer-side IP address, on the other hand, the address of the HA 4 set.

When the IPv6-packet processing part 24 employed in the MN 1 receives the packet transmitted in the step 509, the IPv6-packet processing part 24 checks the source address in the outer-side IP header. If the source address in the outer-side IP header is the address of the HA 4, the IPv6-packet processing part 24 deletes the outer-side IP header in a decapsulation process in a step 510 and outputs the packet to the scenario processing part 23.

The scenario processing part 23 transforms the IP header of the received packet from an IPv6 header into an IPv4 header at the next step 511. First of all, the scenario processing part 23 searches the IPv4-IPv6 translation table 230 for an entry corresponding to the destination address. If such an entry is found in the IPv4-IPv6 translation table 230, the destination address is transformed from an IPv6 address into an IPv4 address on the basis of information described in the entry associating the IPv6 address with the IPv4 address. Then, the scenario processing part 23 searches the IPv4-IPv6 translation table 230 for an entry corresponding to the source address. If such an entry is found in the IPv4-IPv6 translation table 230, the source address is transformed from an IPv6 address into an IPv4 address on the basis of information described in the entry associating the IPv6 address with the IPv4 address. If such an entry is not found in the IPv4-IPv6 translation table 230, on the other hand, the scenario processing part 23 selects a virtual IPv4 address from a virtual IPv4 address pool and adds a new translation entry to the IPv4-IPv6 translation table 230 as an entry associating the virtual IPv4 address with the source address.

Then, at the next step 512, the scenario processing part 23 outputs the packet including the IPv4 header to an application 11 running on the host OS by way of the IP-packet processing part 22.

The following description explains a method adopted by the application 11 running on the host OS to transmit the packet including the IPv4 header to the CN 2. The application 11 running on the host OS transmits the packet including the IPv4 header to the CN 2 in a step 513. To put it in detail, the IP-packet processing part 22 inputs the packet and passes on it to the scenario processing part 23. First of all, the scenario processing part 23 searches the IPv4-IPv6 translation table 230 for an entry corresponding to the destination address. If such an entry is found in the IPv4-IPv6 translation table 230, the destination address is transformed from an IPv4 address into an IPv6 address on the basis of information described in the entry associating the IPv6 address with the IPv4 address. If such an entry is not found in the IPv4-IPv6 translation table 230, on the other hand, the scenario processing part 23 selects a virtual IPv6 address from a virtual IPv6 address pool and adds a new translation entry to the IPv4-IPv6 translation table 230 as an entry associating the virtual IPv6 address with the destination address.

Then, in a step 514 following the IP-header translation, the scenario processing part 23 supplies the packet to the IPv6-packet processing part 24. In a step 515, the IPv6-packet processing part 24 refers to the IPinIP tunnel information set in the step 506 to add an IP header to the packet in an encapsulation process. Subsequently, in a step 516, the IPv6-packet processing part 24 transmits the packet to the HA 4. In a step 517, the HA 4 deletes the encapsulation header from the packet and then transmits the packet to the CN 2.

According to the first embodiment of the present invention, even if the host OS of the terminal does not have the function of an MN conforming to the Mobile IPv6 specifications, a Mobile IPv6 service can be rendered to the terminal. In addition, by providing the terminal with an IP-address translation function, a Mobile IPv6 service can be rendered to the terminal in which an application does not conform to the Mobile IPv6 specifications.

Second Embodiment

Next, a second embodiment of the present invention is explained by referring to diagrams. The second embodiment is characterized in that the second embodiment includes a means for rendering a Mobile IPv6 service to a terminal, which includes an application conforming to IPv6 specifications, in addition to the means employed in the first embodiment.

Assume that, in the scenario policy management table 220, the entry 'No IPv4-IPv6 translation function and no IPsec' is effective. In this case, the IPv6-packet processing part 24 processes all packets received by the MN 1.

Figure 12:
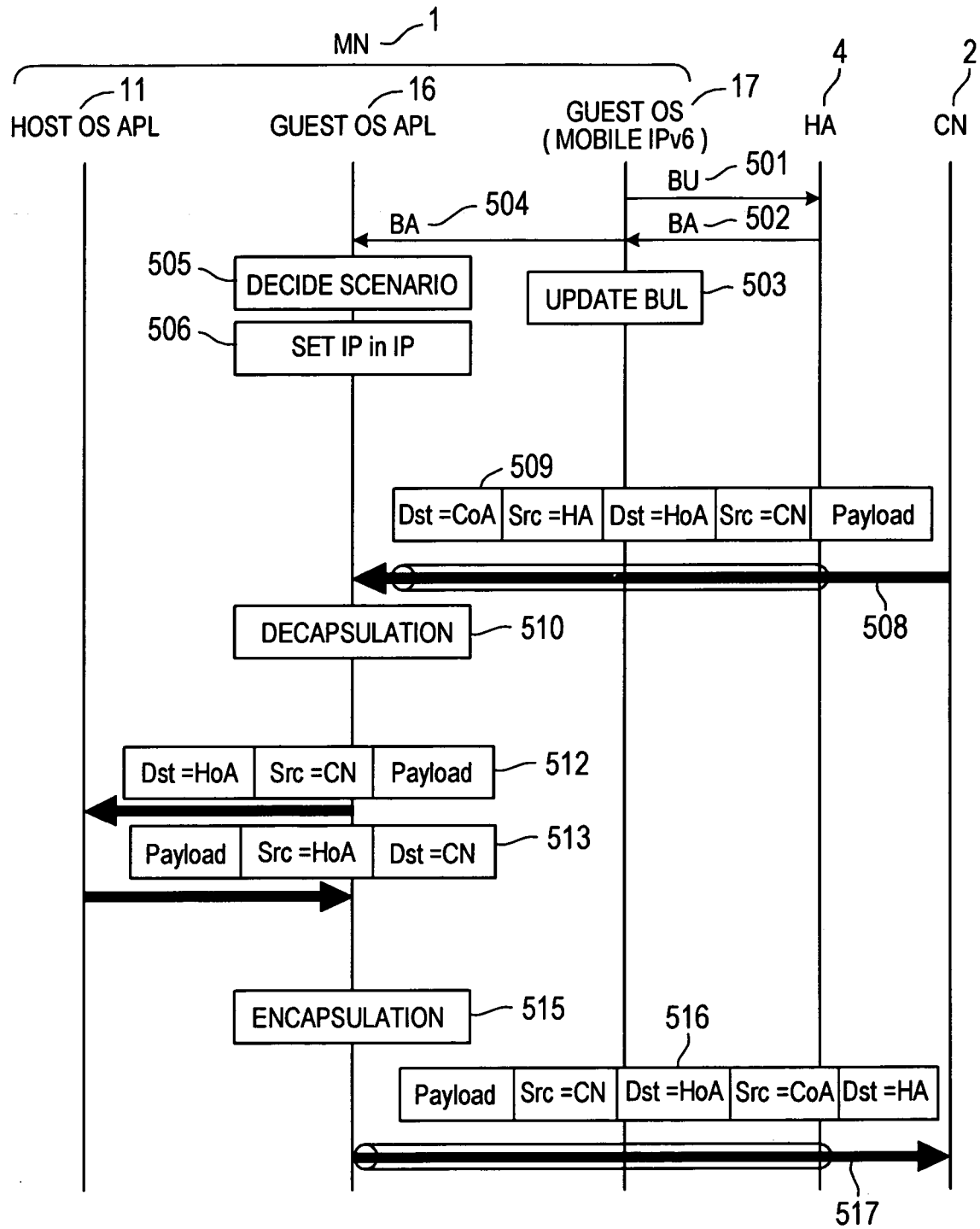
FIG. 12 is a diagram showing a sequence of binding update processes and packet transmission/reception processes according to a second embodiment.
Figure 13:
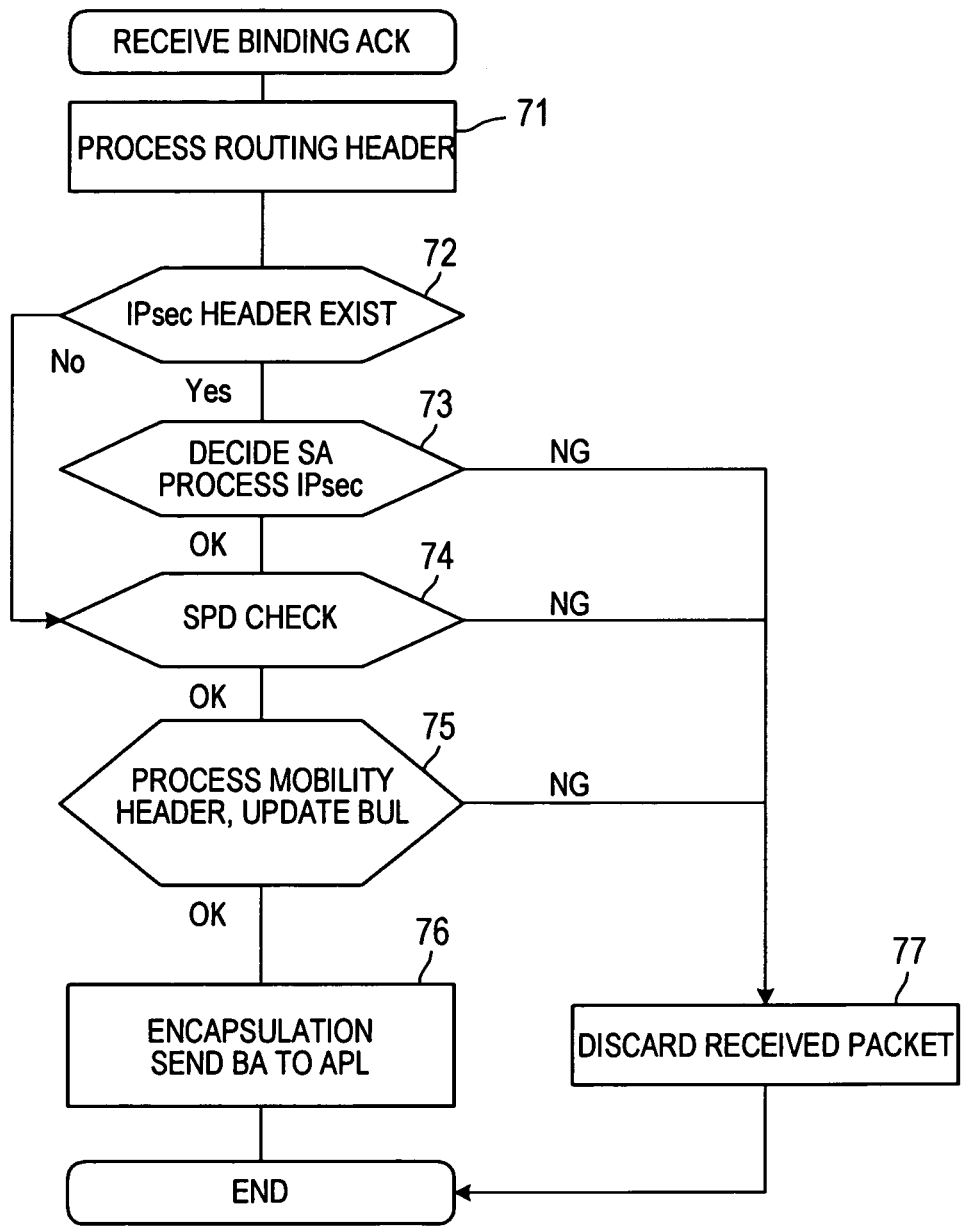
FIG. 13 is a diagram showing a BA-processing routine of a Mobile IPv6 processing part employed in the mobile node MN 1.

According to a sequence shown in FIG. 12, the MN 1 existing in the visited network 5b shown in FIG. 1 registers its location in the HA 4 before exchanging a packet. The sequence shown in FIG. 12 is explained as follows.

Processes carried out in steps 501 to 504 as processes starting with a process performed by the MN 1 to acquire a CoA in the visited network and ending with a process performed by the MN 1 to register its location are the same as those carried out at their respective counterpart steps of the first embodiment.

When the IPv6-packet processing part 24 receives a mobile-IPv6 binding acknowledgement signal, a scenario identifier is added to the received packet in the step 504. The scenario identifier includes the number 10001 set therein to indicate 'No IPv4-IPv6 translation function and no IPsec'. The IPv6-packet processing part 24 then supplies the packet with the header included therein to the scenario processing part 23.

In steps 61 and 505, the scenario processing part 23 activates the BA processing routine 60, decides a scenario on the basis of the scenario identifier set in the additional header and then deletes the additional header. In the case of 'No IPv4-IPv6 translation function and no IPsec', in the same way as the steps 62 and 63 of the first embodiment, the status field 4222 of the binding acknowledgement is checked and a IP in IP tunnel setting process is carried out in steps 66 and 506 before terminating the execution of this routine. The IP in IP tunnel setting process carried out in steps 66 and 506 is the same as that of the first embodiment.

In the interface part 19 of the host OS, the home address of the MN 1 is set. That is, a program of the MN 1 associates the home address of the MN 1 with the interface part 19.

Next, a method to receive a packet is explained. Processes carried out in steps 508 to 510 are the same as those of the first embodiment. In a step 512, the IPv6-packet processing part 24 outputs the packet to the host OS by way of the IP-packet processing part 22 without carrying out IP-address translation on the packet already subjected to a decapsulation process.

Then, a method to transmit a packet is explained. When the scenario processing part 23 receives the packet from application 11 running on the host OS, the scenario processing part 23 passes on the packet to the IPv6-packet processing part 24 in a step 513 without carrying out IP-address traslation on the packet. Processes carried out in steps 515 to 517 are the same as those of the first embodiment.

According to the second embodiment of the present invention, even if the host OS of the terminal does not have the function of an MN conforming to the Mobile IPv6 specifications, a Mobile IPv6 service can be rendered to the terminal. In addition, the home address of the MN can be set in the interface part of the host OS running on the terminal.

Third Embodiment

A third embodiment of the present invention is explained by referring to diagrams.

The third embodiment is characterized in that the third embodiment includes a means for rendering a Mobile IPv6 service to a terminal, which applies IPsec to a mobile IP signal, in addition to the means employed in the first embodiment.

IPsec is security functions used in IETF to perform standardization. To be more specific, IPsec has functions to authenticate and encrypt a packet. An IP packet to which the authentication function of IPsec has been applied has an AH (Authentication Header). On the other hand, an IP packet to which the encryption function of IPsec has been applied has an ESP (Encapsulating Security Payload) header.

According to a sequence shown in FIGS. 19 to 22, the MN 1 existing in the visited network 5b shown in FIG. 1 registers its location in the HA 4 before exchanging a packet. The sequence shown in FIGS. 19 to 22 is explained as follows.

Assume that, in the scenario policy management table 220, the entries 'IPv4-IPv6 translation' and 'IPv4-IPv6 translation and route optimization' are valid. In this case, the IPv6-packet processing part 24 processes all packets received by the MN 1.

In the third embodiment, the IPv6 processing part 25 has a BA processing routine 70 whereas the IPv6-packet processing part 24 has a packet send processing routine 100, a packet receive processing routine 120 and a binding update list management table 210.

Figure 19:
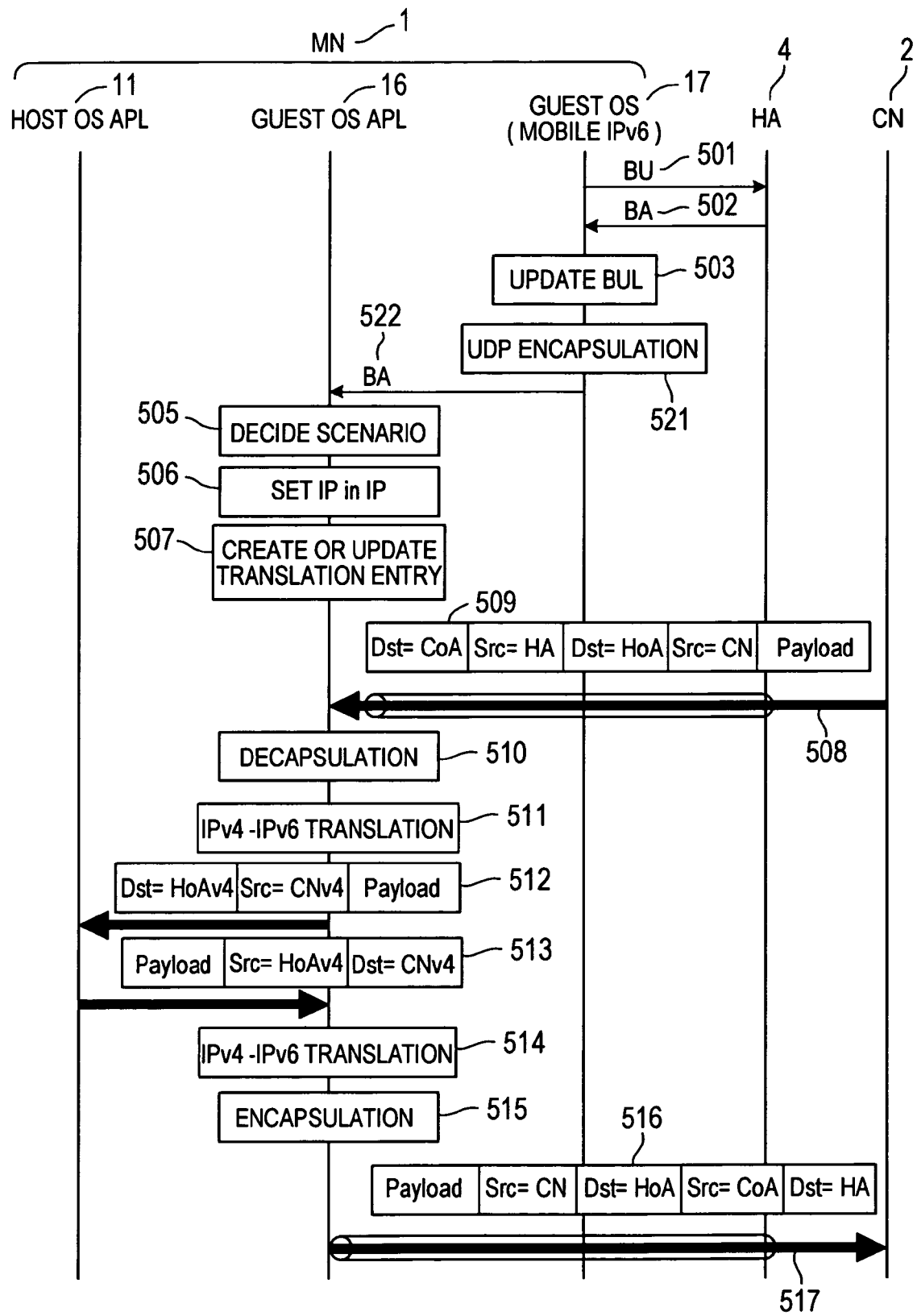
FIG. 19 is a diagram showing a first sequence of binding update processes and packet transmission/reception processes according to a third embodiment.

First of all, by referring to FIG. 19, the description explains a sequence of operations carried out by the MN 1 with its location already registered in the HA 4 to transmit and receive a packet.

Processes carried out in steps 501 and 502 as respectively a process performed by the MN 1 to acquire a CoA in the visited network and a process performed by the MN 1 to receive a binding acknowledgement message from the HA 4 are the same as those carried out at their respective counterpart steps of the first embodiment. In the third embodiment, IPsec has been applied to the binding acknowledgement message. That is, an IP packet including a binding acknowledgement message also includes at least an ESP header. This packet may also include an AH header.

Figure 14:
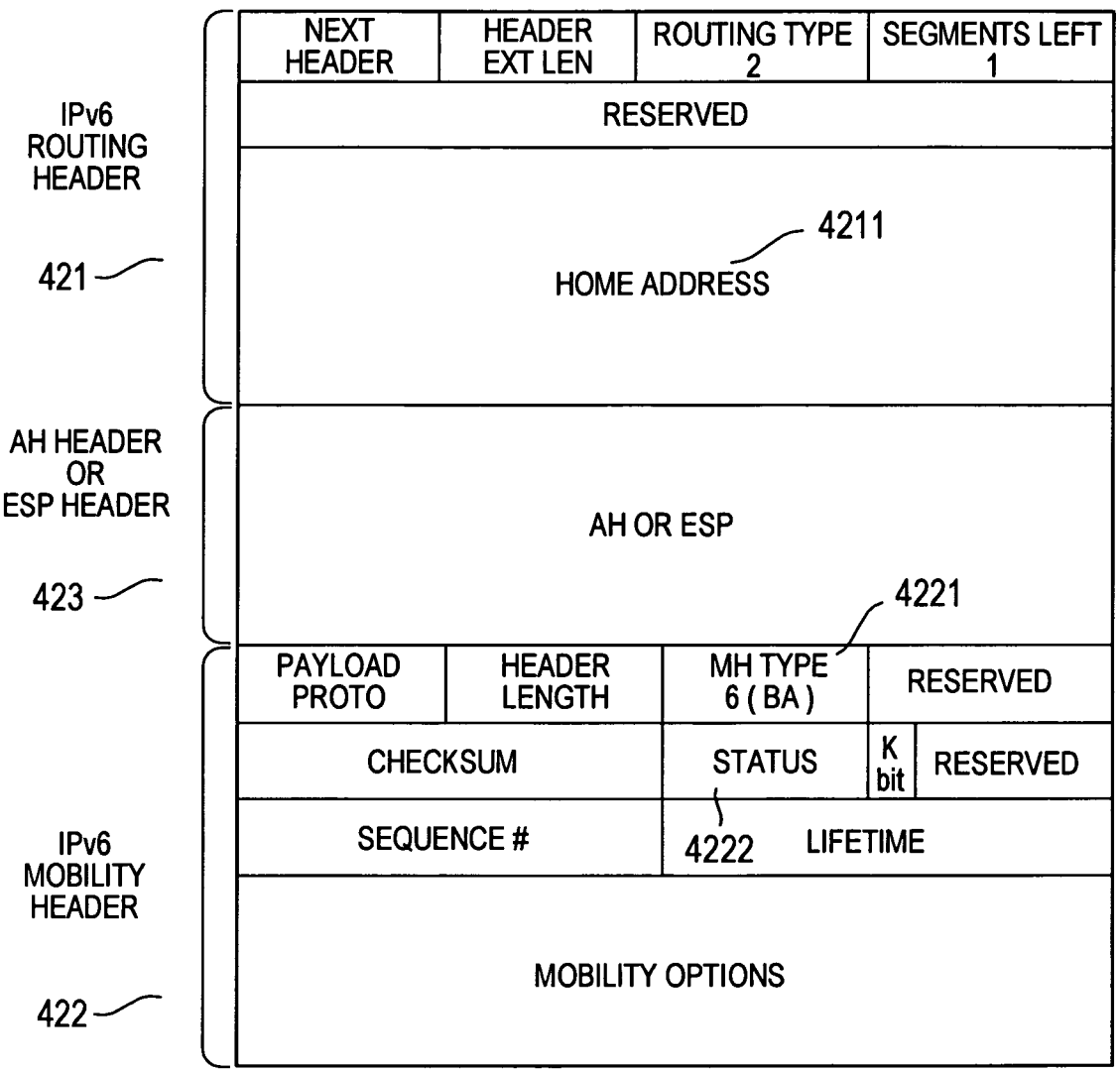
FIG. 14 is a diagram showing a typical binding acknowledgement message.

FIG. 14 is a diagram showing a typical format of the binding acknowledgement message S2. An IPsec header 423 is set between an IPv6 routing header 421 and an IPv6 mobility header 422. The IPsec header can be the AH header or the ESP header.

Receiving the binding acknowledgement message conforming to the Mobile IPv6 specifications, the IPv6 processing part 25 activates the BA processing routine 70. First of all, in a step 71, the IPv6 routing header 421 is processed. That is, an address set in the IPv6 routing header 421 as the home address 4211 of the MN 1 is replaced with a CoA set in the IPv6 destination address 41b. Then, at the next step 72, information in the next header of the IPv6 header 41 is checked in order to produce a result of determination as to whether or not the information indicates IPsec. If the result of the determination indicates that the information in the next header is IPsec, the flow of the routine goes on to a step 73 at which the SA of the IPsec header is decided and IPsec processing is carried out on the received packet. The IPsec processing is an authentication process and an encryption/decryption process. Then, at the next step 74, the SPD is checked in order to produce a result of determination as to whether or not the SPD conforms to a security policy. Later on, in steps 75 and 503, the Mobile IPv6 processing part 25 searches the binding update list management table 210 for an entry corresponding to the source address included in the binding acknowledgement message. If such an entry is found in the search operation, the entry is updated. If such an entry is not found in the search operation, on the other hand, a new entry is added to the binding update list management table 210.

Then, in steps 76, 521 and 522, the IPv6 processing part 25 supplies a packet, which is obtained as a result of adding a header including a scenario identifier to the received packet, to the scenario processing part 23 before the execution of this routine is ended. If the source address of the binding acknowledgement message is the address of the HA, the scenario number is set at 10010 indicating IPv4-IPv6 translation.

If the determination result produced in the step 72 indicates that the information in the next header is not IPsec, on the other hand, the flow of the routine goes on to a step 74.

If the IPv6 processing part 25 is not capable of deciding the SA in the step 73, the determination result produced in the step 74 indicates that the SPD does not satisfy the security policy or the binding update list management table 210 cannot be updated in the step, on the other hand, the flow of the routine goes on to a step 77 at which the received packet is discarded. Then, the execution of this routine is ended.

In steps 61 and 505, the scenario processing part 23 activates the BA processing routine 60 and decides a scenario on the basis of the identifier in the added header. Then, the scenario processing part 23 deletes the added header. In the case of 'IP4-IP6 translation, the scenario processing part 23 acquires the address of the HA as well as a Care of Address and sets IP in IP tunnel information in the IPv6-packet processing part 24 in steps 81 and 506. Then, in steps 82 and 507, the home address of the MN 1 is acquired and either a new translation entry is generated or an existing translation entry is updated. Finally, the execution of this routine is ended. The processes carried out in the steps 81 and 82 are the same as respectively those carried out in the steps 63 and 64 in the first embodiment.

If the IP in IP tunnel information cannot be set in the IPv6-packet processing part 24 in the step 81 or neither a new translation entry can be generated nor an existing translation entry can be updated in the step S82, on the other hand, the flow of the routine goes on to a step 67 at which the received packet is discarded. Then, the execution of this routine is ended.

Next, the explanation of the sequence of operations to transmit and receive a packet is continued by referring back to FIG. 19.

In a step 508, the CN 2 transmits a packet to the MN 1 by directing the packet to the home address of the MN 1. The HA 4 intercepts the packet and adds an IP header to the packet in a step 509. In the following description, the added IP header is referred to as an outer-side IP header. In the destination address field of the outer-side IP address, the CoA acquired by the MN 1 in the visited network 5b is set. In the source address field of the outer-side IP address, on the other hand, the address of the HA 4 is set.

When the IPv6-packet processing part 24 employed in the MN 1 receives the packet intercepted in the step 509, the IPv6-packet processing part 24 activates the packet-receive processing routine 120.

When the IPv6-packet processing part 24 receives the packet intercepted in the step 509, in a step 121, the IPv6-packet processing part 24 also produces a result of determination as to whether or not the MN 1 exists in the home network. Since the CoA has been acquired in the step 506, the determination result produced by the IPv6-packet processing part 24 indicates that the MN 1 exists at a location outside the home network. Then, the IPv6-packet processing part 24 refers to the value of the next header in the received packet. If the value of the next header indicates an IP header, the IPv6-packet processing part 24 refers to the source address of the outer-side IP header. If the source address of the outer-side IP header is the address of the HA 4, the IPv6-packet processing part 24 deletes the outer-side IP header in a decapsulation process in steps 128 and 510. In a step 129, the IPv6-packet processing part 24 produces a result of determination as to whether or not a security policy exists. If a security policy does not exist, the IPv6-packet processing part 24 passes on the packet to the scenario processing part 23 in a step 127. Then, the execution of this routine is ended.

If the determination result produced in the step 129 indicates that a security policy exists, on the other hand, the flow of the routine goes on to a step 126 to produce a result of determination as to whether or not the received packet satisfies the security policy. If the received packet satisfies the security policy, the value of the next header in the received packet is referred to in a step 131. If the value of the next header does not indicate an IP header, the flow of the routine goes on to the step 127 at which the received packet is passed on to the scenario processing part 23. Then, the execution of this routine is ended.

If the determination result produced in the step S126 indicates that the received packet does not satisfy the security policy, on the other hand, the flow of the routine goes on to a step 130 at which the received packet is discarded. Then, the execution of this routine is ended.

If the determination result produced in the step 128 indicates that the source address of the outer-side IP header is not the address of the HA 4, the flow of the routine goes on to a step 130 at which the received packet is discarded. Then, the execution of this routine is ended.

The processes carried out in the steps 511 and 512 are the same as those of the first embodiment.

The following description explains a method adopted by an application 11 running on the host OS to transmit a packet to the CN 2. Processes carried out in the steps 513 and 514 are the same as those of the first embodiment.

After IP-header translation carried out in the step 514, the scenario processing part 23 supplies the packet to the IPv6-packet processing part 24. The IPv6-packet processing part 24 activates the packet-send processing routine 100.

When the IPv6-packet processing part 24 receives the packet supplied in the step 514, in a step 101, the IPv6-packet processing part 24 produces a result of determination as to whether or not the MN 1 exists in the home network. Since the CoA has been acquired in the step 506, the determination result produced by the IPv6-packet processing part 24 indicates that the MN 1 exists at a location outside the home network. Then, at the next step 102, the Mobile IPv6-packet processing part 24 searches the binding update list management table 210 for an entry corresponding to the destination address 41b. If such an entry was not found in the binding update list management table 210 in the search operation, the flow of the routine goes on to a step 108 at which the IPv6-packet processing part 24 produces a result of determination as to whether or not a security policy exists. If a security policy does not exist, in steps 515 and 111, the IPv6-packet processing part 24 refers to the IP in IP tunnel information set in the step 506 and adds an IP header to the packet in an encapsulation process. Then, in a step 107, the packet is transmitted to the CN 2. Finally, the execution of this routine is ended.

Processes carried out in the steps 516 and 517 are the same as those of the first embodiment.

If the determination result produced in a step 109 indicates that the packet is a packet to be discarded or the SA cannot be detected in a step 110, the flow of the routine goes on to a step 112 at which the packet is discarded. Then, the execution of this routine is ended.

Figure 20:
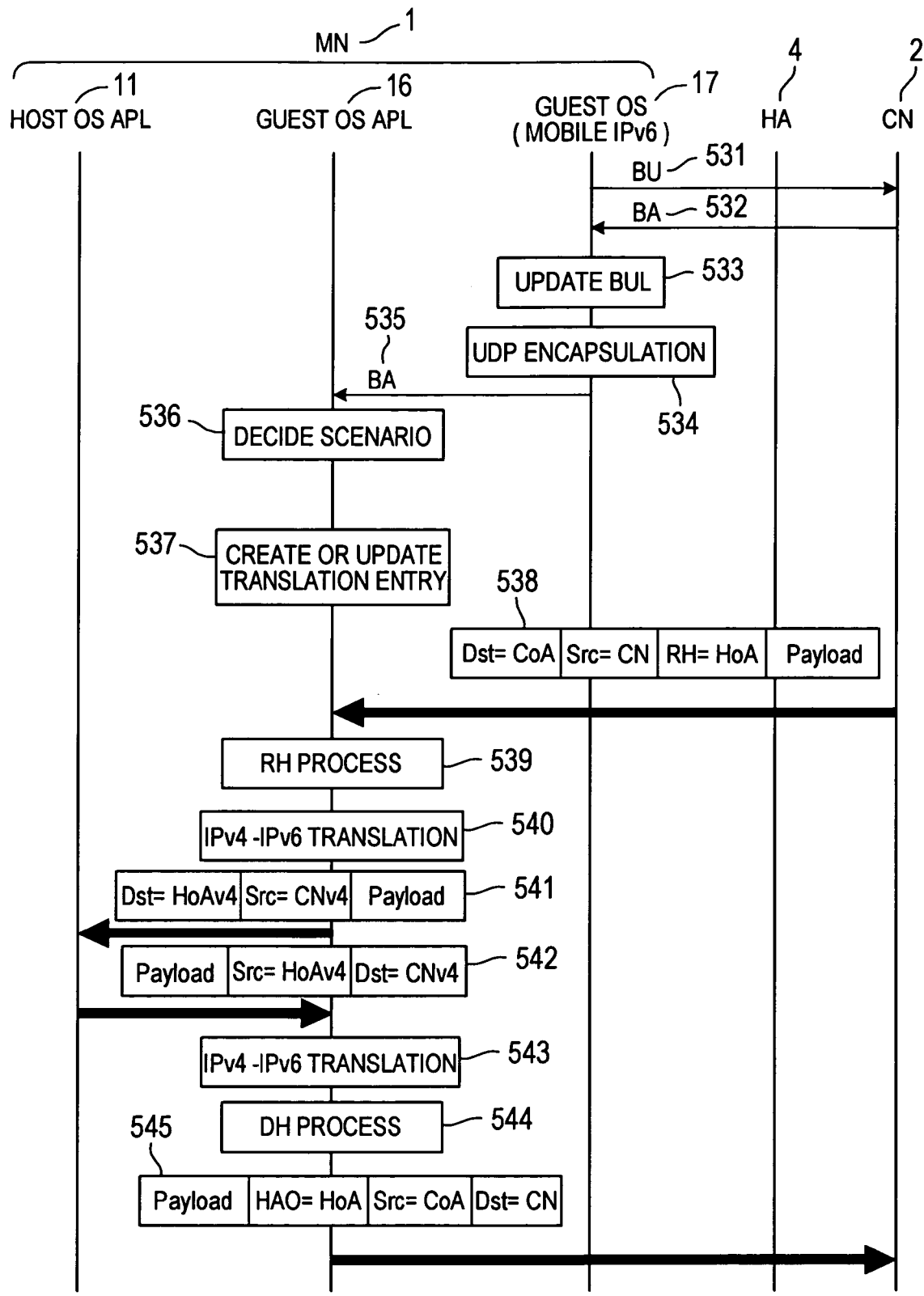
FIG. 20 is a diagram showing a second sequence of binding update processes and packet transmission/reception processes according to the third embodiment.

FIG. 20 is a diagram showing a sequence of operations to transmit and receive a packet with Mobile IPv6 route optimization applied to the route between the MN 1 and the CN 2.

In a step 531, the IPv6 processing part 25 employed by the MN 1 transmits a binding update message to the CN 2 in order to inform the CoA of the MN1. Then, at the next step 532, the MN 1 receives a binding acknowledgement message from the CN 2. The binding acknowledgement message received in the step 532 does not include IPsec.

Receiving the Mobile IPv6 binding acknowledgement message, the IPv6 processing part 25 activates the BA processing routine 70. First of all, the routing header 421 is processed in a step 71. That is, an address set in the IPv6 routing header 421 as the home address 4211 of the MN 1 is replaced with a CoA set in the IPv6 destination address 41b. Then, at the next step 72, information in the next header of the IPv6 header 41 is checked in order to produce a result of determination as to whether or not the information indicates IPsec. If the result of the determination indicates that the information in the next header does not indicate IPsec, the flow of the routine goes on to a step 74, at which the SPD is checked in order to produce a result of determination as to whether or not the SPD conforms to a security policy. Later on, in steps 75 and 533, the Mobile IPv6 processing part 25 searches the binding update list management table 210 for an entry corresponding to the source address included in the binding acknowledgement message. If such an entry has been found in the search operation, the entry is updated. If such an entry was not found in the search operation, on the other hand, a new entry is added to the binding update list management table 210.

Then, in steps 76, 534 and 535, the IPv6 processing part 25 supplies a packet, which is obtained as a result of adding a header including a scenario identifier to the received packet, to the scenario processing part 23 before the execution of this routine is ended. The source address of the binding acknowledgement message is the address of the CN and not the address of the HA. Thus, the scenario number is set at 10,011 indicating the case of 'IPv4-IPv6 translation and route optimization'.

In steps 61 and 536, the scenario processing part 23 activates the BA processing routine 60 and decides a scenario on the basis of the identifier in the added header. Then, the scenario processing part 23 deletes the added header. In the case of 'IP4-IP6 translation and route optimization', first of all, the scenario processing part 23 refers to the MH type 4221 of the binding acknowledgement message 532 in a step 83. If the MH type 4221 has a value indicating a binding acknowledgement message, the binding update list management table 210 of the IPv6-packet processing part 24 is searched for an entry corresponding to the source address of the binding acknowledgement message. If such an entry is found, the entry is updated in a step 84. If such an entry is not found, on the other hand, a new entry is added to the binding update list management table 210 in the step 84. Then, in steps 82 and 537, the home address of the MN 1 is acquired and either a new translation entry is generated or an existing translation entry is updated in steps 82 and 537. Finally, the execution of this routine is ended.

If neither a new translation entry can be generated nor an existing translation entry can be updated in the step S84, on the other hand, the flow of the routine goes on to a step 67 at which the received packet is discarded. Then, the execution of this routine is ended.

If the MH type 4221 referred to in the step 83 has a value indicating a binding error message, on the other hand, the flow of the routine goes on to a step 85 at which the entry is deleted from the binding update list management table 210. Then, the execution of this routine is ended.

Next, the explanation of the sequence of operations to transmit and receive a packet is continued by referring back to FIG. 20.

When the CN 2 transmits a packet to the MN 1, the binding cache management table is searched for an entry corresponding to the home address of the MN 1. The CN 2 has acquired the binding information for the CN 1 in a step 531. Thus, the CN 2 sets the CoA of the MN 1 at the destination address 41*b*, the home address of the MN 1 in the IPv6 routing header 421 and the address of the CN 2 at the source address 41*a* before transmitting the packet to the MN 1 in a step 538.

Receiving the packet transmitted in the step 538, the IPv6-packet processing part 24 employed in the MN 1 activates the packet-receive processing routine 120.

In a step 121, the IPv6-packet processing part 24 produces a result of determination as to whether or not the MN 1 exists in the home network. Since the CoA has been acquired in the step 506, the determination result produced by the IPv6-packet processing part 24 indicates that the MN 1 exists at a location outside the home network. Then, the IPv6-packet processing part 24 refers to the value of the next header in the received packet in order to produce a result of determination as to whether or not the value of the next header indicates a routing header. If the result of the determination indicates that the value of the next header in the next header indicates a routing header, the routing header is processed in steps 123 and 539. Then, in a step 124, the IPv6-packet processing part 24 refers to the value of the next header of the routing header in order to produce a result of determination as to whether or not the value of the next header indicates IPsec. If the result of the determination indicates that the value of the next header of the routing header indicates IPsec, the flow of the routine goes on to a step 125, at which the SA is searched for and IPsec processing is carried out. Then, the flow of the routine goes on to a step 126 to confirm a security policy. If the determination result produced in the step 124 indicates that the value of the next header of the routing header does not indicate IPsec, on the other hand, the flow of the routine goes on to a step 129 to produce a result of determination as to whether or not the security policy exists. If the security does not exist, the flow of the routine goes on to a step 127 at which the content is transferred to the scenario processing part 23. Then, the execution of this routine is ended.

If the determination result produced in the step 129 indicates that the security policy exists, the flow of the routine goes on to the step 126 to produce a result of determination as to whether or not the security policy is satisfied. If the security policy is satisfied, the flow of the routine goes on to a step 131 at which the value of the next header is checked to produce a result of determination as to whether or not the value of the next header indicates an IP header. If the value of the next header does not indicate an IP header, flow of the routine goes on to the step 127 at which the received content is transferred to the scenario processing part 23. Then, the execution of this routine is ended.

If the result of the process carried out in the step 126 indicates that the security policy is not satisfied, on the other hand, the flow of the routine goes on to a step 130 at which the received packet is discarded. Then, the execution of this routine is ended.

If the result of the process carried out in the step 125 indicates that the IPsec process is not completed normally, on the other hand, the flow of the routine goes on to the step 130 at which the received packet is discarded. Then, the execution of this routine is ended.

If the result of the process carried out in the step 123 indicates that the home address of the MN 1 is not set in the home-address field of the routing header, the flow of the routine goes on to the step 130 at which the received packet is discarded. Then, the execution of this routine is ended.

Processes carried out in steps 540 and 541 are the same as respectively the processes carried out in the steps 511 and 512 of the first embodiment.

The following description explains a method adopted by the application 11, which is running on the host OS, to transmit a packet to the CN 2. Processes carried out in steps 542 and 543 are the same as the processes carried out at respectively the steps 513 and 514 of the first embodiment.

After IP-header translation carried out in the step 543, the scenario processing part 23 supplies the packet to the IPv6-packet processing part 24. The IPv6-packet processing part 24 activates the packet-send processing routine 100.

In a step 101, the IPv6-packet processing part 24 produces a result of determination as to whether or not the MN 1 exists in the home network. Since the CoA has been acquired in the step 506, the determination result produced by the IPv6-packet processing part 24 indicates that the MN 1 exists at a location outside the home network. Then, at the next step 102, the Mobile IPv6-packet processing part 24 searches the binding update list management table 210 for an entry corresponding to the destination address 41*b*. The binding update list management table 210 includes the entry generated in the step 537. Thus, in steps 103 and 544, the IPv6-packet processing part 24 generates a home address option of a destination option header. The home address of the MN 1 is set in the home address option. On the other hand, the CoA is set in the source address 41*a* while the address of the CN 2 is set in the destination address 41*b*.

Then, the flow of the routine goes on to a step 104 to produce a result of determination as to whether or not a security policy exists. If the result of determination indicates that a security policy does not exist, the IPv6-packet processing part 24 transmits the packet to the CN 2 in steps 107 and 545. Then, the execution of this routine is ended.

If the determination result produced in the step 104 indicates that a security policy exists, on the other hand, the flow of the routine goes on to a step 105 at which the security policy of the transmitted packet is decided. If IPsec is applied, the flow of the routine goes on to a step 106 at which the IPv6-packet processing part 24 searches for an SA and carries out an IPsec process. Then, in a step 107, the IPv6-packet processing part 24 transmits the packet to the CN 2. Finally, the execution of this routine is ended.

If the result of the process carried out in the step 105 indicates that the packet is a packet to be discarded or the SA cannot be found in the step 106, on the other hand, the flow of the routine goes on to a step 112 at which the IPv6-packet processing part 24 discards the received packet. Then, the execution of this routine is ended.

Figure 21:
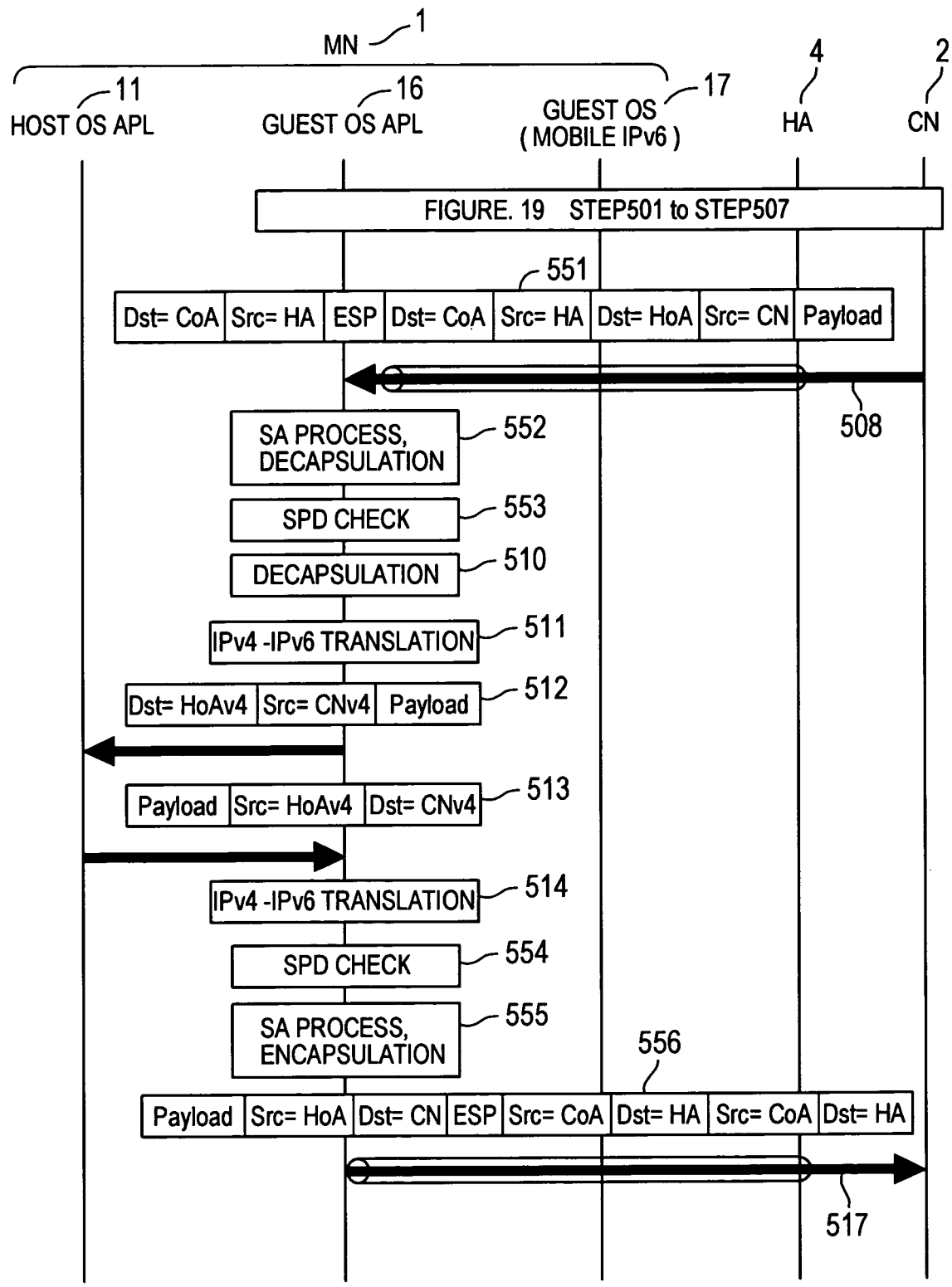
FIG. 21 is a diagram showing a third sequence of binding update processes and packet transmission/reception processes according to the third embodiment.

By referring to FIG. 21, the following description explains a sequence of operations carried out by the MN 1 with its location registered in the HA 4 to transmit and receive a packet through an IPsec mobile IP tunnel.

Processes carried out in steps 501 to 507 are the same as those explained earlier by referring to FIG. 19.

In a step 508, the CN 2 transmits a packet to the MN 1 by directing the packet to the home address of the MN 1. The HA 4 intercepts the packet and adds a mobile tunnel header and an IP header having an IPsec function (IPsec mode) to the packet in a step 551. In the destination-address fields of the mobile tunnel header and the IP header having an IPsec function, the CoA acquired by the MN 1 in the visited network 5*b* is set. In the source-address fields of the mobile tunnel header and the IP header having an IPsec function, on the other hand, the address of the HA 4 is set.

Receiving the packet transmitted in the step 551, the IPv6-packet processing part 24 employed in the MN 1 activates the packet-receive processing routine 120.

In a step 121, the IPv6-packet processing part 24 produces a result of determination as to whether or not the MN 1 exists in the home network. Since the CoA has been acquired in the step 506, the determination result produced by the IPv6-packet processing part 24 indicates that the MN 1 exists at a location outside the home network. Then, the IPv6-packet processing part 24 refers to the value of the next header in the received packet in order to produce a result of determination as to whether or not the value of the next header indicates IP sec. If the result of the determination indicates that the value of the next header in the next header indicates IP sec, in steps 125 and 552, the SA is searched for and IPsec processing is carried out. Then, the outer-side IP header is deleted in a decapsulation process or an IPsec tunnel-mode process. Subsequently, in steps 126 and 553, the content is checked to produce a result of determination whether or not the content satisfies a security policy. If the content satisfies the security policy, the value of the next header of the packet already subjected to the IPsec process is checked.

If the value of the next header indicates an IP header, a process of a step 128 is activated. First of all, the source address of the outer-side IP header is checked. If the source address of the outer-side IP header is the address of the HA 4, in a step 510, the IPv6-packet processing part 24 deletes the outer-side IP header in a decapsulation process. Then, the flow of the routine goes on to a step 129 to produce a result of determination as to whether or not a security policy exists. If the result of determination indicates that a security policy does not exist, the flow of the routine goes on to a step 127 at which the IPv6-packet processing part 24 transfers the packet to the scenario processing part 23. Then, the execution of this routine is ended.

If the value of the next header does not indicate an IP header, on the other hand, the flow of the routine goes on to the step 127 at which the IPv6-packet processing part 24 transfers the packet to the scenario processing part 23. Then, the execution of this routine is ended.

If the determination result produced in the step 126 indicates that the content does not satisfy the security policy, on the other hand, the flow of the routine goes on to a step 130 at which the received packet is discarded. Then, the execution of this routine is ended.

If the SA cannot be found in the step 125, on the other hand, the flow of the routine goes on to the step 130 at which the received packet is discarded. Then, the execution of this routine is ended.

Processes carried out in steps 511 and 512 are the same as those of the first embodiment.

The following description explains a method adopted by the application 11, which is running on the host OS, to transmit a packet to the CN 2. Processes carried out in steps 513 and 514 are the same as those carried out at their respective counterpart steps of the first embodiment.

After IP-header translation carried out in the step 514, the scenario processing part 23 supplies the packet to the IPv6-packet processing part 24. The IPv6-packet processing part 24 activates the packet-send processing routine 100.

When the IPv6-packet processing part 24 receives the packet supplied in the step 514, in a step 101, the IPv6-packet processing part 24 produces a result of determination as to whether or not the MN 1 exists in the home network. Since the CoA has been acquired in the step 506, the determination result produced by the IPv6-packet processing part 24 indicates that the MN 1 exists at a location outside the home network. Then, at the next step 102, the Mobile IPv6-packet processing part 24 searches the binding update list management table 210 for an entry corresponding to the destination address 41*b*. If such an entry was not found in the binding update list management table 210 in the search operation, the flow of the routine goes on to a step 108 at which the IPv6-packet processing part 24 produces a result of determination as to whether or not a security policy exists.

If a security policy exists, in steps 109 and 554, the security policy of the transmitted packet is decided. If IPsec is applied, in steps 110 and 555, the IPv6-packet processing part 24 searches for an SA and carries out an IPsec process (or a process in an IPsec tunnel mode) and a mobile IP decapsulation process. Then, in steps 107 and 556, the IPv6-packet processing part 24 transmits the packet to the CN 2. Finally, the execution of this routine is ended.

Figure 22:
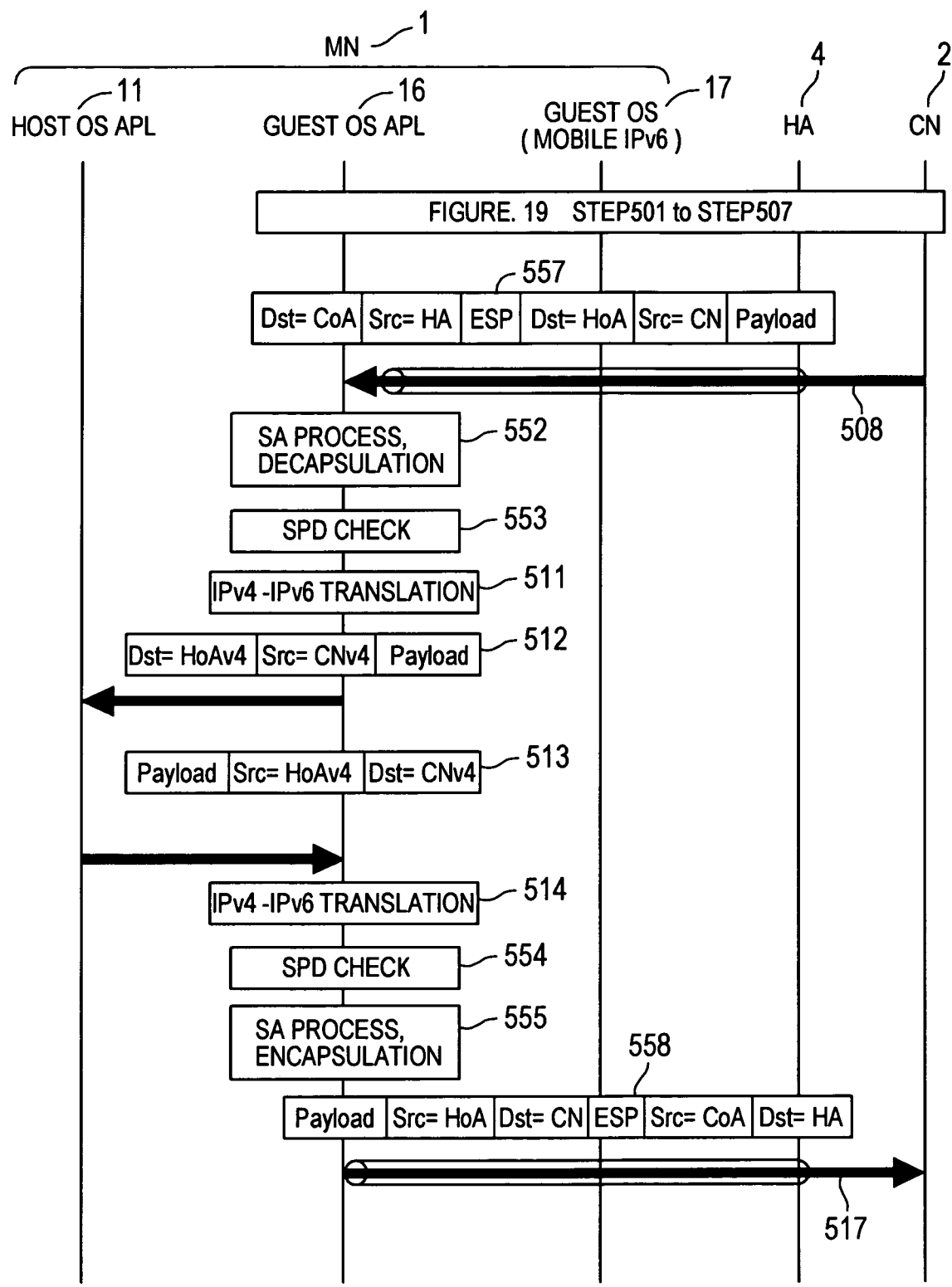
FIG. 22 is a diagram showing a fourth sequence of binding update processes and packet transmission/reception processes according to the third embodiment.

By referring to FIG. 22, the following description explains a second sequence of operations carried out by the MN 1 with its location registered in the HA 4 to transmit and receive a packet through an IPsec mobile IP tunnel.

The format of a packet exchanged between the HA and the MN in the operation sequence shown in FIG. 22 is different from the format of a packet exchanged between the HA and the MN in the operation sequence shown in FIG. 21.

If the source and destination addresses in the mobile tunnel header are the same as respectively the source and destination addresses in the IP header with an IPsec function (or the IP header in an IPsec tunnel mode), the HA 4 in the operation sequence shown in FIG. 22 intercepts a packet directed to the MN and adds only the IP header with an IPsec function (or the IP header in an IPsec tunnel mode) to the packet as a step 557.

In the destination-address field of the IP header with an IPsec function, the CoA acquired by the MN in the visited network 5*b* is set. In the source-address field of the IP header with an IPsec function, on the other hand, the address of the HA 4 is set.

Receiving the packet transmitted in the step 557, the IPv6-packet processing part 24 employed in the MN 1 activates the packet-receive processing routine 120.

Processes carried out in steps 552 and 553 (and steps 121, 122, 125 and 126) are the same as those carried out at their respective counterpart steps shown in FIG. 21.

Since the determination result produced in the step 131 indicates that the value of the next header does not indicate an IP header, in the step 127, the IPv6-packet processing part 24 submits the packet to the scenario processing part 23. Then, the execution of this routine is ended.

Processes carried out in steps 511 and 512 are the same as those carried out at their respective counterpart steps of the first embodiment.

The following description explains a method adopted by the application 11, which is running on the host OS, to transmit a packet to the CN 2. Processes carried out in steps 513 and 514 are the same as those carried out at their respective counterpart steps of the first embodiment.

After IP-header translation carried out in the step 514, the scenario processing part 23 supplies the packet to the IPv6-packet processing part 24. The IPv6-packet processing part 24 activates the packet-send processing routine 100.

Processes carried out in steps 554 and 555 (and steps 101, 102, 108 and 109) are the same as those carried out at their respective counterpart steps shown in FIG. 21.

If the source and destination addresses in the mobile tunnel header are the same as respectively the source and destination addresses in the IPsec tunnel mode IP header, in steps 110 and 555, the MN searches for an SA and carries out an IPsec process (or a process in an IPsec tunnel mode) only. Then, in steps 107 and 558, the IPv6-packet processing part 24 transmits the packet to the CN 2. Finally, the execution of this routine is ended.

According to the third embodiment of the present invention, even if the host OS of the terminal is not provided with an MN function conforming to Mobile IPv6 specifications, after the Mobile IPv6 processing part carries out a Mobile IPv6 process, by activating a scenario of the guest OS, it is possible to provide the terminal with a Mobile IPv6 service applying IPsec.

In addition, by providing the IPv6-packet processing part of the guest OS with a binding update list, it is possible to provide the terminal with a Mobile IPv6 route optimization service.

Further, it is also possible to apply IPsec to a mobile tunnel between the terminal and the HA and render a highly safe service.

Furthermore, if the source and destination addresses in the header for the mobile tunnel are the same as respectively the source and destination addresses for IPsec, the header for the mobile tunnel can be eliminated so that the service can be rendered with a higher degree of efficiency.

Fourth Embodiment

A fourth embodiment of the present invention is explained by referring to diagrams.

The fourth embodiment is characterized in that the fourth embodiment includes a means for rendering a Mobile IPv6 service to a terminal, which utilizes applications conforming to IPv6, in addition to the means employed in the third embodiment.

In the scenario policy management table 220 of the fourth embodiment, the entry 'No IPv4-IPv6 translation' or the entry 'No IPv4-IPv6 translation and with route optimization' is effective.

Figure 15:
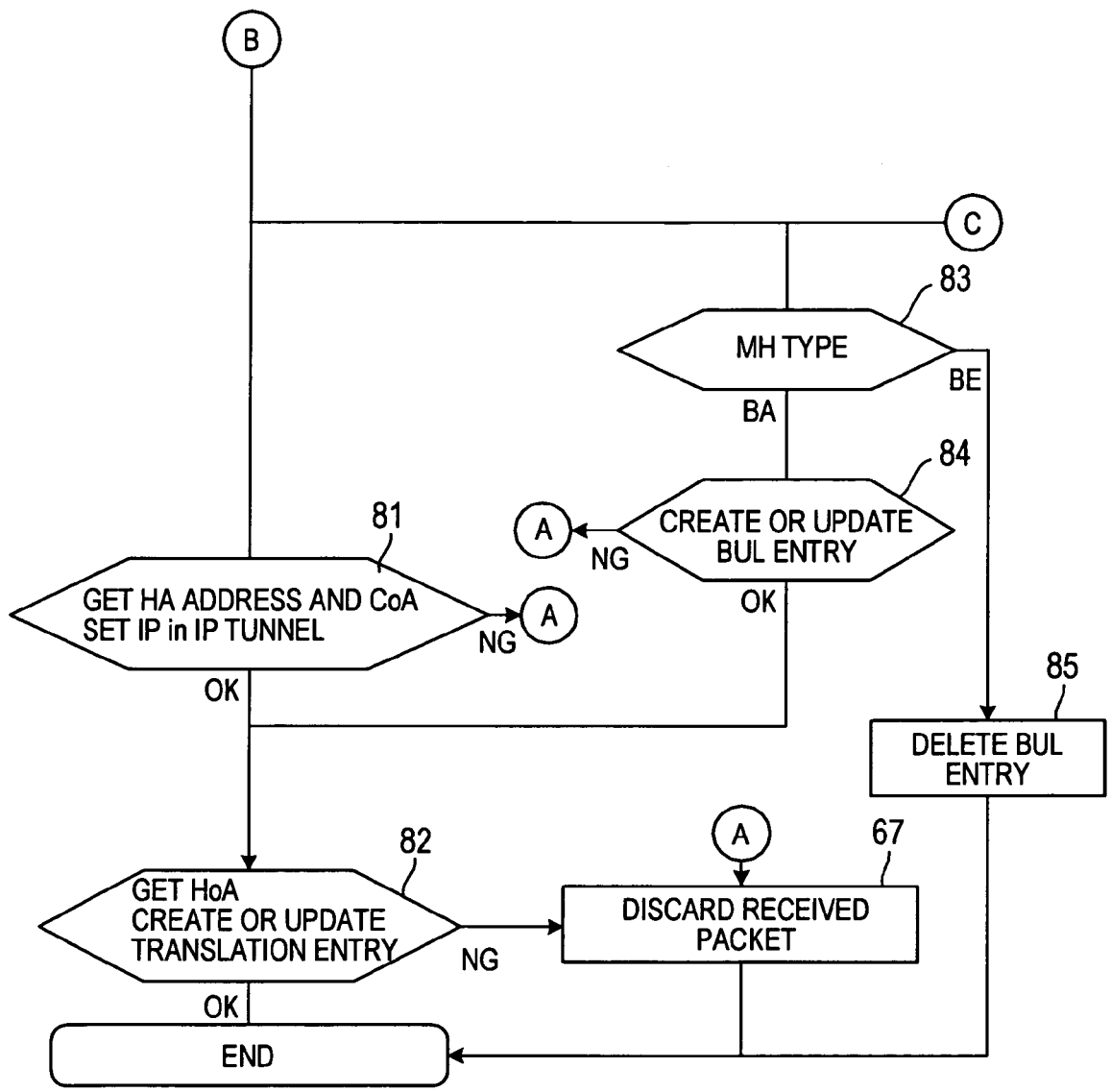
FIG. 15 is a diagram showing a second BA-processing routine of a scenario-processing part employed in the mobile node MN 1.
Figure 16:
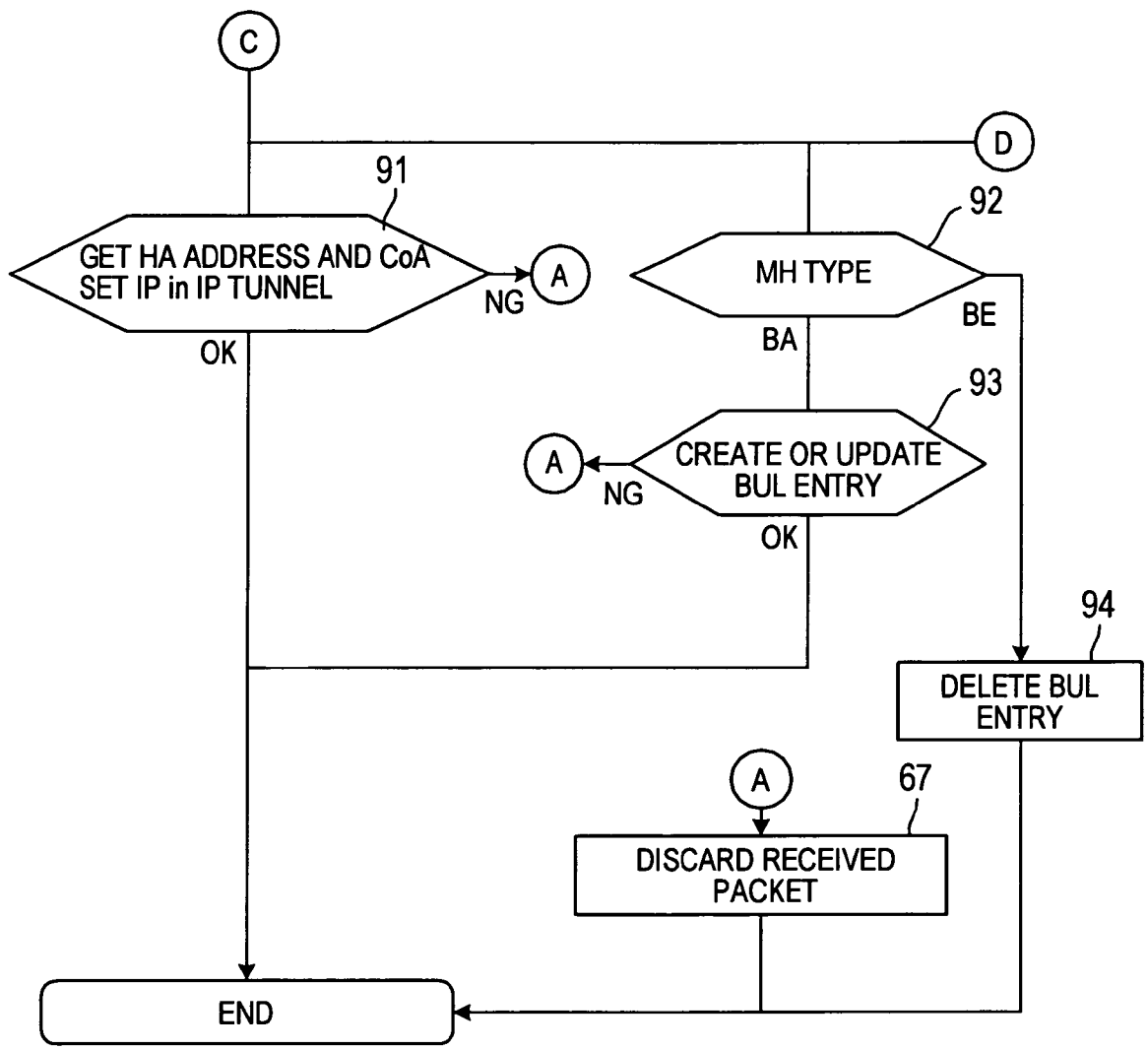
FIG. 16 is a diagram showing a third BA-processing routine of a scenario-processing part employed in the mobile node MN 1.
Figure 17:
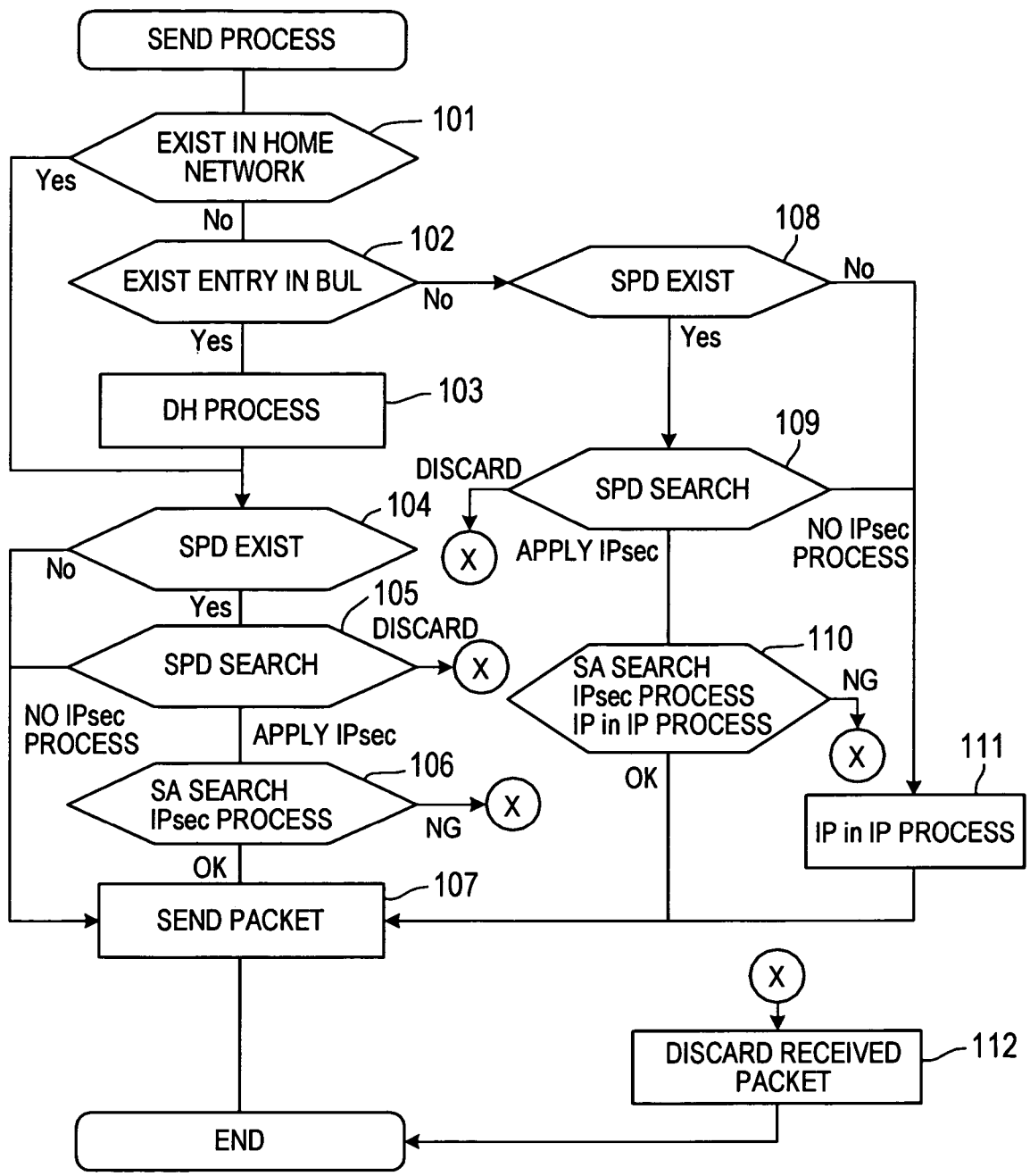
FIG. 17 is a diagram showing a packet transmission processing routine of a Mobile IPv6 processing part employed in the mobile node MN 1.
Figure 18:
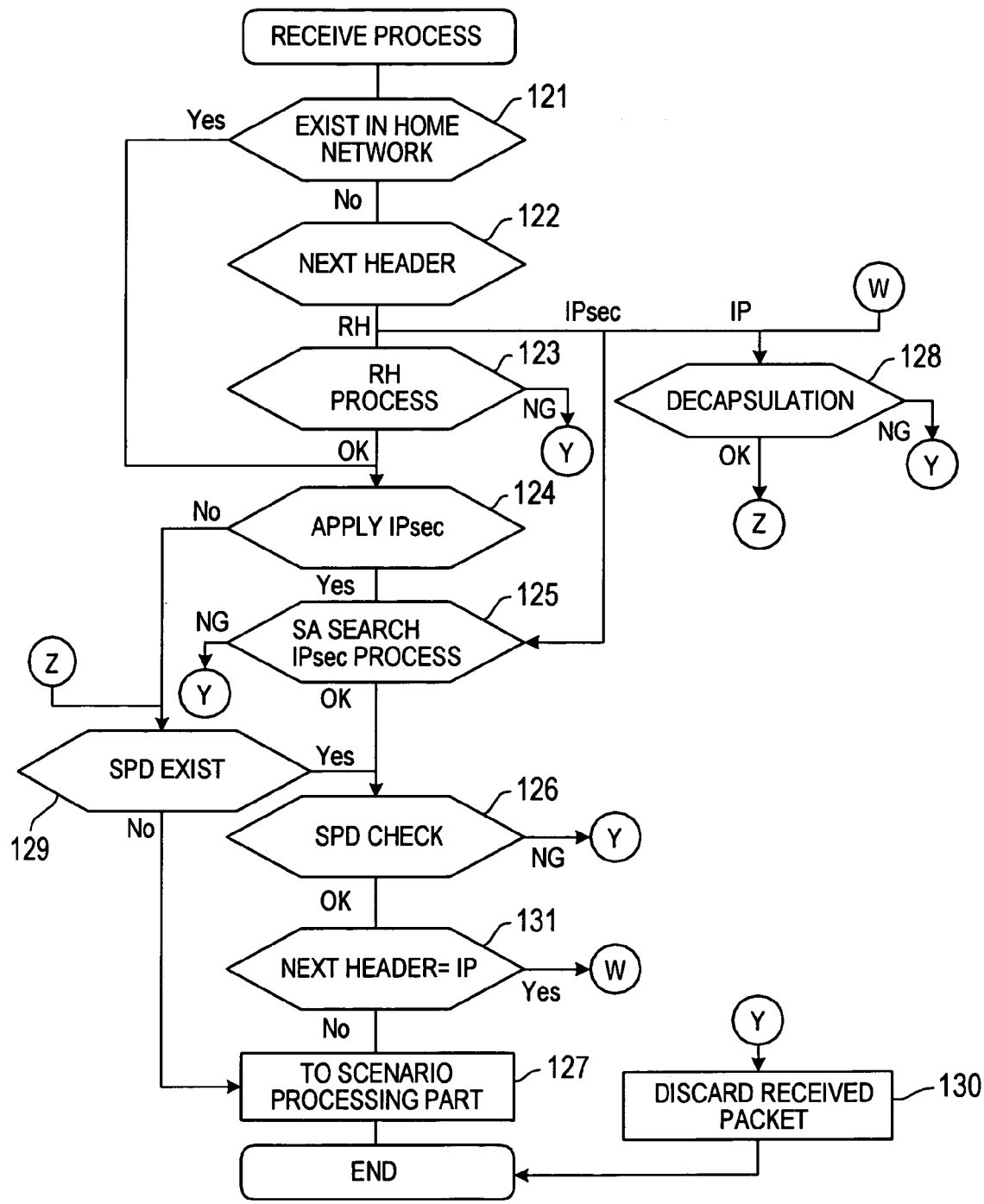
FIG. 18 is a diagram showing a packet reception processing routine of a Mobile IPv6 processing part employed in the mobile node MN 1.

In the fourth embodiment, the scenario processing part 23 activates the BA processing routine shown in FIG. 16. The BA processing routine shown in FIG. 16 is different from the routine shown in FIG. 15 in that the BA processing routine shown in FIG. 16 does not have the step of updating a translation entry. Steps 91 to 94 are the same as the step 81 and the steps 83 to 85 of the third embodiment.

According to the fourth embodiment of the present invention, even if the host OS of the terminal utilizing an application conforming to Mobile IPv6 specifications is not provided with an MN function conforming to Mobile IPv6 specifications, after the Mobile IPv6 processing part carries out a Mobile IPv6 process, by activating a scenario of the guest OS, it is possible to provide the terminal with a Mobile IPv6 service applying IPsec to a Mobile IPv6 signal.

In addition, by providing the IPv6-packet processing part of the guest OS with a binding update list, it is possible to provide the terminal with a Mobile IPv6 route optimization service.

Further, it is also possible to apply IPsec to a mobile tunnel between the terminal and the HA and render a highly safe service.

Furthermore, if the source and destination addresses in the header for the mobile tunnel are the same as respectively the source and destination addresses for IPsec, the header for the mobile tunnel can be eliminated so that the service can be rendered with a higher degree of efficiency.

Fifth Embodiment

A fifth embodiment of the present invention is explained by referring to diagrams. The fifth embodiment is characterized in that the fifth embodiment includes a means for utilizing a VoIP service adopting an SIP conforming to IPv6 specifications in the terminal in addition to the means employed in the fourth embodiment. In the scenario policy management table 220 of the fifth embodiment, the entry 'No IPv4-IPv6 translation' or the entry 'No IPv4-IPv6 translation and with route optimization' is effective.

Figure 23:
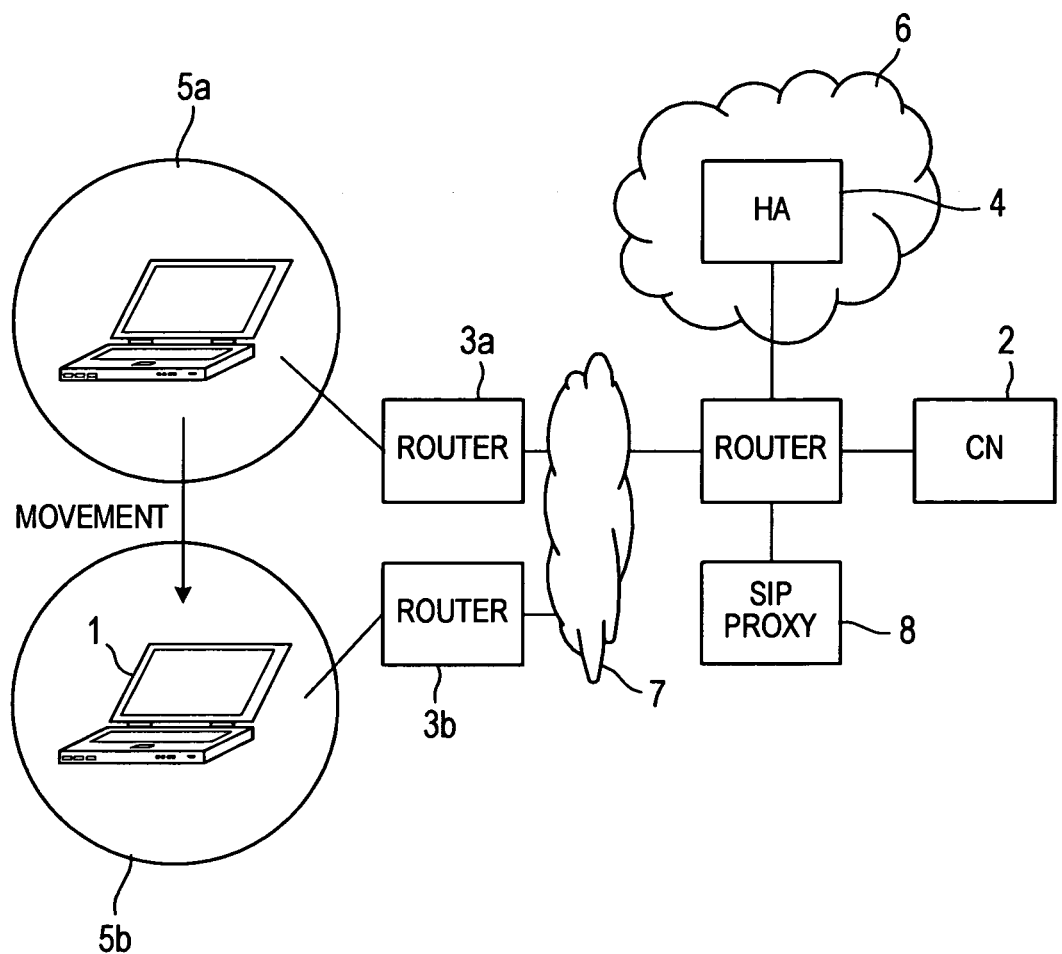
FIG. 23 is a diagram showing a typical configuration of a communication network according to a fifth embodiment.

FIG. 23 is a diagram showing a typical configuration of a communication network according to the fifth embodiment of the present invention. An SIP proxy 8 is connected to a router.

Figure 24:
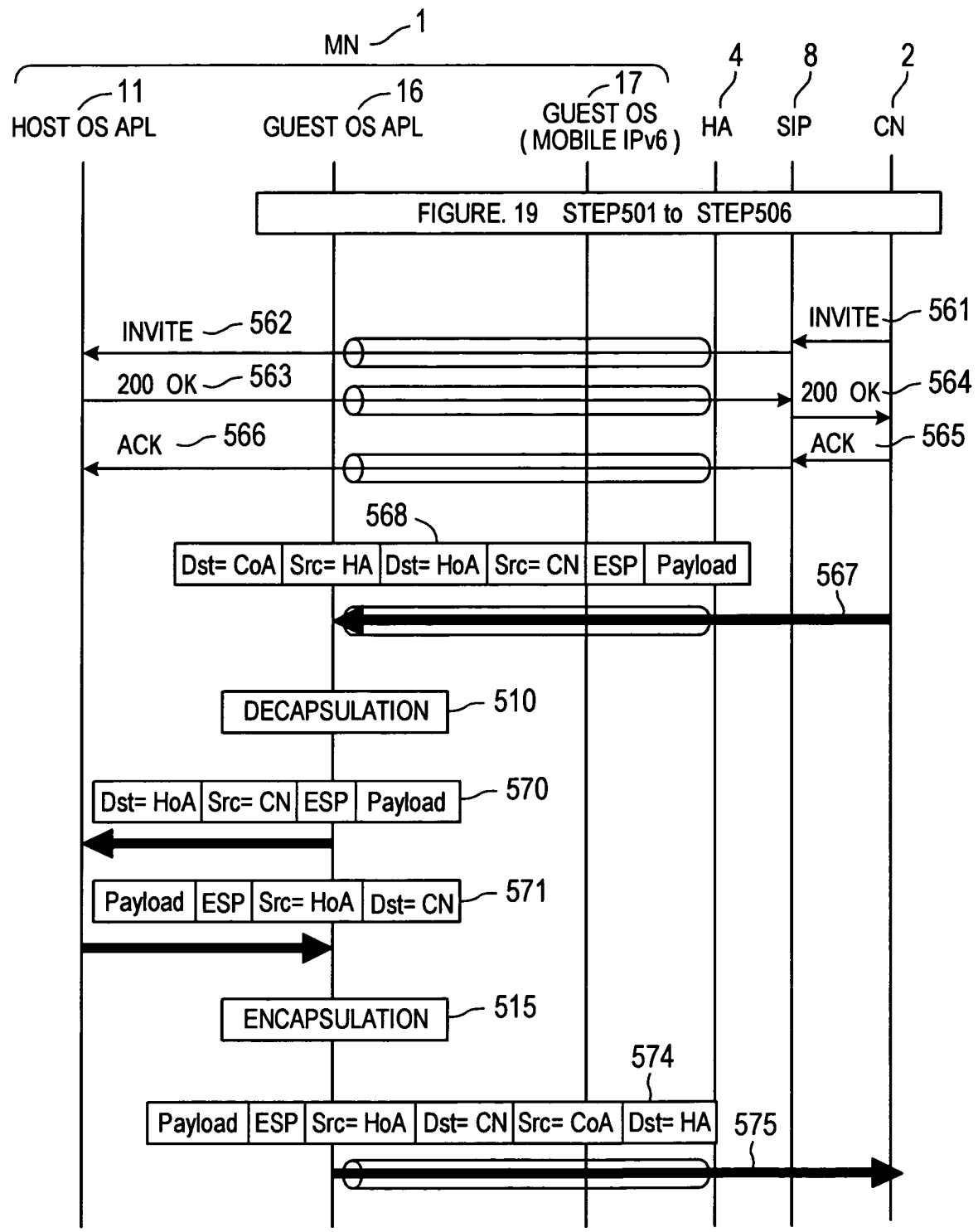
FIG. 24 is a diagram showing a first sequence of binding update processes and packet transmission/reception processes according to the fifth embodiment.
Figure 25:
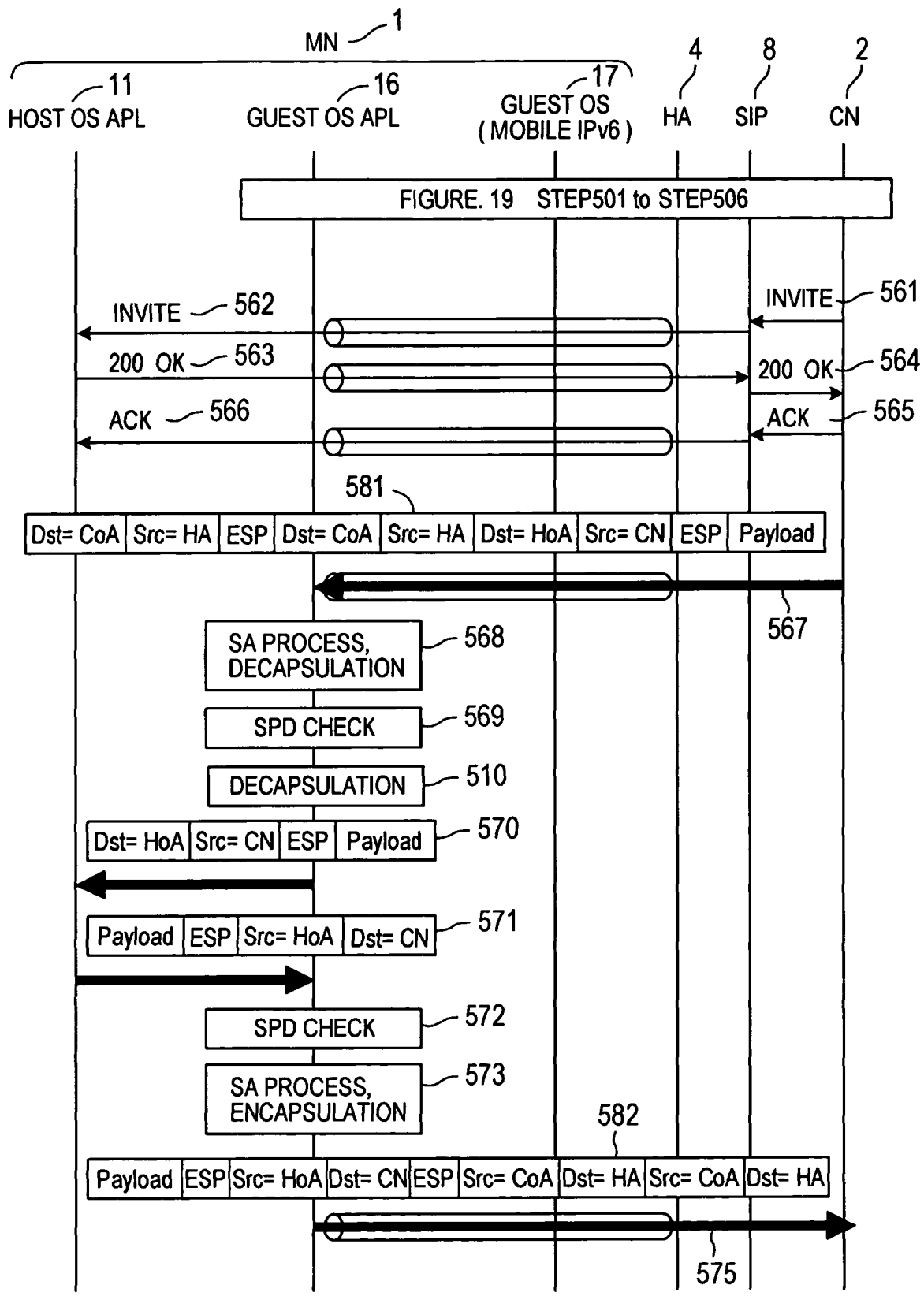
FIG. 25 is a diagram showing a second sequence of binding update processes and packet transmission/reception processes according to the fifth embodiment.
Figure 26:
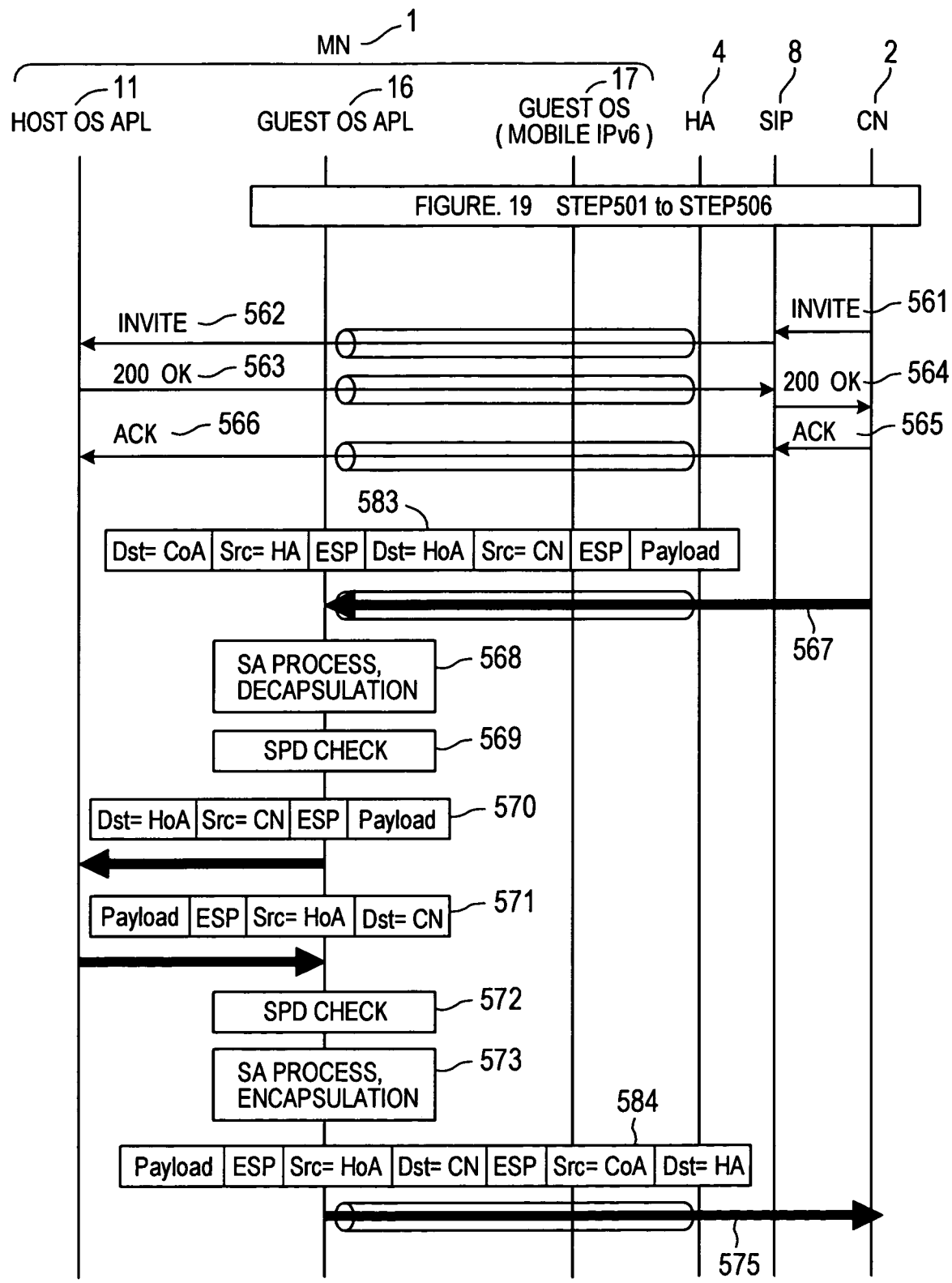
FIG. 26 is a diagram showing a third sequence of binding update processes and packet transmission/reception processes according to the fifth embodiment.

FIGS. 24, 25 and 26 are diagrams each showing a communication sequence of the MN 1 in the fifth embodiment.

FIG. 24 is a diagram showing a sequence of communications carried out by the MN1 with IPsec applied to audio packets exchanged between terminals.

Since steps 501 to 506 are the same as their respective counterpart steps shown in FIG. 19, only processes carried out in a step 561 and subsequent steps are explained.

In steps 561 and 562, the CN 2 transmits an SIP invite message to the MN 1 by way of the SIP proxy 8. An application running on the host OS of the MN 1 receives the SIP invite message. Receiving the SIP invite message, the application running on the host OS of the MN 1 transmits an response message (200 OK) to the CN 2 in response to the SIP invite message in steps 563 and 564. This response message includes the home address of the MN 1 as an IP address used by the MN 1 for receiving an audio packet.

Receiving the response message, the CN 2 transmits an acknowledgement message (ACK) to the MN 1 in steps 565 and 566. In this way, a session between the CN 2 and the MN 1 is established.

If the SIP proxy 8 does not have binding information of the MN 1, messages are exchanged between the MN 1 and the SIP proxy 8 by way of the HA 4.

Then, in a step 567, the CN 2 transmits an audio packet (or an RTP packet) directed to the home address of the MN 1. In this case, IPsec of a transport mode is applied to the audio packet.

In a step 568, the HA 4 intercepts the packet, encapsulates the intercepted packet and transmits the encapsulated packet to the CoA of the MN 1.

The IPv6-packet processing part 24 receives the packet transmitted by the HA 4. A step 510 is the same as its counterpart step shown in FIG. 19.

In a step 570, the IPv6-packet processing part 24 transfers the received packet to the host OS by way of the IP-packet processing part 22. The step 570 is different from the step 512 in that, in the case of the step 570, IP sec is applied to the original packet. After carrying out an IPsec process on the original packet, the host OS processes the audio packet.

Next, a procedure for transmitting an audio packet from the MN 1 to the CN 2 is explained. In a step 571, the MN 1 carries out an IP sec process on an IP packet including audio data as a packet to be transmitted to the CN 2. Subsequently, in a step 515, the IPv6-packet processing part 24 adds a mobile tunnel header to the packet in an encapsulation process. Then, in a step 575, the IPv6-packet processing part 24 transmits the packet to the CN 2 by way of the HA 4 denoted by reference numeral 574.

FIG. 25 is a diagram showing a sequence of communications carried out by the MN 1 for a case in which IP sec is applied to an audio packet exchanged between terminals and a mobile tunnel between terminals.

It is assumed that the tunnel mode IPsec is applied to the mobile tunnel between the HA 4 and the MN 1.

Since steps 561 to 566 are the same as their respective counterparts shown in FIG. 24, only processes carried out in a step 567 and subsequent steps are explained.

In a step 567, the CN 2 transmits an audio packet to the MN 1 by directing the packet to the home address of the MN 1. In a step 581, the HA 4 intercepts the packet, adding a mobile tunnel header and an IP header with an IPsec function (IPsec tunnel mode) to the packet in a step 581. In the destination-address fields of the mobile tunnel header and the IP header with an IPsec function, the CoA acquired by the MN 1 in the visited network 5b is set. In the source-address fields of the mobile tunnel header and the IP header with an IPsec function, on the other hand, the address of the HA 4 is set.

Receiving the packet, the IPv6-packet processing part 24 carries out an SA process and a decapsulation process (an IPsec tunnel mode process) in a step 568, an SPD checking process in a step 569 and a decapsulation process in a step 510.

Since the processes carried out in the steps 568, 569 and 510 are the same as those carried out at respectively the steps 552, 553 and 510 shown in FIG. 21, their detailed explanations are not repeated. In a step 570, the IPv6-packet processing part 24 transfers the packet to the host OS by way of the IP-packet processing part 22. Receiving the packet transmitted in the step 570, the host OS carries out an IPsec process before processing the audio packet.

Next, a procedure for transmitting an audio packet from the MN 1 to the CN 2 is explained. In a step 571, the MN 1 carries out an IPsec process on an IP packet including audio data as a packet to be transmitted to the CN 2. Subsequently, the IPv6-packet processing part 24 carries out an SPD checking process in a step 572. Then, the IPv6-packet processing part 24 carries out an IPsec process (an IPsec tunnel mode process) and a mobile IP encapsulation process in a step 573. Since the processes carried out in the steps 572 and 573 are the same as those carried out at respectively the steps 554 and 555 shown in FIG. 21, their detailed explanations are not repeated. Subsequently, in a step 575, the IPv6-packet processing part 24 transmits the packet to the CN 2 by way of the HA 4 denoted by reference numeral 582.

FIG. 26 is a diagram showing a sequence of communications carried out by the MN 1 for a case in which IP sec is applied to an audio packet exchanged between terminals and a mobile tunnel between terminals.

Since steps 561 to 566 are the same as their respective counterparts shown in FIG. 24, only processes carried out in a step 567 and subsequent steps are explained.

The format of a packet exchanged between the HA and the MN in the communication sequence shown in FIG. 25 is different from that exchanged in the sequence shown in FIG. 26. In a step 567, the CN 2 transmits an audio packet to the MN 1 by directing the packet to the home address of the MN 1. In a step 567, the HA 4 shown in FIG. 26 intercepts the packet address to the MN in the step 567, adding only an IP header (IPsec tunnel mode) to the packet in a step 583. In the destination-address field of the outer-side IP header, the CoA acquired by the MN 1 in the visited network 5b is set. In the source-address field of the outer-side IP header, on the other hand, the address of the HA 4 is set.

Receiving the packet, the IPv6-packet processing part 24 carries out an SA process and a decapsulation process (an IPsec tunnel mode process) in a step 568 and an SPD checking process in a step 569.

Since the processes carried out in the steps 568 and 569 are the same as those carried out at respectively the steps 552 and 553 shown in FIG. 22, their detailed explanations are not repeated. In a step 570, the IPv6-packet processing part 24 transfers the packet to the host OS by way of the IP-packet processing part 22. Receiving the packet transmitted in the step 570, the host OS carries out an IPsec process before processing the audio packet.

Next, a procedure for transmitting an audio packet from the MN 1 to the CN 2 is explained. In a step 571, the MN 1 carries out an IPsec process on an IP packet including audio data as a packet to be transmitted to the CN 2. Subsequently, the IPv6-packet processing part 24 carries out an SPD checking process in a step 572. Then, the IPv6-packet processing part 24 carries out an IPsec process (an IPsec tunnel mode process) in a step 573. Since the processes carried out in the steps 572 and 573 are the same as those carried out at respectively the steps 554 and 555 shown in FIG. 22, their detailed explanations are not repeated. Subsequently, in a step 575, the IPv6-packet processing part 24 transmits the packet to the CN 2 by way of the HA 4 denoted by reference numeral 584.

According to the fifth embodiment of the present invention, even if the host OS of the terminal utilizing an application conforming to Mobile IPv6 specifications is not provided with an MN function conforming to Mobile IPv6 specifications, after the Mobile IPv6 processing part carries out a Mobile IPv6 process, by activating a scenario of the guest OS, it is possible to provide the terminal with a Mobile IPv6 service applying IPsec to a Mobile IPv6 signal.

In addition, by separating the IPsec processing part of the mobile IP from the IPsec processing part of an application, an application with attached IPsec can be utilized even if IPsec is applied to a mobile tunnel between the terminal and the HA.

Sixth Embodiment

A sixth embodiment of the present invention is explained by referring to diagrams. The sixth embodiment is characterized in that the terminal has a Mobile IPv6 function and an HMIPv6 function. In the scenario policy management table 220 of the sixth embodiment, entries 'MAP type 1', 'MAP type 2' and 'MAP type 3' are effective.

Figure 27:
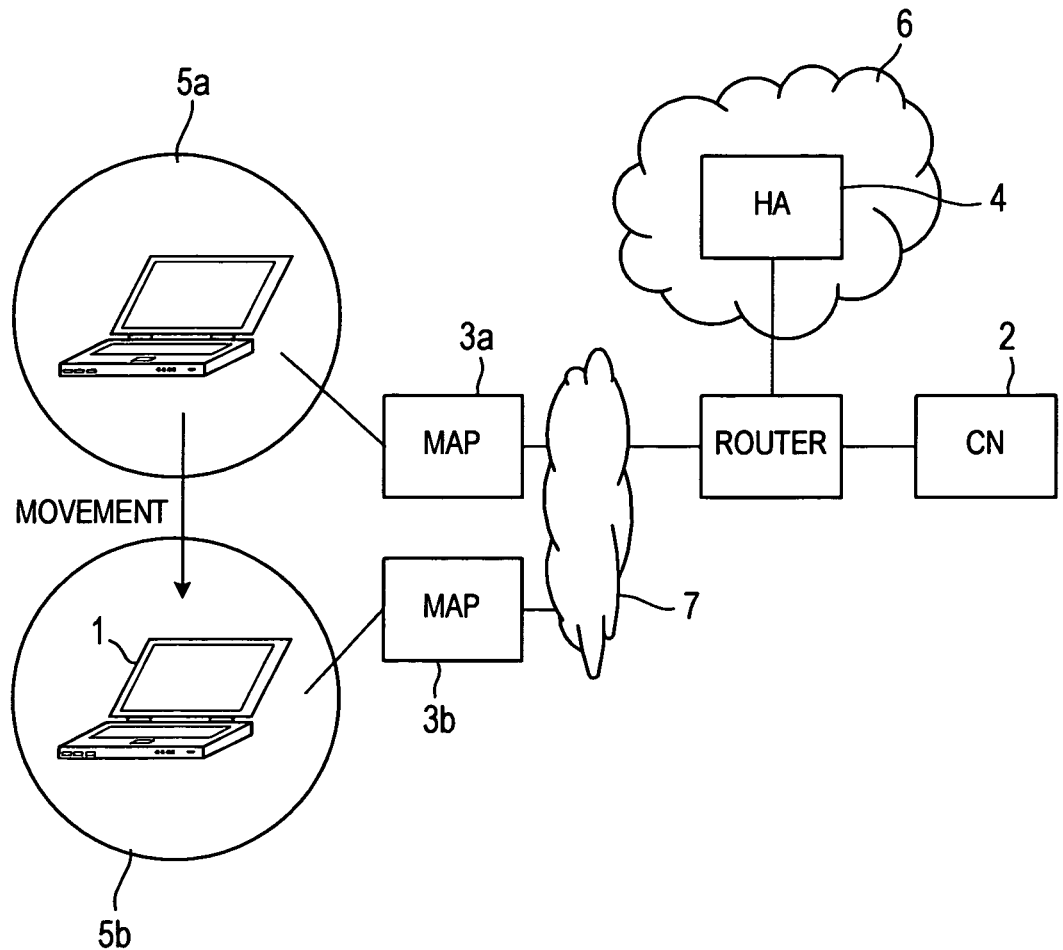
FIG. 27 is a diagram showing a typical configuration of a communication network according to a sixth embodiment.

FIG. 27 is a diagram showing a typical configuration of a communication network according to the sixth embodiment of the present invention. A router 3 has an HMIPv6 MAP function.

Figure 28:
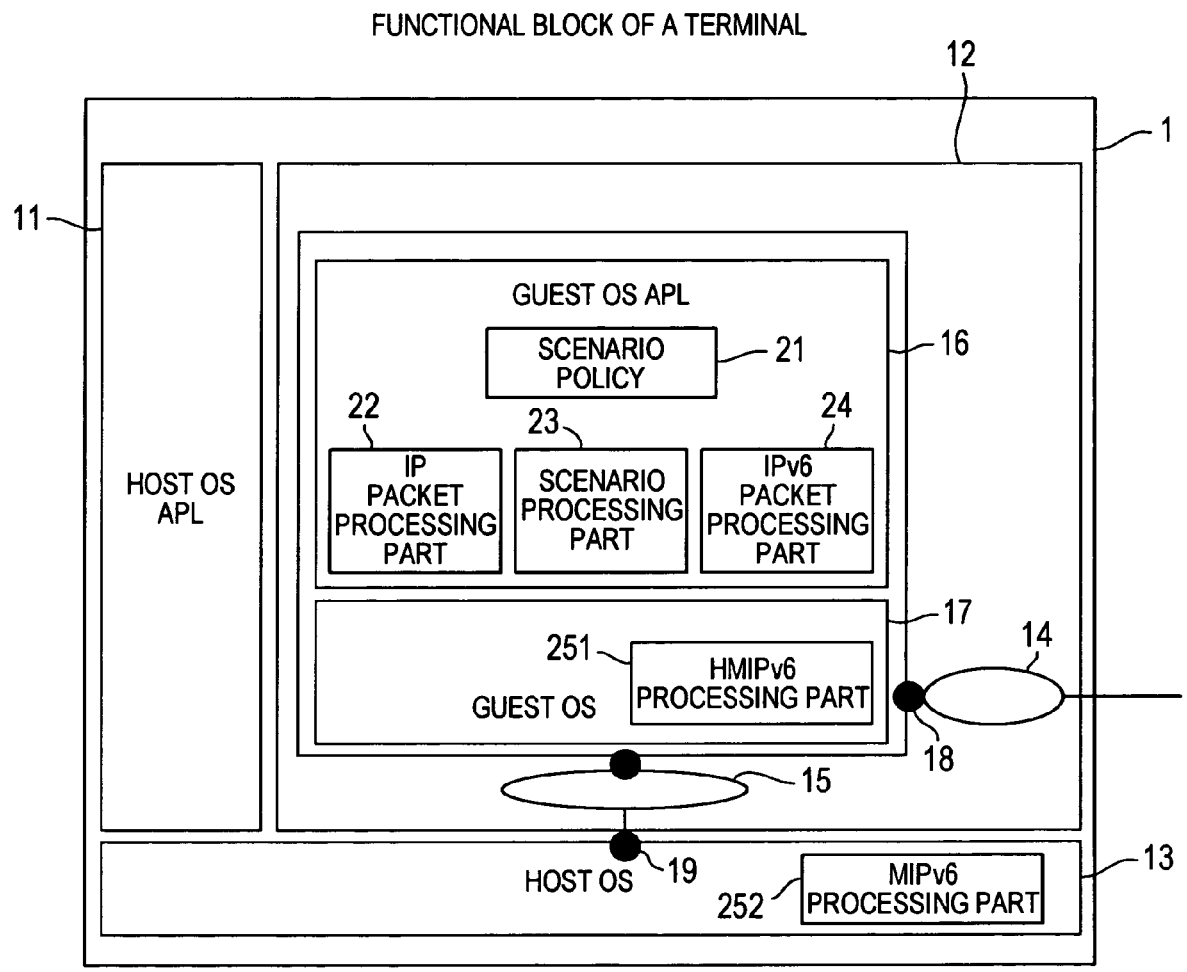
FIG. 28 is a block diagram showing of a typical mobile node MN 1 according to the sixth embodiment.

FIG. 28 is a block diagram showing of typical configuration of a terminal 1 according to the sixth embodiment of the present invention. The host OS 13 has a Mobile IPv6 processing part 252 in addition to functions of the terminal 1 according to the first embodiment. In addition, the guest OS 17 has an HMIPv6 processing part 251 in place of the IPv6 processing part 25.

Figure 29:
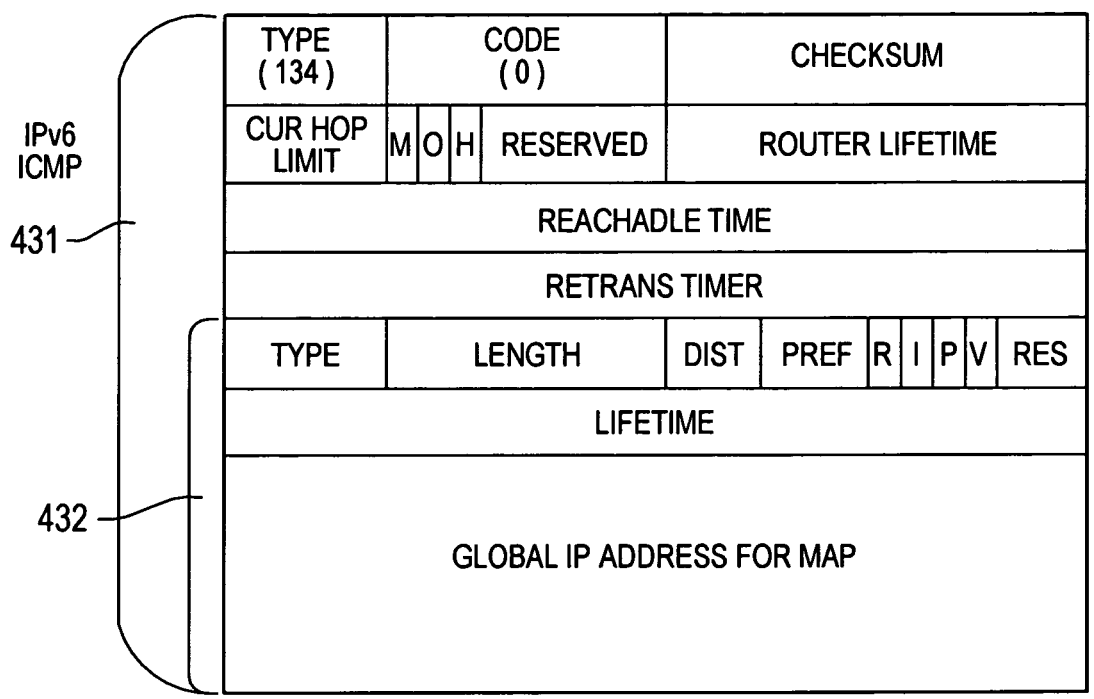
FIG. 29 is a diagram showing a typical router advertisement message provided by the sixth embodiment.
Figure 30:
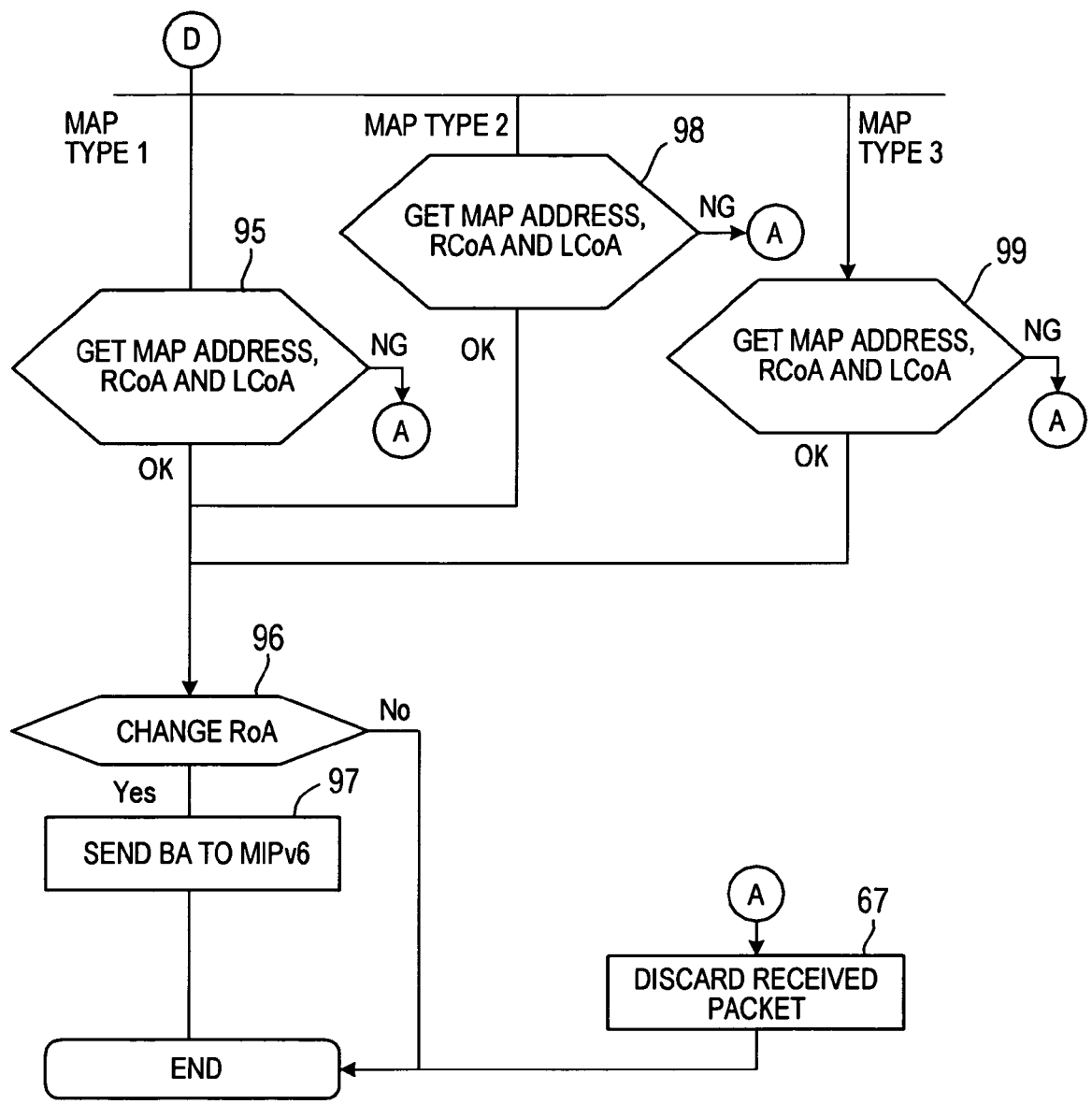
FIG. 30 is a diagram showing a fourth BA-processing routine of a scenario-processing part employed in the mobile node MN 1.

FIG. 29 is a diagram showing a typical format of a router advertisement message S4 transmitted by a MAP 3.

An ICMP packet 431 including a router advertisement message is included in the payload portion 43 of an IPv6 packet. A router advertisement S4 transmitted by the MAP 3 includes a MAP option 432. The MAP option 432 includes a mode of registering an HMIPv6 terminal and a function for informing the terminal of a MAP address.

The mode of registering an HMIPv6 terminal is classified into 3 types by values set in I, P and V bits of the MAP option mode 432.

Type 1 indicates a method for transferring a location registering message exchanged between the terminal 1 and the HA 4 as an encapsulated packet propagating through an MN-MAP route. Examples of the location registering message are a binding update message and a binding acknowledgement message.

Type 2 indicates a method for transferring a binding update message directly from the terminal 1 to the HA 4 and a binding acknowledgement message from the HA 4 to the terminal 1 as an encapsulated packet propagating through an MAP-MN route.

Type 3 indicates a method for transferring a location registering message directly from the terminal 1 and the HA 4.

Figure 31:
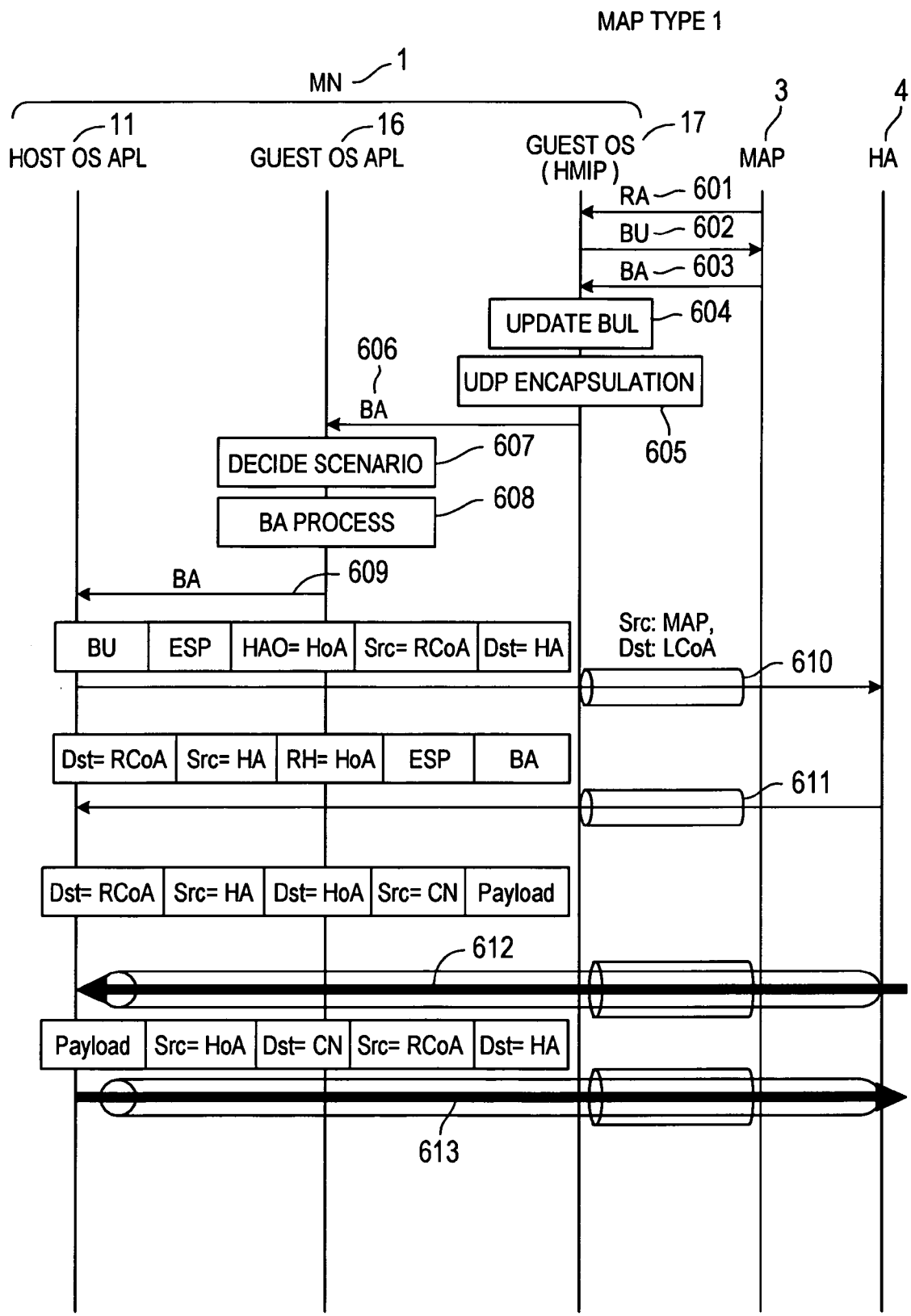
FIG. 31 is a diagram showing a first sequence of binding update processes and packet transmission/reception processes according to the sixth embodiment.
Figure 32:
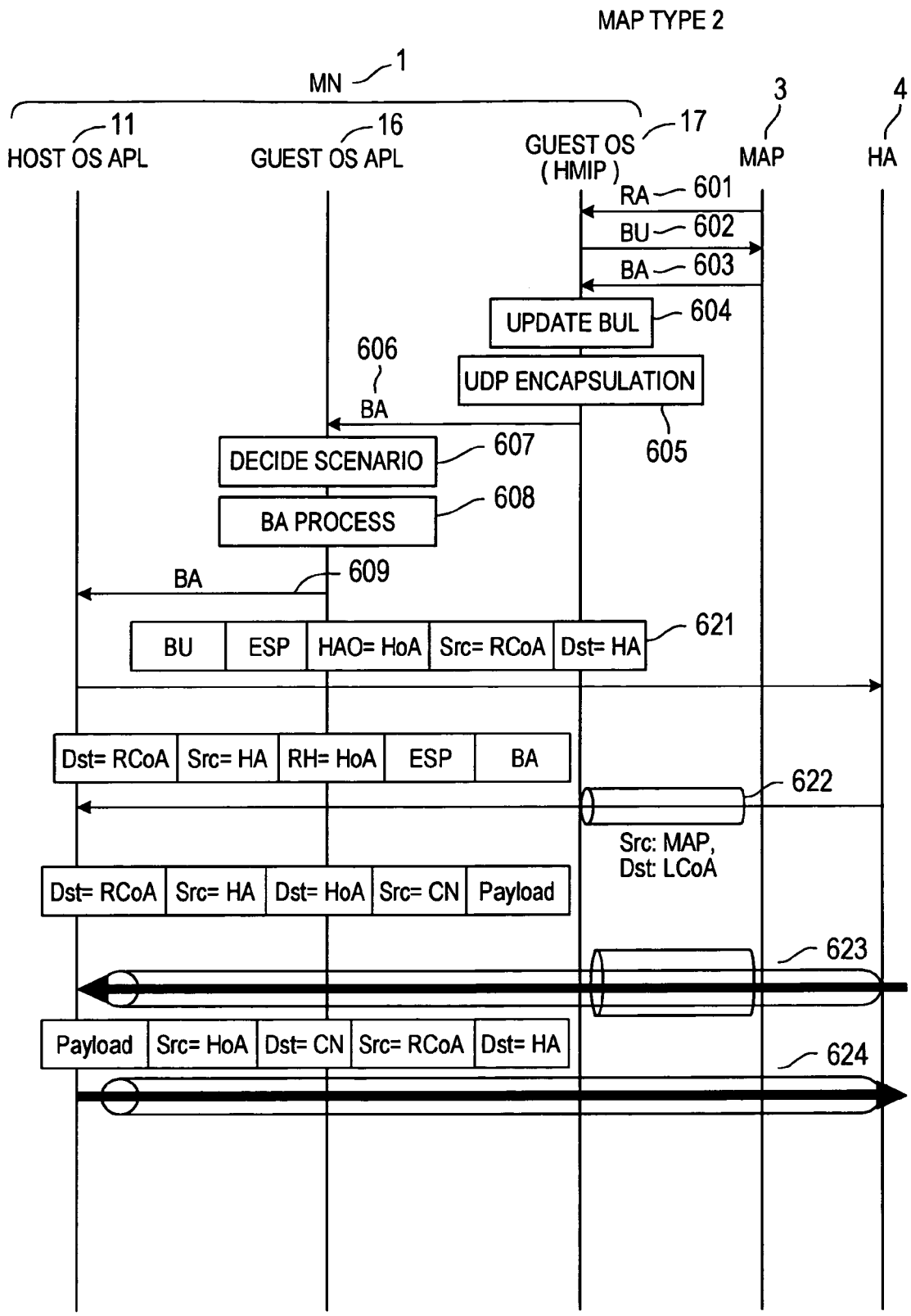
FIG. 32 is a diagram showing a second sequence of binding update processes and packet transmission/reception processes according to the sixth embodiment.
Figure 33:
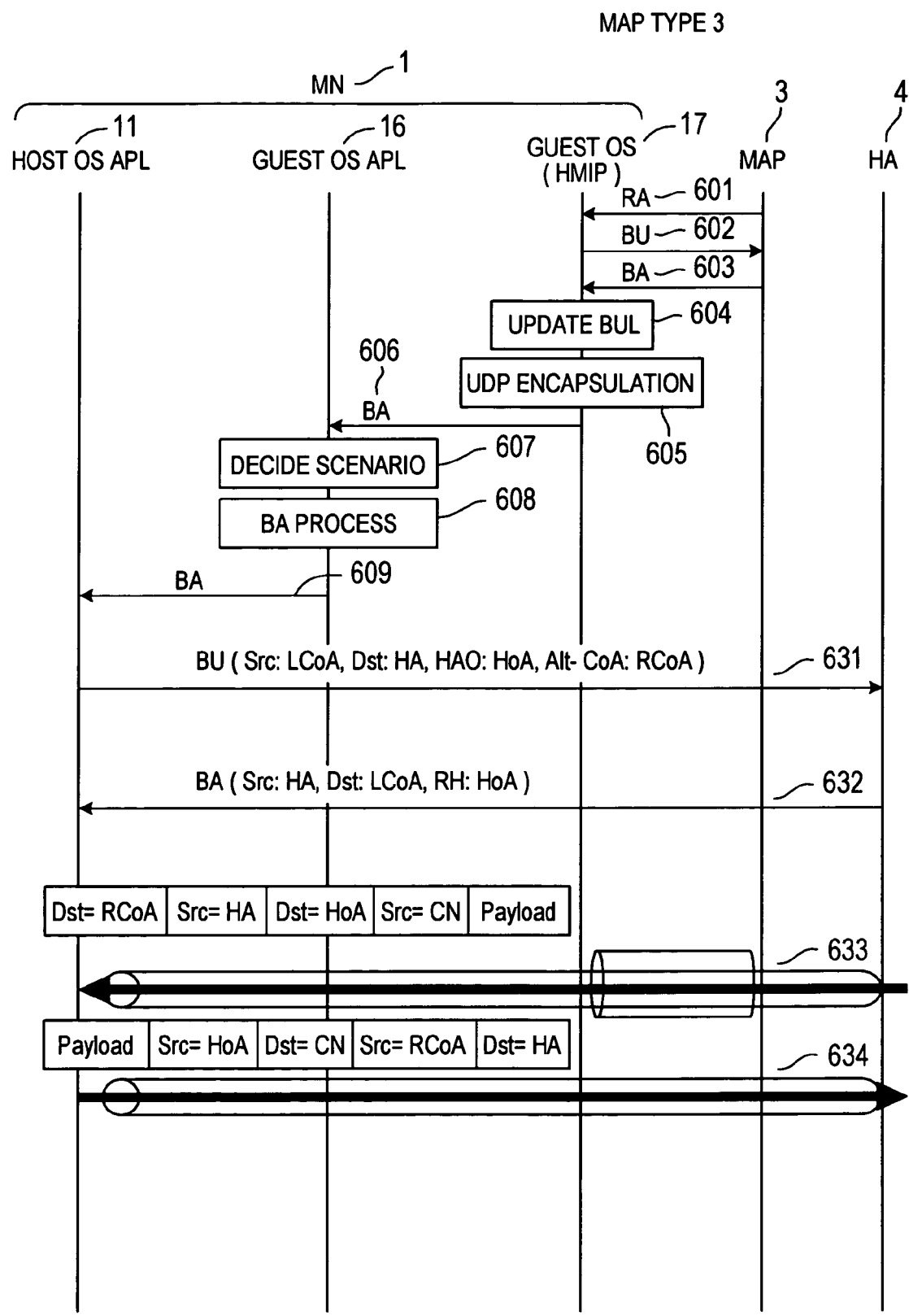
FIG. 33 is a diagram showing a third sequence of binding update processes and packet transmission/reception processes according to the sixth embodiment.

By referring to FIGS. 31 to 33, the following description explains sequences of operations carried out by the MN 1 existing in the visited network 5*b* shown in FIG. 27 to register its location in the HA 4 and operations to exchange packets.

First of all, by referring to FIG. 31, the following description explains a sequence of operations carried out by the MN 1 receiving a router advertisement message showing aforementioned type 1 to exchange packets.

In a step 601, the MN 1 receives a router advertisement, generating an RCoA and an LCoA. Then, the MN 1 sets the LCoA in the interface part 18. Subsequently, in a step 602, the MN 1 transmits a location registering message (or a binding update message) to a MAP 3*b*. The MAP 3*b* holds information associating each RCoA with an LCoA. In a step 603, the MAP 3*b* transmits a response (or a binding acknowledgement) to the binding update message. The HMIPv6 processing part 251 has a binding update list management table. In a step 604, the HMIPv6 processing part 251 adds a MAP entry to the binding update list management table. If the MAP entry already exists in the binding update list management table, the HMIPv6 processing part 251 merely updates the entry.

Then, in steps 605 and 606, the HMIPv6 processing part 251 adds a header including an identifier to the binding acknowledgement and transfers the binding acknowledgement to the scenario processing part 23. The identifier indicates MAP location registration of type 1 cited above.

In steps 61 and 607, the scenario processing part 23 activates the BA processing routine 60 and decides a scenario.

The scenario processing part 23 acquires the LCoA, the RCoA and the MAP address from the received packet in a step 95. To be more specific, the LCoA, the RCoA and the MAP address are acquired from the destination address 41*b*, the IPv6 routing header and the source address 41*a* respectively. If a process result obtained in a step 96 indicates that the RCoA has been changed, a value indicating MAP location registration of type 1 is set in the mobility-options field of the mobility header 402. In steps 97, 608 and 609, the binding acknowledgement including the mobility options is transferred to the Mobile IPv6 processing part 252 of the host OS by way of the IP-packet processing part 22 in steps 97, 608 and 609. Then, the execution of this routine is ended.

If the RCoA has not been changed, on the other hand, the execution of this routine is just ended. If the process carried out in the step 95 is not completed normally, on the other hand, the flow of the routine goes on to a step 67 at which the received packet is discarded. Then, the execution of this routine is ended.

Receiving the binding acknowledgement, the Mobile IPv6 processing part 252 transmits a binding update message directed to the HA 4 in a step 610.

The binding update message includes the RCoA as the source address 41*a*, the address of the HA 4 as the destination address 41*b* and the home address of the MN 1 as the home address option of the destination options header. Receiving the binding update message transmitted in the step 610, the HMIPv6 processing part 251 carries out an IPinIP encapsulation process on the packet and then transmits the packet to the HA 4 by way of the MAP 3*b*.

Receiving a binding acknowledgement transmitted in a step 611, the MAP 3*b* carries out an IPinIP encapsulation process on the acknowledgement and transmits the packet to the MN 1. The HMIPv6 processing part 251 decapsulates the received packet and transfers the packet to the Mobile IPv6 processing part 252. The message includes the RCoA as the destination address 41*b*, the address of the HA 4 as the source address 41*a* and the home address of the MN 1 as the home-address field of the routing header.

The Mobile IPv6 processing part 252 carries out the IPsec process on the location registering signal.

Next, a method adopted by the MN 1 to exchange packets is explained. The Mobile IPv6 processing part carries out MN 1-HA4 encapsulation and decapsulation processes on packets exchanged by the MN 1 and, in addition, the HMIPv6 processing part 251 carries out MN 1-MAP encapsulation and decapsulation processes on the packets in steps 612 and 613.

By referring to FIG. 32, the following description explains a sequence of operations carried out by the MN 1 receiving a router advertisement message showing type 2 cited above to transmit and receive packets.

Processes carried out in steps 601 to 604 are the same as those carried out at their respective counterpart steps shown in FIG. 31.

Then, in steps 605 and 606, the HMIPv6 processing part 251 adds a header including an identifier to the binding acknowledgement and transfers the acknowledgement to the scenario processing part 23. The identifier indicates MAP location registration of type 2.

In steps 61 and 607, the scenario processing part 23 activates the BA processing routine 60 and decides a scenario.

The scenario processing part 23 acquires the LCoA, the RCoA and the MAP address from the received packet in a step 98. To be more specific, the LCoA, the RCoA and the MAP address are acquired from the destination address 41*b*, the routing header and the source address 41*a* respectively.

If a process result obtained in a step 96 indicates that the RCoA has been changed, a value indicating MAP location registration of type 2 is set in the mobility-options field of the mobility header 402. In steps 97, 608 and 609, the binding acknowledgement including the mobility options is transferred to the Mobile IPv6 processing part 252 of the host OS by way of the IP-packet processing part 22 in steps 97, 608 and 609. Then, the execution of this routine is ended.

If the RCoA has not been changed, on the other hand, execution of this routine is just ended. If the process carried out in the step 98 is not completed normally, on the other hand, the flow of the routine goes on to a step 67 at which the received packet is discarded. Then, the execution of this routine is ended.

Receiving the binding acknowledgement, the Mobile IPv6 processing part 252 transmits a binding update message directed to the HA 4 in a step 621.

The binding update message includes the RCoA as the source address 41*a*, the address of the HA 4 as the destination address 41*b* and the home address of the MN 1 as the home address option of the destination options header. Receiving the binding update message transmitted in the step 621, the HMIPv6 processing part 251 transmits the packet to the HA 4.

Receiving a binding acknowledgement transmitted in a step 622, the MAP 3*b* carries out an IPinIP encapsulation process on the acknowledgement and transmits the packet to the MN 1. The HMIPv6 processing part 251 decapsulates the received packet and transfers the packet to the Mobile IPv6 processing part 252. The message includes the RCoA as the destination address 41*b*, the address of the HA 4 as the source address 41*a* and the home address of the MN 1 as the home-address field of the routing header.

The Mobile IPv6 processing part 252 carries out the IPsec process on the location registering signal.

A method adopted by the MN 1 to receive the packet in a step 623 is the same as the method implemented in the step 612 shown in FIG. 31.

In a process carried out by the MN 1 to transmit a packet to the HA, the Mobile IPv6 processing part 252 carries out an MN-HA encapsulation process on the data being transmitted and transmits the packet to the HA in a step 624.

By referring to FIG. 33, the following description explains a sequence of operations carried out by an MIPv6 MN 1 receiving a router advertisement message showing type 3 cited above to transmit and receive packets.

Processes carried out in steps 601 to 604 are the same as those carried out at their respective counterpart steps shown in FIG. 31.

Then, in steps 605 and 606, the HMIPv6 processing part 251 adds a header including an identifier to the binding acknowledgement and transfers the acknowledgement to the scenario processing part 23. The identifier indicates MAP location registration of type 3.

In steps 61 and 607, the scenario processing part 23 activates the BA processing routine 60 and decides a scenario.

The scenario processing part 23 acquires the LCoA, the RCoA and the MAP address from the received packet in a step 99. To be more specific, the LCoA, the RCoA and the MAP address are acquired from the destination address 41*b*, the routing header and the source address 41*a* respectively.

If a process result obtained in a step 96 indicates that the RCoA has been changed, a value indicating MAP location registration of type 3 is set in the mobility-options field of the mobility header 402. In steps 97, 608 and 609, the binding acknowledgement including the mobility options is transferred to the Mobile IPv6 processing part 252 of the host OS by way of the IP-packet processing part 22 in steps 97, 608 and 609. Then, the execution of this routine is ended.

If the RCoA has not been changed, on the other hand, the execution of this routine is just ended. If the process carried out in the step 99 is not completed normally, on the other hand, the flow of the routine goes on to a step 67 at which the received packet is discarded. Then, the execution of this routine is ended.

Receiving the binding acknowledgement, the Mobile IPv6 processing part 252 transmits a binding update message directed to the HA 4 in a step 631.

The binding update message includes the LCoA as the source address 41*a*, the address of the HA 4 as the destination address 41*b* and the home address of the MN 1 as the home address option of the destination options header. Receiving the binding update message transmitted in the step 631, the HMIPv6 processing part 251 transmits the packet to the HA 4.

Receiving a binding acknowledgement transmitted from the HA 4 in a step 632, the HMIPv6 processing part 251 passes on the message to the Mobile IPv6 processing part 252. The message includes the RCoA as the destination address 41*b*, the address of the HA 4 as the source address 41*a*, the LCoA as the destination address 41*b* and the home address of the MN 1 as the home-address field of the routing header.

The Mobile IPv6 processing part 252 carries out the IPsec process on the location registering signal.

A method adopted by the MN 1 to receive the packet in steps 633 and 634 is the same as the method implemented in the steps 623 and 624 shown in FIG. 32.

In accordance the sixth embodiment of the present invention, an HMIPv6 service can be provided with ease to an MN conforming to the Mobile IPv6 specifications.

In addition, by separating the Mobile IPv6 processing part from the HMIPv6 processing part, the IPinIP capsulation process or IPsec process of a terminal conforming to the HMIPv6 specifications can be carried out with ease.

Seventh Embodiment

Figure 34:
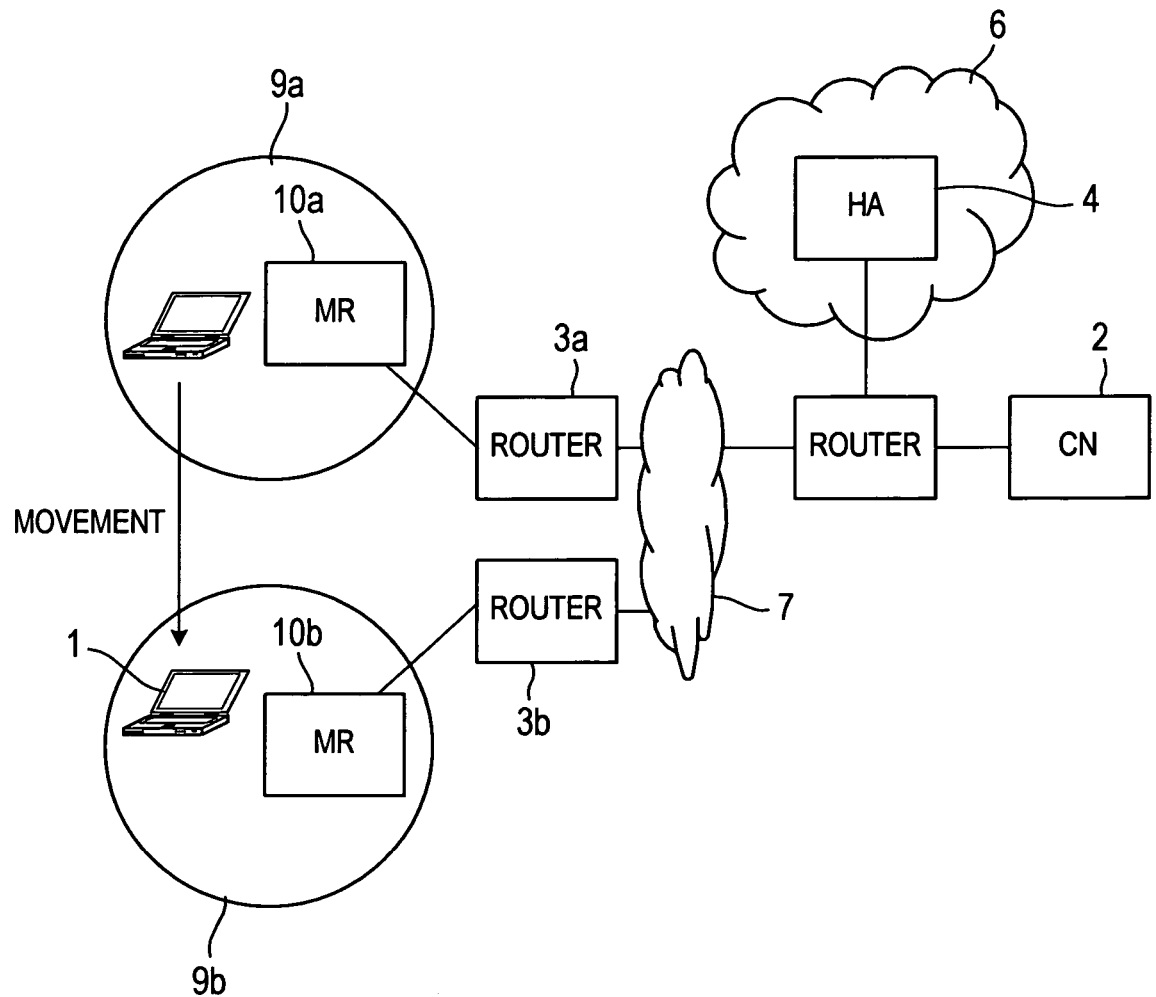
FIG. 34 is a diagram showing a typical configuration of a communication network according to a seventh embodiment.

A seventh embodiment of the present invention is explained by referring to diagrams. FIG. 34 is a diagram showing a typical configuration of a communication network according to the seventh embodiment of the present invention. In the seventh embodiment, mobile routers 10 (10*a* and 10*b*) are connected to routers 3 (3*a* and 3*b*) respectively. The mobile routers 10 (10*a* and 10*b*) are included in mobile networks 9 (9*a* and 9*b*) respectively.

Figure 35:
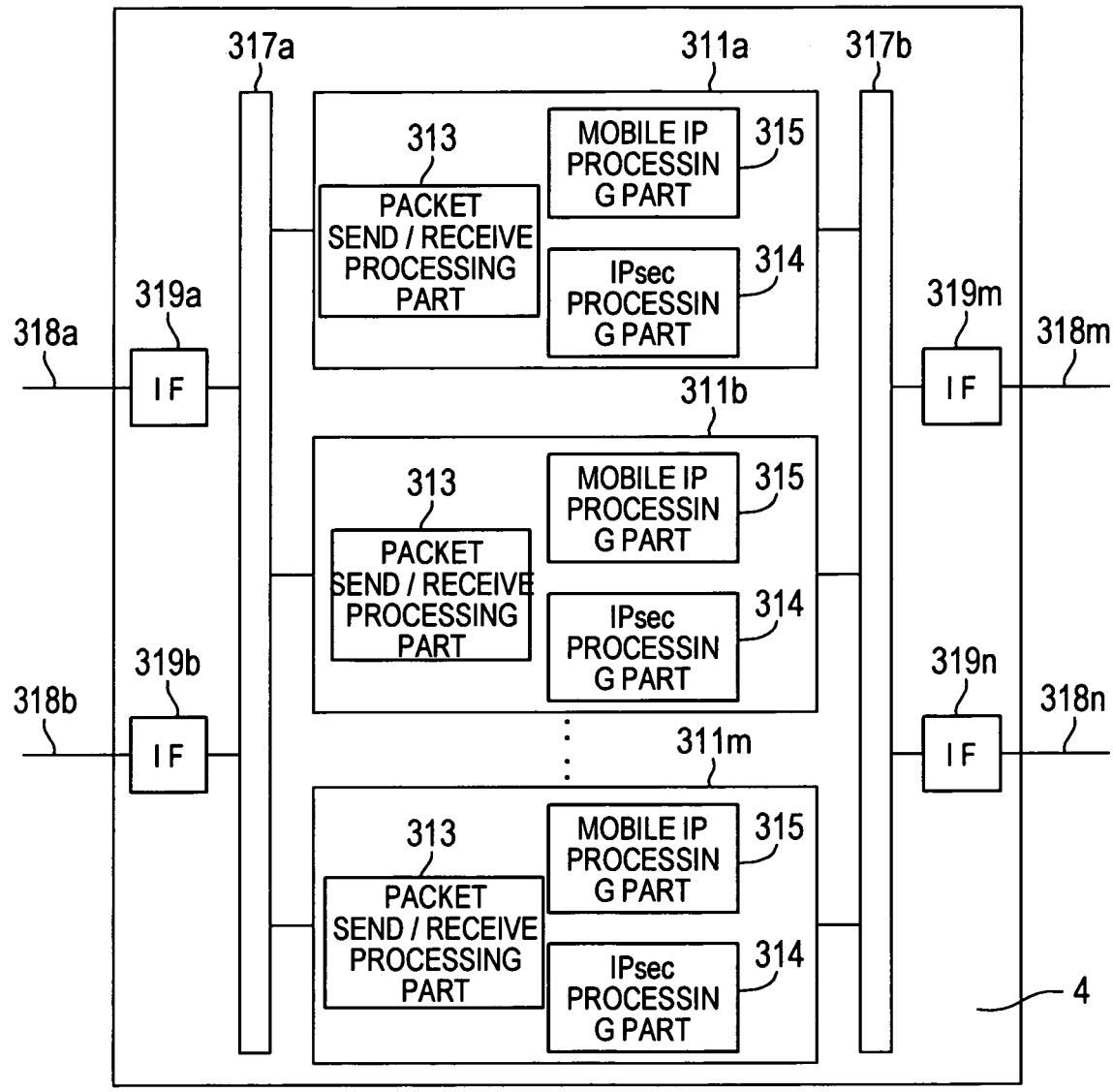
FIG. 35 is a block diagram showing an HA according to the seventh embodiment.

FIG. 35 is a block diagram showing a typical configuration of the HA 4 in the home network 6 of the MN 1. The HA 4 includes interfaces (IF) 319*a*, 319*b*, 319*m* and 319*n*, servers 311 (311*a*, 311*b* and 311*m*) and switch sections 317 (317*a* and 317*b*). The interfaces (IF) 319*a*, 319*b*, 319*m* and 319*n* are connected to lines 318*a*, 318*b*, 318*m* and 318*n* respectively.

Each of the servers 311 includes a packet-send/receive processing part 313, an IPsec processing part 314 and a Mobile-IP processing part 315.

The Mobile-IP processing part 315 has a mobile IP protocol processing function and a mobile IP HA (Home Agent) function. The mobile IP HA (Home Agent) function includes a binding cache management table. The binding cache management table is a table of information associating the home address of each MN 1 with the Care of Address for the MN 1. In addition, in this embodiment, the HA 4 includes the Mobile-IP processing part 315 having a processing program to be executed for carrying out a mobile-tunnel process a plurality of times.

Figure 36:
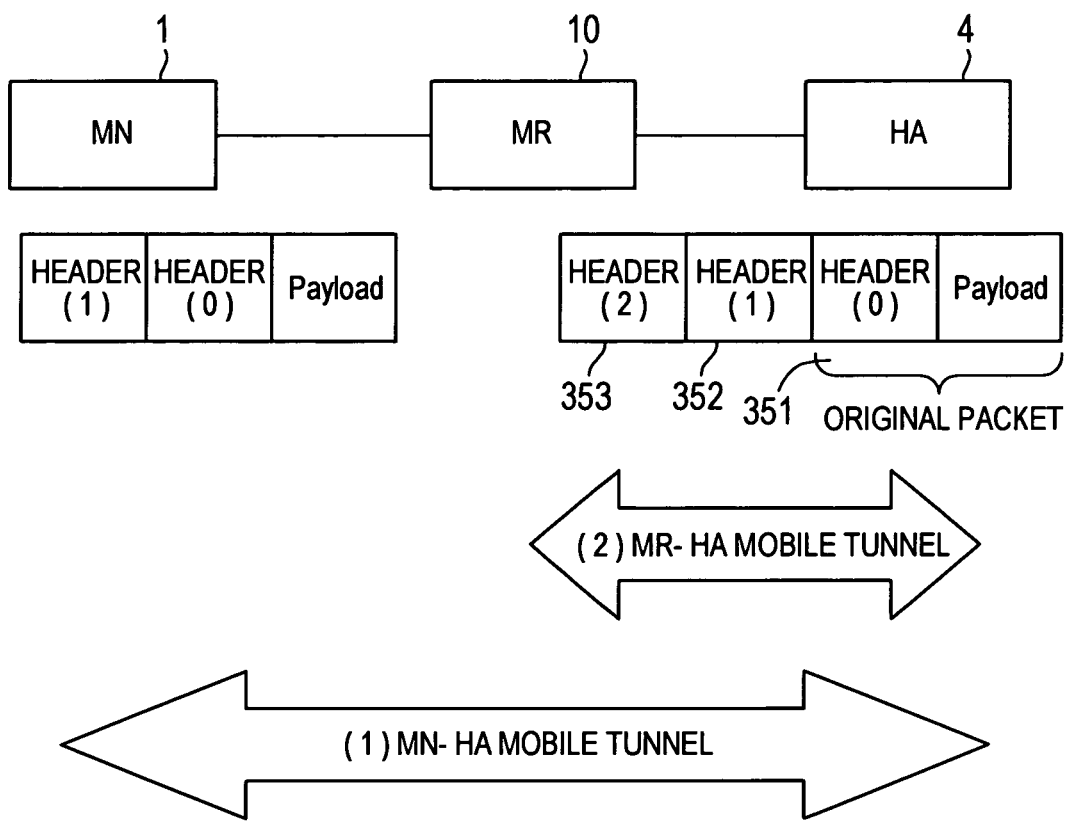
FIG. 36 is a diagram showing a mobile tunnel application route.
Figure 37:
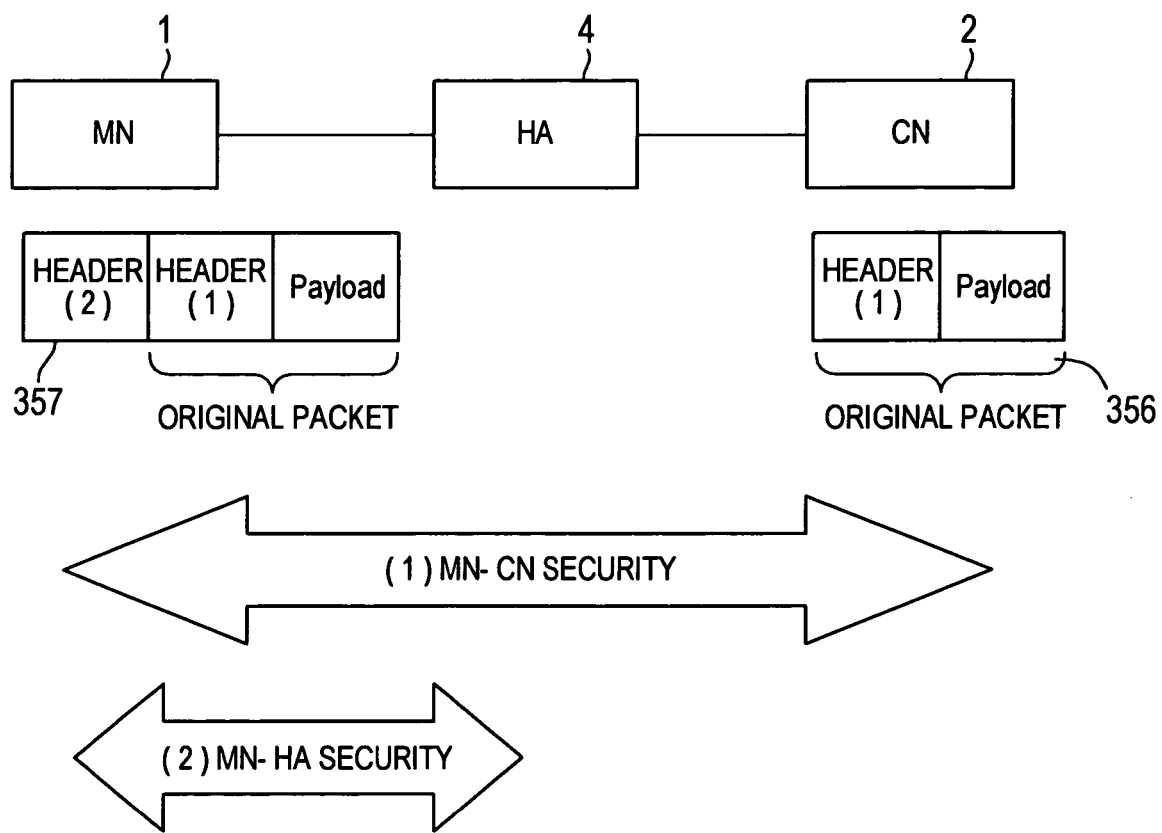
FIG. 37 is a diagram showing a security application route.

FIG. 36 is a diagram showing a mobile tunnel application route for a case in which the HA 4 serves as the HA for the mobile router 10 and the MN 1, which exist in the mobile network 9.

When the HA 4 communicates with the MN 1, mobile tunnels are set between the MN 1 and the HA 4 as well as between the mobile router 10 and the HA 4. The mobile tunnel between the MN 1 and the HA 4 is referred to as (1) an MN-HA mobile tunnel whereas the mobile tunnel between the MR and the HA 4 is referred to as (2) an MR-HA mobile tunnel.

First of all, the HA 4 refers to binding information for the MN 1 and adds an IP header 352 to an original packet 351. As the destination address of the IP header 352, the Care of Address of the MN 1 is set. Then, the HA 4 refers to binding information for the MR (Mobile Router) 10 and adds an IP header 353 to the original packet 351. As the destination address of the IP header 353, the Care of Address of the MR 10 is set.

In accordance the seventh embodiment of the present invention, it is possible to easily implement an IP in IP encapsulation process or an IPsec process as many times as required by the HA 4 in rendering a network mobility service.

Eighth Embodiment

Figure 38:
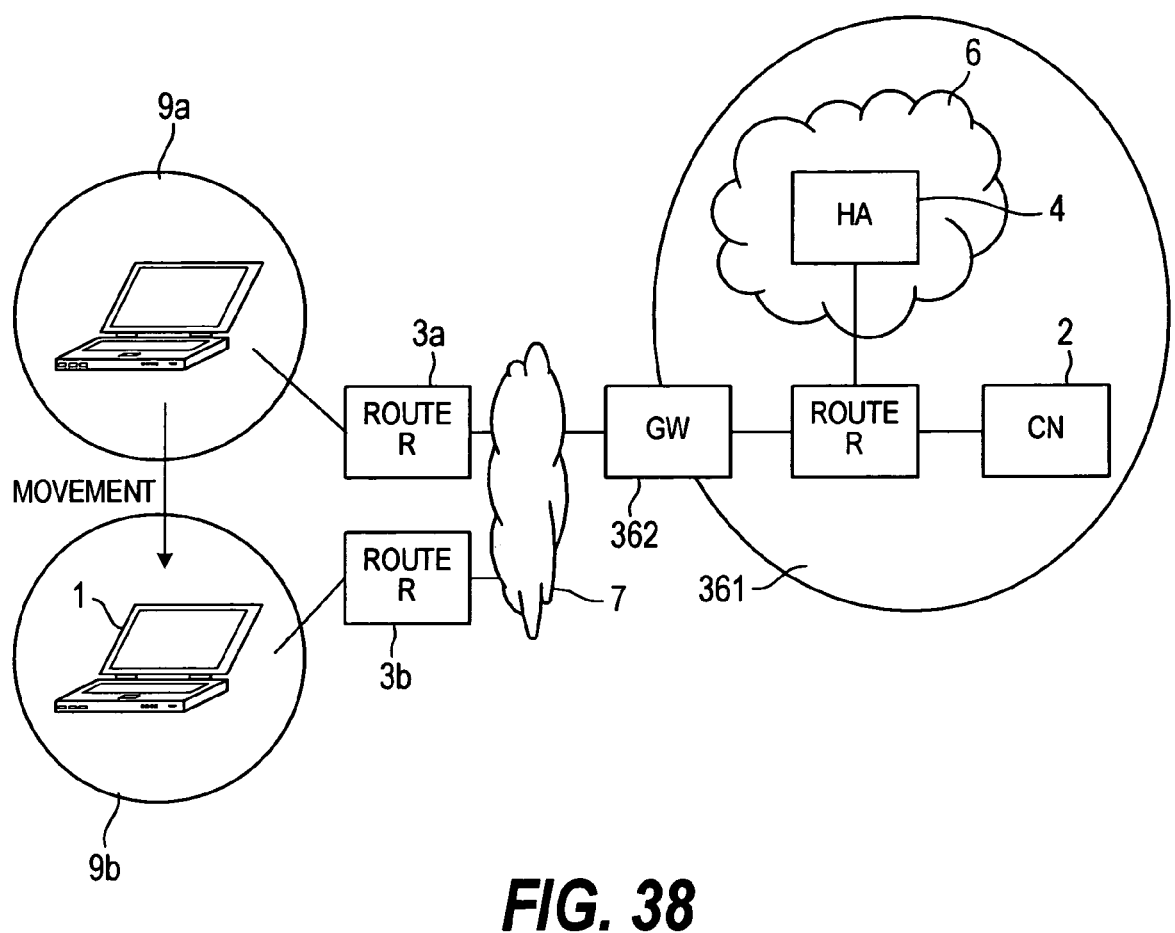
FIG. 38 is a diagram showing a typical configuration of a communication network according to an eighth embodiment.

An eighth embodiment of the present invention is explained by referring to diagrams. FIG. 38 is a diagram showing a typical configuration of a communication network according to the eighth embodiment of the present invention. The eighth embodiment is characterized in that a network 361, which includes the home network 6 of the MN 1 and the CN 2, is connected to the IP network 7 through a GW 362. The GW 362 has a TLS termination function.

In the eighth embodiment, an application 16 running on the guest OS of the MN 1 has a first TLS termination function.

Figure 39:
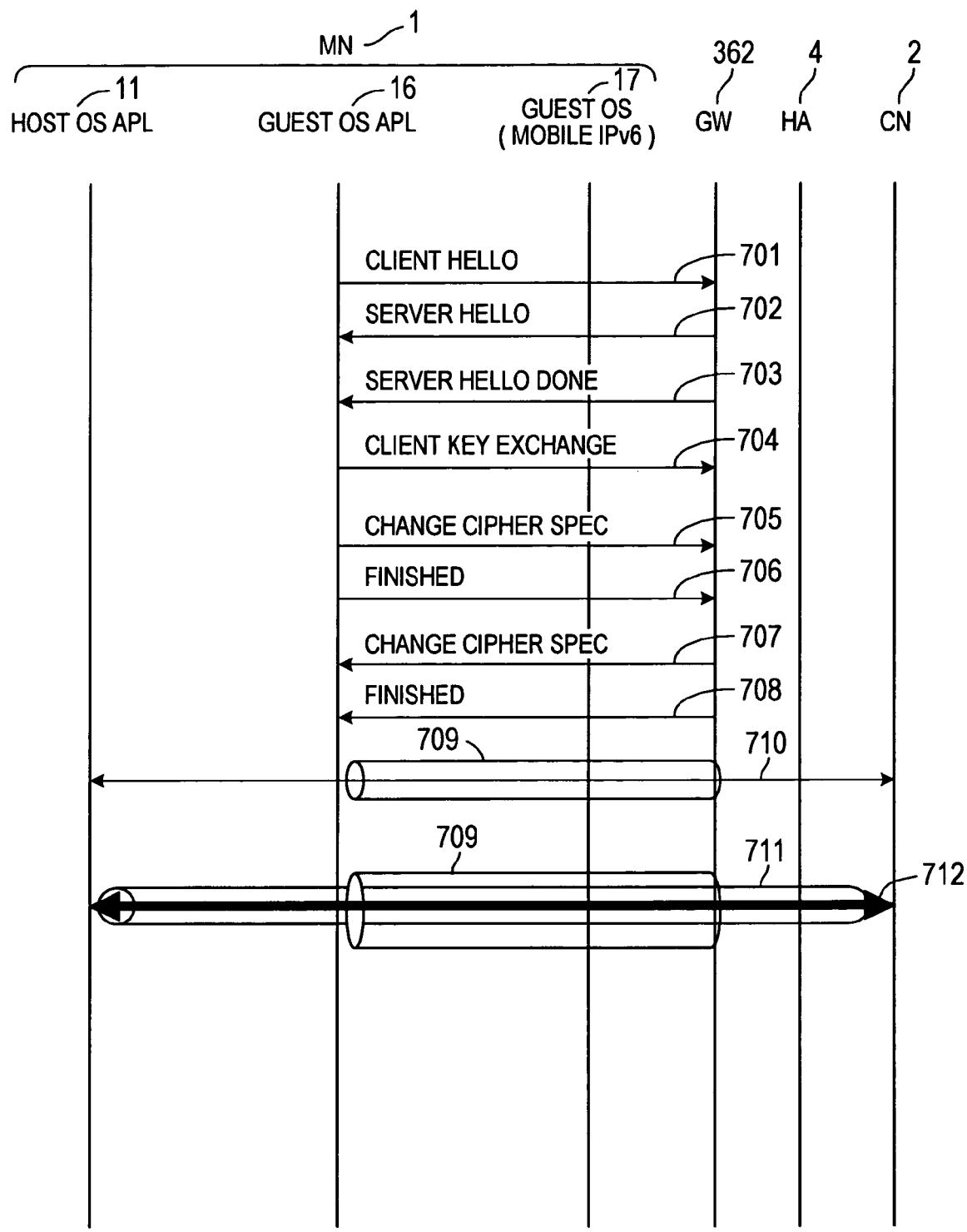
FIG. 39 is a diagram showing a sequence of communications adopting a TLS protocol in the eighth embodiment.

A sequence of communications carried out by the MN 1 by adopting the TLS protocol is explained by referring to FIG. 39 as follows.

When the MN 1 existing at a location outside the network 361 communicates with the CN 2 serving as a communication apparatus existing at a location inside the network 361, the TLS session is set between the MN 1 and the GW 362 as a communication session.

First of all, a procedure for a setting TLS session between the MN 1 and the GW 362 is explained. The procedure begins with a step 701 at which the application 16 running on the guest OS of the MN 1 transmits 'Client Hello' message to the GW 362. The 'Client Hello' message includes usable encryption algorithms, usable compression algorithms and a client random number. Receiving the 'Client Hello' message, the GW 362 decides an encryption algorithm and a compression algorithm. Then, in a step 702, the GW 362 transmits 'Server Hello' message to the application 16 running on the guest OS of the MN 1. The 'Server Hello' message includes the determined algorithms and a server random number. If necessary, the GW 362 may attach its own certificate to the transmitted 'Server Hello' message. If the GW 362 also transmits a certificate to the MN 1, the MN 1 is capable of authenticating the GW 362 by using the certificate. Then, at the next step 703, the GW 362 transmits 'Server Hello Done' message to the MN 1 as an optional message in order to notify the MN 1 of the end of the message transmission. In a step 704, the application 16 running on the guest OS of the MN 1 generates pre-master secret information serving as a seed of encryption parameters and transmits the pre-master secret information to the GW 362 as 'Client Key Exchange' message.

Thus, the application 16 running on the guest OS of the MN 1 and the GW 362 are put in a state of being capable of sharing the used algorithms, the server random number, the client random number and the pre-master secret information. The application 16 running on the guest OS of the MN 1 and the GW 362 generate security parameters required in encryption communications between the application 16 running on the guest OS and the GW 362.

In steps 705 and 706, the application 16 running on the guest OS of the MN 1 informs the GW 362 of finished conditions for operations of 'Change Cipher Specifications' and new encryption specifications as ends of the process to set the security parameters. By the same token, in steps 707 and 708, the GW 362 also informs the application 16 running on the guest OS of the MN 1 of 'Finished' conditions for operations of 'Change Cipher Specifications' and new encryption specifications as ends of the process to set the security parameters. After the above processes, a TLS session 709 is established between the application 16 running on the guest OS of the MN 1 and the GW 362.

Next, in order for the application 11 running on the host OS of the MN 1 to carry out a communication with the CN 2 by adoption of TLS in a step 712, messages are exchanged in a step 710 and a TLS session 711 is established between the application 11 running on the host OS of the MN 1 and the CN 2. Since a procedure for setting the TLS connection 711 is the same as that carried out in the steps 701 to 708, details of the procedure are not explained. The TLS session 711 utilizes the TLS 709 between the application 16 running on the guest OS of the MN 1 and the GW 362.

According to the eighth embodiment, the MN 1 is capable of carrying out a TLS process a plurality of times in order to establish a TLS session between 2 communication apparatus.

Ninth Embodiment

The present invention can also be implemented even to the mobile terminal described as follows.

In a communication system including first and second networks connected to each other as well as a home agent connected to the first network, there is a mobile terminal connected to the home agent. The mobile terminal is characterized in that the mobile terminal receives a response from the home agent as a response to a location registration transmitted from the mobile terminal to the home agent and, decides a communication method to be adopted in the mobile terminal on the basis of the response.

As an alternative, the mobile terminal is characterized in that the mobile terminal includes a Mobile IPv6 processing part and an IP-address translation part and, when the mobile terminal receives a packet according to a first address system, after the Mobile IPv6 processing part carries out a Mobile IPv6 process on the received packet, the IP-address translation part transforms the packet already subjected to the Mobile IPv6 process into a packet according to a second address system whereas, before the mobile terminal transmits a packet according to the first address system, after the IP-address translation part transforms the packet to be transmitted into a packet according to the second address system, the Mobile IPv6 processing part carries out a Mobile IPv6 process on the packet according to the second address system.

As another alternative, the mobile terminal is characterized in that the first address system is IPv6 and the second address system is IPv4.

As a further alternative, the mobile terminal is characterized in that the mobile terminal includes a first IPsec processing part and a Mobile IPv6 processing part further having an embedded second IPsec processing part and, when the mobile terminal receives a packet, after the second IPsec processing part carries out a second IPsec process regarding a Mobile IPv6 process on the received packet, the first IPsec processing part further carries out a first IPsec process on the packet already subjected to the second IPsec process.

The communication system is further characterized in that the communication system has a connection apparatus for connecting the first and second networks to each other and the connection apparatus is a MAP of HMIPv6.

INDUSTRIAL FIELD OF APPLICATION

By virtue of the present invention, a communication apparatus is capable of terminating a security process on the same layer or a header process a plurality of times. It is quite within the bounds of possibility that the present invention can be applied to implementation of a communication apparatus for carrying out a process according to a security management configuration.

What is claimed is:

1. A terminal connected to a network, the terminal comprising:
   a transmission/reception part for receiving a packet that includes a first header for a first security processing and a second header for a second security processing;
   a CPU; and
   a memory for storing programs to be executed by the CPU, the programs stored in the memory including:
   a first operating system
   a second operating system that executes on the first operating system;
   a first program that executes on the second operating system to perform a first process that processes the first header; and
   a second program that executes on the first operating system to perform a second process that processes the second header, and
   wherein the first security processing and the second security processing are executed on a same layer of said packet;
   wherein, upon the packet being received by the transmission/reception part, the first program processes the first header by performing the first process and outputs data obtained by the first process that does not include the first header to the second program, and
   wherein, upon receiving the data output by the first program, the second program processes the second header by performing the second process.

2. A terminal according to claim 1 wherein the first and second processes are processes for decrypting results of encryption processes executed on the same layer of the received packet.

3. A terminal according to claim 1 wherein the first and second processes are the termination processes of IPsec executed on the same layer of the received packet.

4. A terminal according to claim 1 wherein the first and second processes are the termination processes of TLS performed on the same layer of the received packet.

5. A terminal according to claim 1 wherein the second operating system is executed on a virtual machine configured on the first operating system.

6. A terminal according to claim 1 wherein:
   the network is also connected to a server for managing information on locations of the terminal; and
   the first and second processes handle packets transmitted from the server to the terminal.

7. A terminal according to claim 6 wherein:
   the terminal is a terminal provided for mobile IP functions;
   the server is a server provided for said mobile IP functions;
   the terminal is a terminal functioning as a mobile node; and
   the server is a server functioning as a home agent of the terminal.

8. A communication system, comprising:
   a terminal and a server that are connected to a network, and
   wherein the terminal has a transmission/reception part for receiving a packet that includes a first header for a first security processing and a second header for a second security processing, a CPU, and a memory for storing programs to be executed by the CPU, the programs stored in the memory including:
   a first operating system
   a second operating system that executes on the first operating system;
   a first program that executes on the second operating system to perform a first process that processes the first header; and
   a second program that executes on the first operating system to perform a second process that processes the second header, and
   wherein the server comprises a transmission/reception part for sending and receiving packets, a CPU and a memory for storing information on locations of the terminal;
   wherein the first security processing and the second security processing executed by the terminal are executed on a same layer of said packet, which is received from the server;
   wherein, upon the packet being received by the transmission/reception part of the terminal, the first program processes the first header by performing the first process and outputs data obtained by the first process that does not include the first header to the second program, and
   wherein, upon receiving the data output by the first program, the second program processes the second header by performing the second process.

9. A communication system according to claim 8 wherein the first and second processes executed by the terminal are processes for decrypting results of encryption processes performed on the same layer of the received packet.

10. A communication system according to claim 8 wherein the first and second processes executed by the terminal are termination processes of IPsec executed on the same layer of the received packet.

11. A communication system according to claim 8 wherein the first and second processes executed by the terminal are termination processes of TLS performed on the same layer of the received packet.

12. A communication system according to claim 8 wherein the second operating system is executed on a virtual machine configured on the first operating system.

13. A communication system according to claim 8 wherein:
   the terminal is a terminal provided for mobile IP functions;
   the server is a server provided for the mobile IP functions;
   the terminal is a terminal functioning as a mobile node; and
   the server is a server functioning as a home agent of the terminal.

14. A home agent connected to a terminal or a router through a network, the home agent comprising:
   a transmission/reception part for receiving a packet that includes a first header for a first security processing and a second header for a second security processing,
   a CPU,
   an address memory for storing an address of the terminal or the router, and
   a program memory for storing programs to be executed by the CPU, the programs stored in the program memory including:
   a first operating system
   a second operating system that executes on the first operating system;

a first program that executes on the second operating system to perform a first process that processes the first header; and a second program that executes on the first operating system to perform a second process that processes the second header, and wherein the first security processing and the second security processing are executed on a same layer of the packet;

wherein, upon the packet being received by the transmission/reception part, the first program processes the first header by performing the first process and outputs data obtained by the first process that does not include the first header to the second program, and wherein, upon receiving the data output by the first program, the second program processes the second header by performing the second process.

15. A home agent according to claim 14, the home agent connected to a mobile terminal or a mobile router wherein:

the address memory further stores the address of the mobile terminal or the mobile router; and the first and second processes are executed on packets received from the mobile terminal or through the mobile router.

16. A home agent according to claim 14 wherein the first and second processes are processes for decrypting results of encryption processes executed on the same layer of the received packet.

17. A home agent according to claim 14 wherein the first and second processes are termination processes of IPsec executed on the same layer of the received packet.

18. A home agent according to claim 14 wherein the first and second processes are termination processes of TLS performed on the same layer of the received packet.

19. A home agent according to claim 14 wherein the second operating system is executed on a virtual machine configured on the first operating system.

* * * * *

UNITED STATES PATENT AND TRADEMARK OFFICE
CERTIFICATE OF CORRECTION

| | | |
|---|---|---|
| PATENT NO. | : 8,437,345 B2 | Page 1 of 1 |
| APPLICATION NO. | : 10/563219 | |
| DATED | : May 7, 2013 | |
| INVENTOR(S) | : Takeda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1845 days.

Signed and Sealed this
Sixth Day of January, 2015

Michelle K. Lee
*Deputy Director of the United States Patent and Trademark Office*